United States Patent
Park et al.

(10) Patent No.: US 11,781,806 B2
(45) Date of Patent: Oct. 10, 2023

(54) REFRIGERATOR HAVING PANEL ASSEMBLY

(71) Applicant: LG ELECTRONICS INC., Seoul (KR)

(72) Inventors: Hyungkyu Park, Seoul (KR); Jongpil Kim, Seoul (KR); Cheoljun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 685 days.

(21) Appl. No.: 16/807,597

(22) Filed: Mar. 3, 2020

(65) Prior Publication Data

US 2020/0200470 A1      Jun. 25, 2020

Related U.S. Application Data

(60) Continuation of application No. 16/375,662, filed on Apr. 4, 2019, now Pat. No. 10,612,838, which is a (Continued)

(30) Foreign Application Priority Data

Jan. 5, 2016   (KR) .................. 10-2016-0001295

(51) Int. Cl.
  *F25D 27/00*  (2006.01)
  *F25D 23/02*  (2006.01)
  *H05B 47/12*  (2020.01)

(52) U.S. Cl.
  CPC ......... *F25D 27/005* (2013.01); *F25D 23/028* (2013.01); *H05B 47/12* (2020.01); (Continued)

(58) Field of Classification Search
  CPC ...... F25D 27/005; F25D 23/028; F25D 23/02; F25D 2323/024; F25D 2400/361; F25D 2700/04; H05B 47/12; Y02B 20/40
  See application file for complete search history.

(56) References Cited

U.S. PATENT DOCUMENTS 6,059,420 A * 5/2000 Rogers ................... F25D 27/00
                                                      362/802
8,960,934 B2   2/2015 Sung
                    (Continued)

FOREIGN PATENT DOCUMENTS

CN       103426405       12/2013
CN       203812203        9/2014
                    (Continued)

OTHER PUBLICATIONS

European Search Report issued in Application No. 21168905.4 dated Sep. 15, 2021.
(Continued)

*Primary Examiner* — Lionel Nouketcha
(74) *Attorney, Agent, or Firm* — KED & ASSOCIATES, LLP

(57) ABSTRACT

Provided are a refrigerator and a control method thereof. The refrigerator is characterized by enabling at least a part of a refrigerator door to be selectively transparent by a user's operation, such that the user sees through an inside of the refrigerator while the refrigerator door is closed.

26 Claims, 42 Drawing Sheets

Related U.S. Application Data division of application No. 15/561,640, filed as application No. PCT/KR2016/014068 on Dec. 1, 2016, now Pat. No. 10,295,249.

(52) U.S. Cl.
CPC ........ *F25D 23/02* (2013.01); *F25D 2323/023* (2013.01); *F25D 2323/024* (2013.01); *F25D 2400/361* (2013.01); *F25D 2400/40* (2013.01); *F25D 2700/04* (2013.01)

(56) References Cited

U.S. PATENT DOCUMENTS

| | | |
|---|---|---|
| 2011/0134627 A1 | 6/2011 | Hamlin |
| 2012/0260683 A1 | 10/2012 | Cheon |
| 2014/0144083 A1 | 5/2014 | Artwohl et al. |
| 2015/0228253 A1 | 8/2015 | Lee et al. |
| 2017/0205133 A1 | 7/2017 | Im |

FOREIGN PATENT DOCUMENTS

| | | |
|---|---|---|
| EP | 2 184 571 | 5/2010 |
| EP | 2428153 | 3/2012 |
| EP | 2693332 | 2/2014 |
| EP | 2 843 330 | 3/2015 |
| EP | 2 789 943 | 10/2015 |
| JP | H01-174877 | 7/1989 |
| JP | 2004-225968 | 8/2004 |
| KR | 10-2011-0065885 | 6/2011 |
| KR | 10-2011-0089534 | 8/2011 |
| KR | 10-2013-0027101 | 3/2013 |
| KR | 10-2013-0072186 | 7/2013 |
| KR | 10-2014-0128098 | 11/2014 |
| KR | 10-2015-0123493 | 11/2015 |
| TW | M502815 | 6/2015 |
| WO | 2007-115587 | 10/2007 |
| WO | WO 2011/093614 | 8/2011 |
| WO | 2012154236 | 11/2012 |
| WO | 2014-175639 | 10/2014 |

OTHER PUBLICATIONS

U.S. Office Action issued in U.S. Appl. No. 16/807,597 dated Aug. 10, 2020.
U.S. Quayle Office Action issued in U.S. Appl. No. 16/801,673 dated Aug. 10, 2020.
Suppleaentary European Search Report in European Application No. 16883997.5, dated Aug. 17, 2018, 12 pages.
International Search Report in International Application No. PCT/KR2016/014068, dated Apr. 7, 2017, 4 pages (with English translation).
U.S. Office Action issued in U.S. Appl. No. 15/561,640 dated Sep. 20, 2018.
U.S. Office Action issued in U.S. Appl. No. 16/375,717 dated Sep. 6, 2018.
U.S. Notice of Allowance issued in U.S. Appl. No. 16/375,717 dated Nov. 22, 2019.
U.S. Office Action issued in U.S. Appl. No. 16/375,662 dated Sep. 6, 2019.
U.S. Notice of Allowance issued in U.S. Appl. No. 16/375,662 dated Nov. 27, 2019.

\* cited by examiner

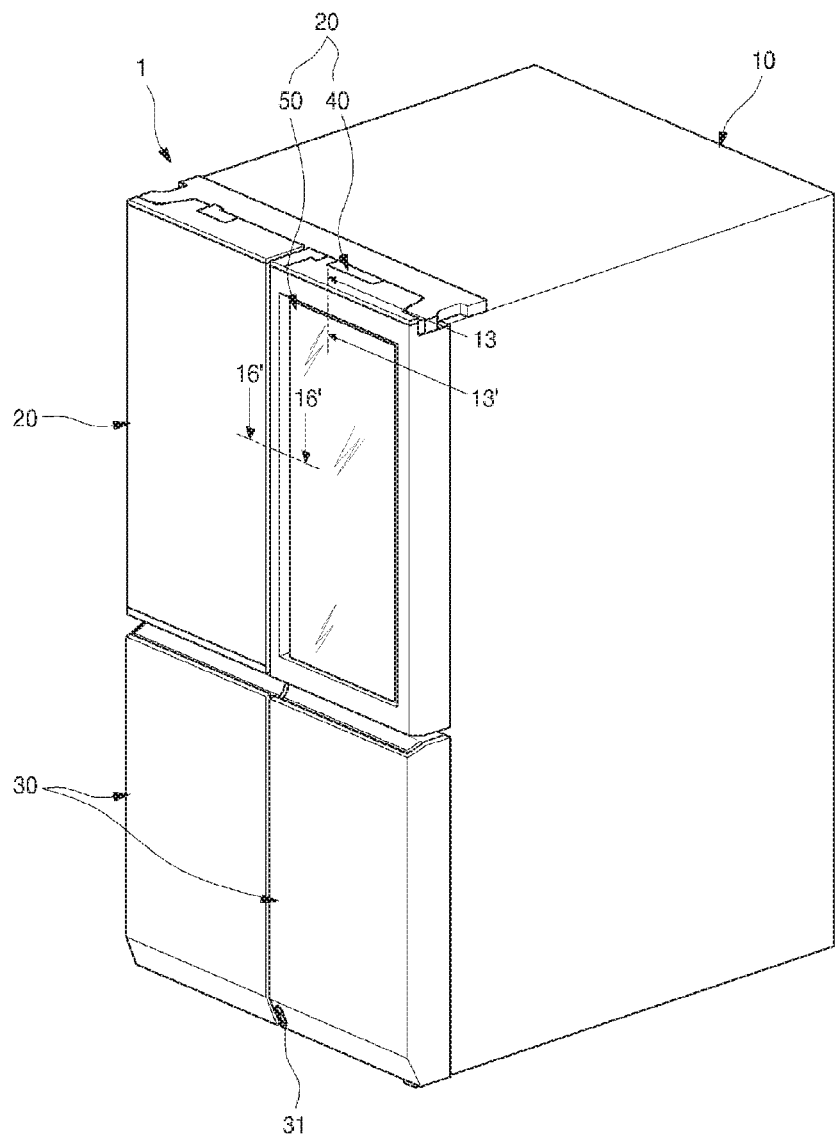
[Fig. 1]

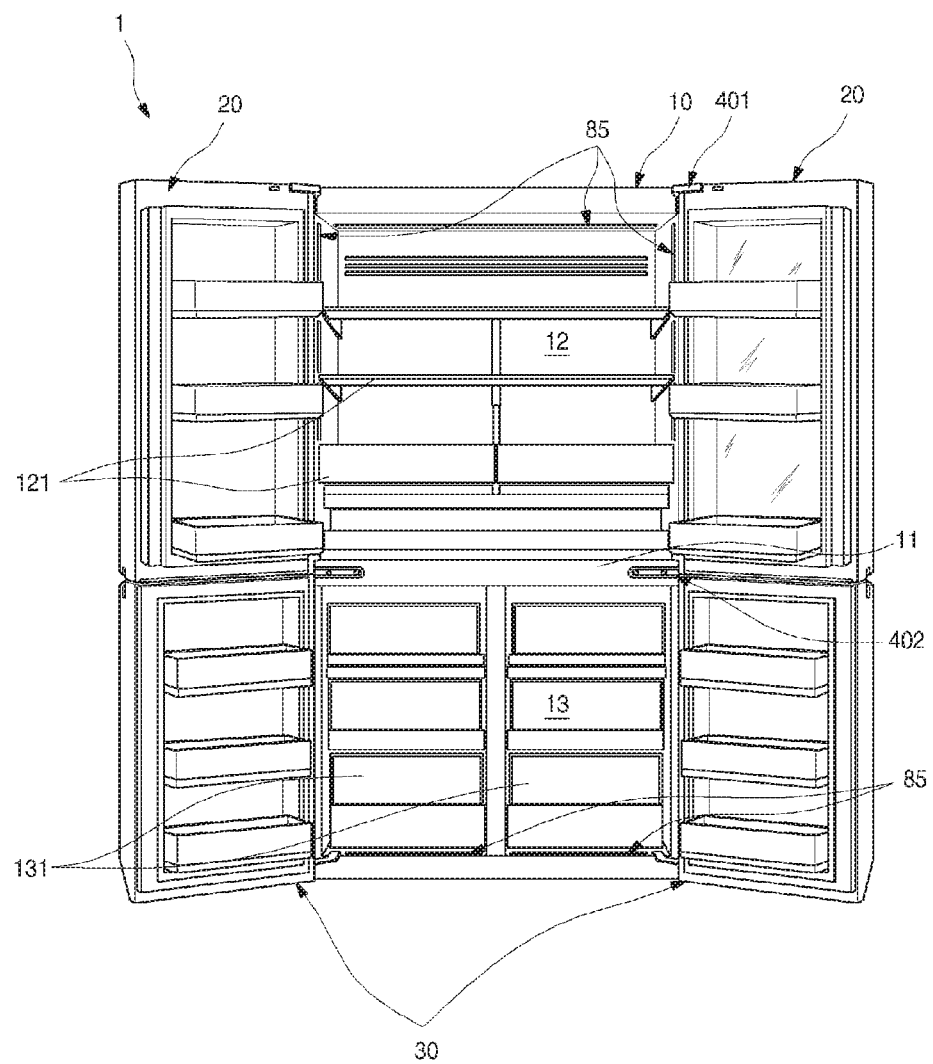
[Fig. 2]

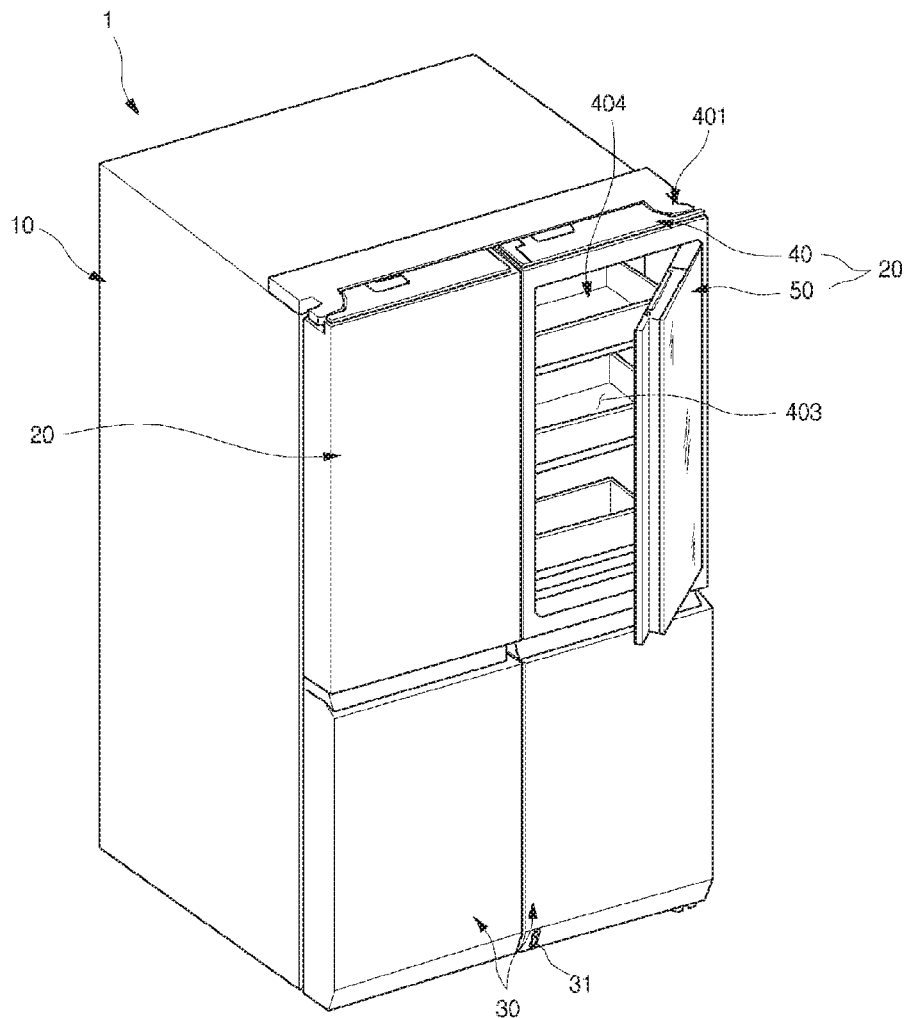
[Fig. 3]

[Fig. 4]
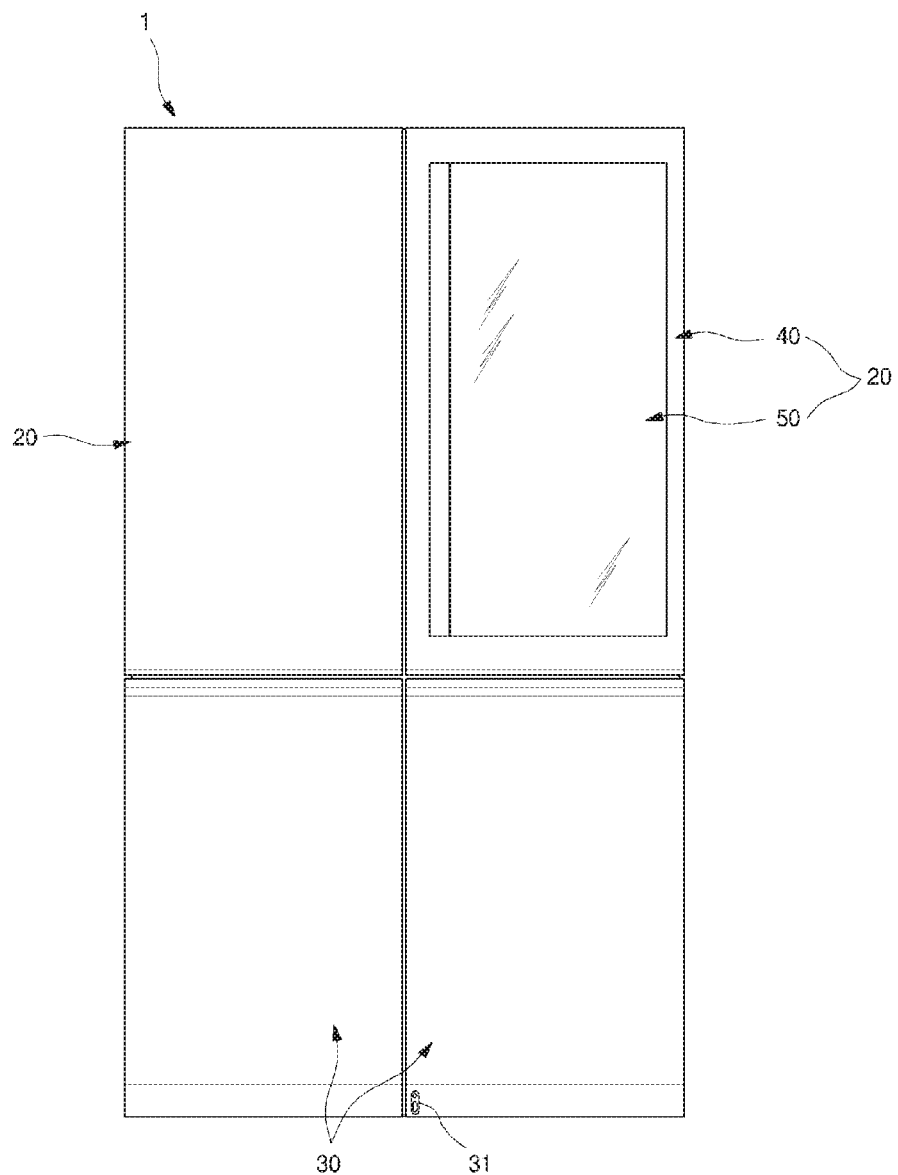

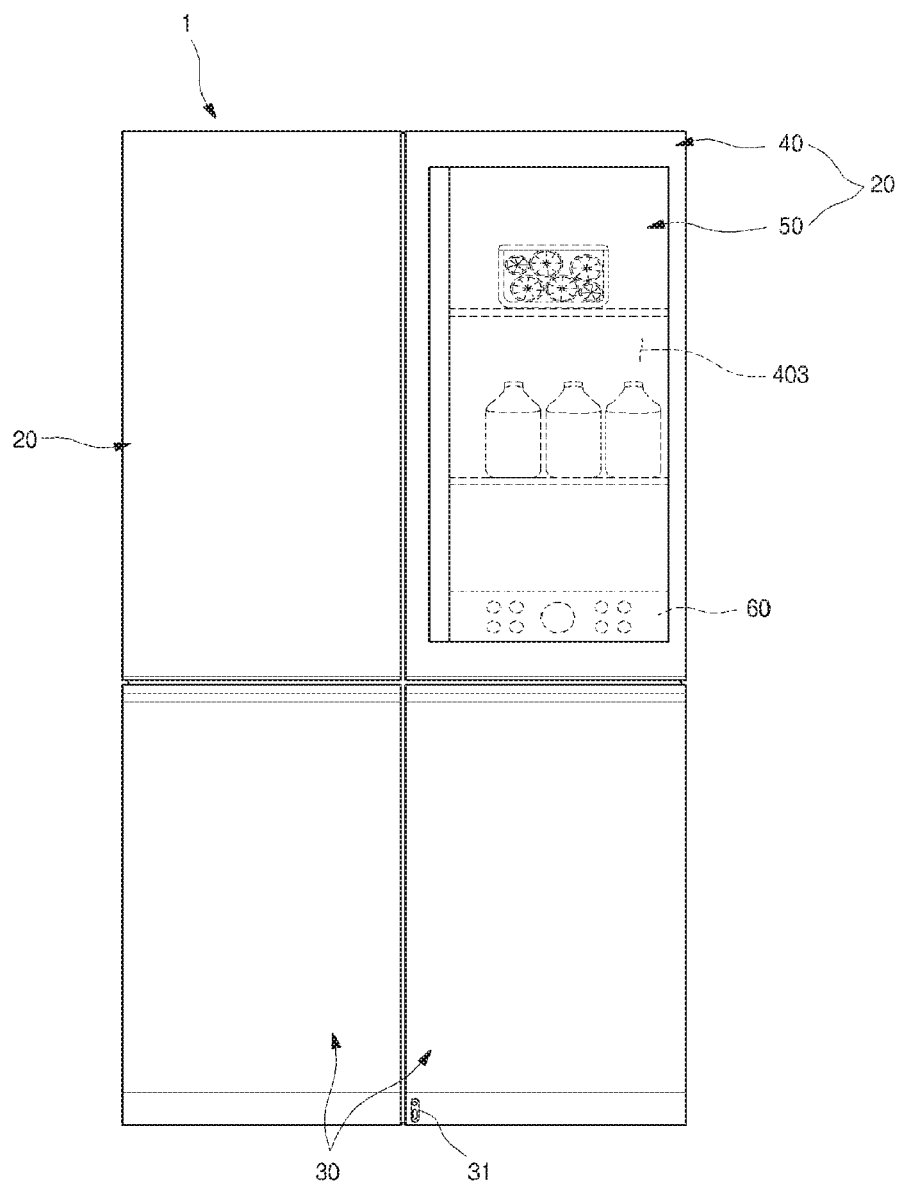
[Fig. 5]

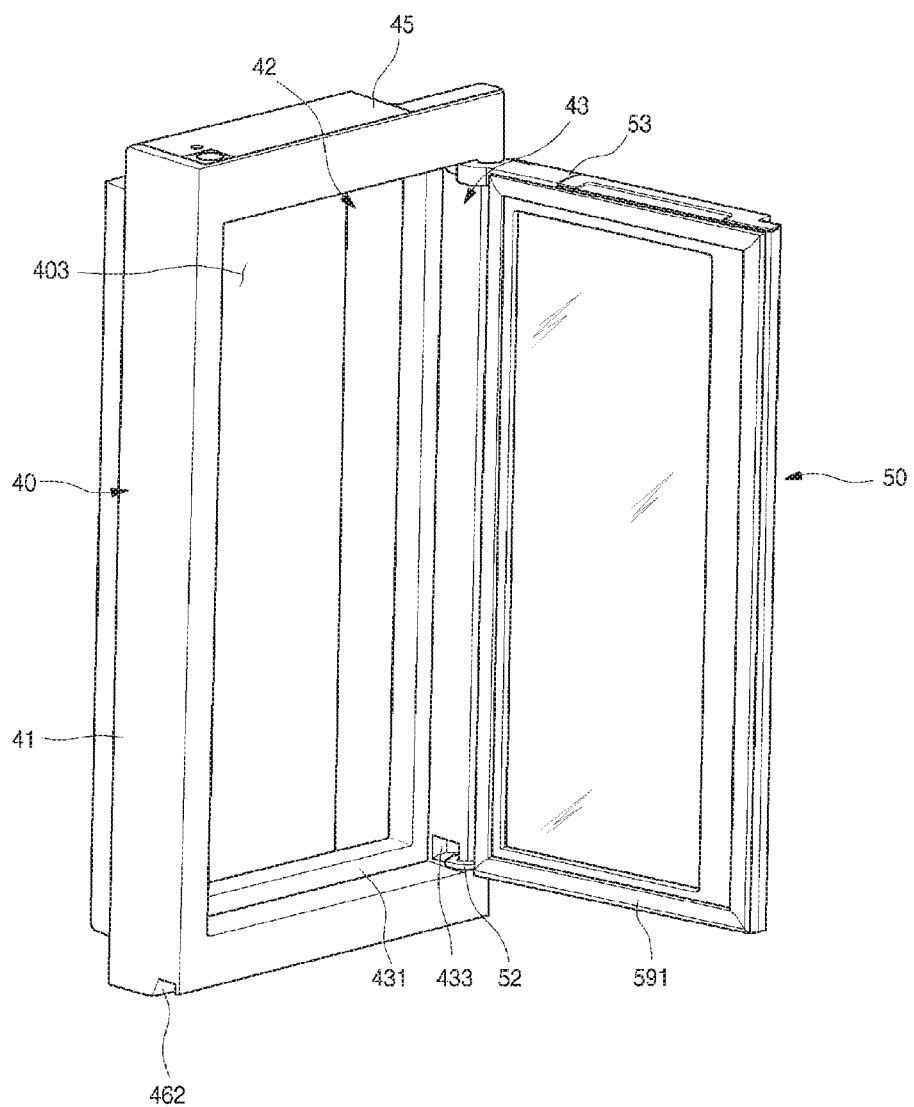
[Fig. 6]

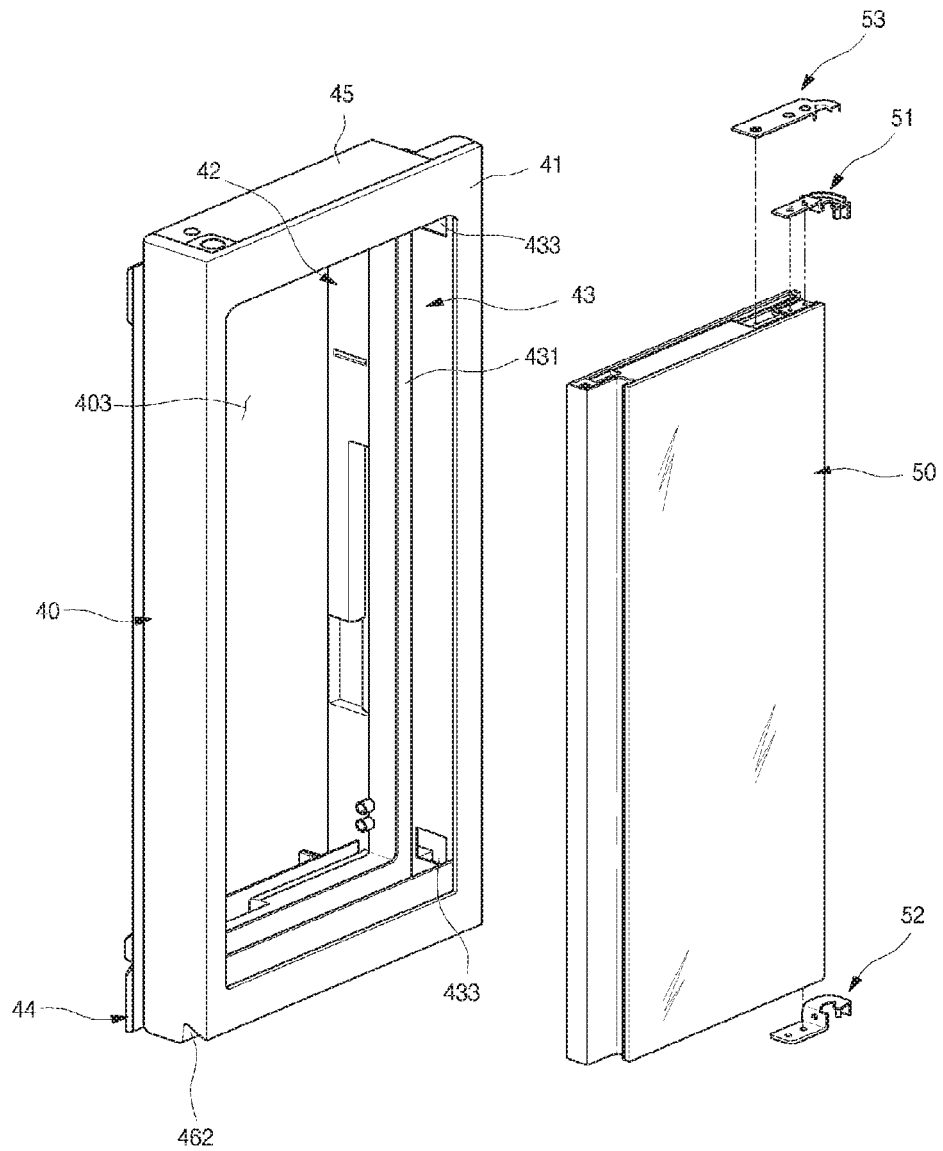
[Fig. 7]

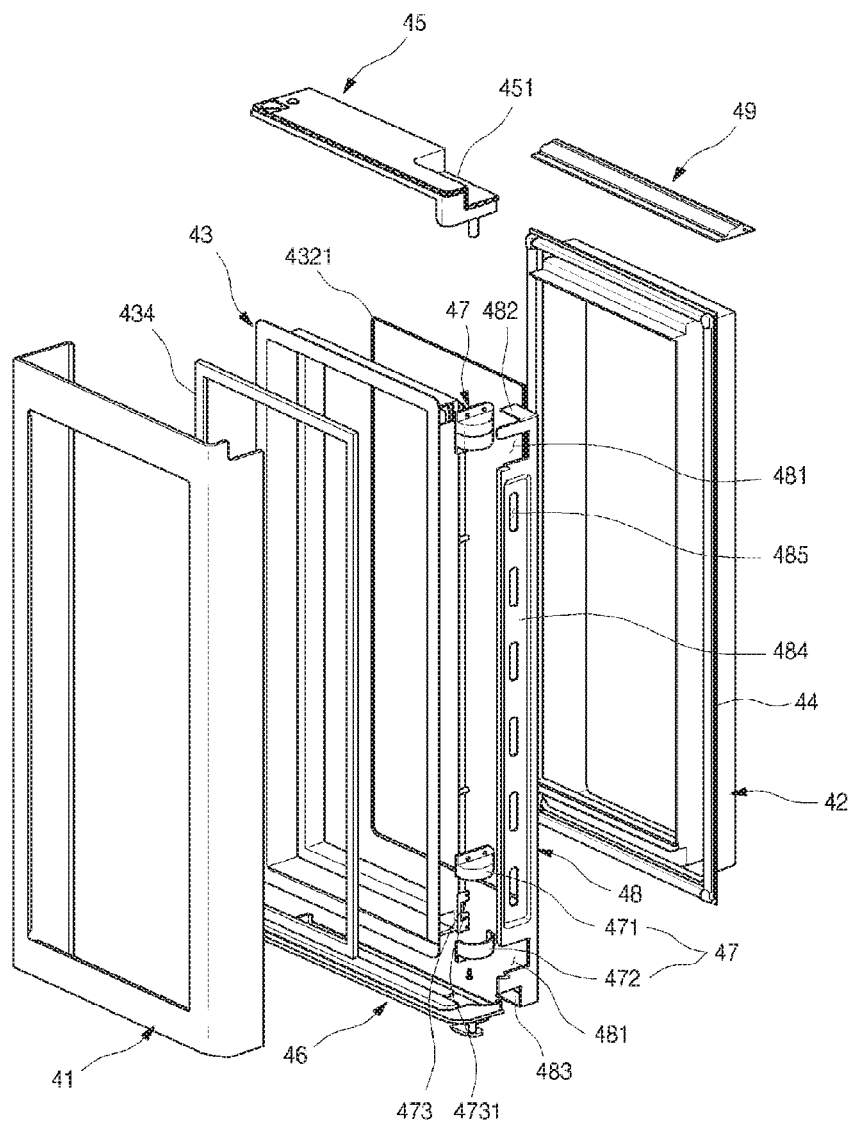

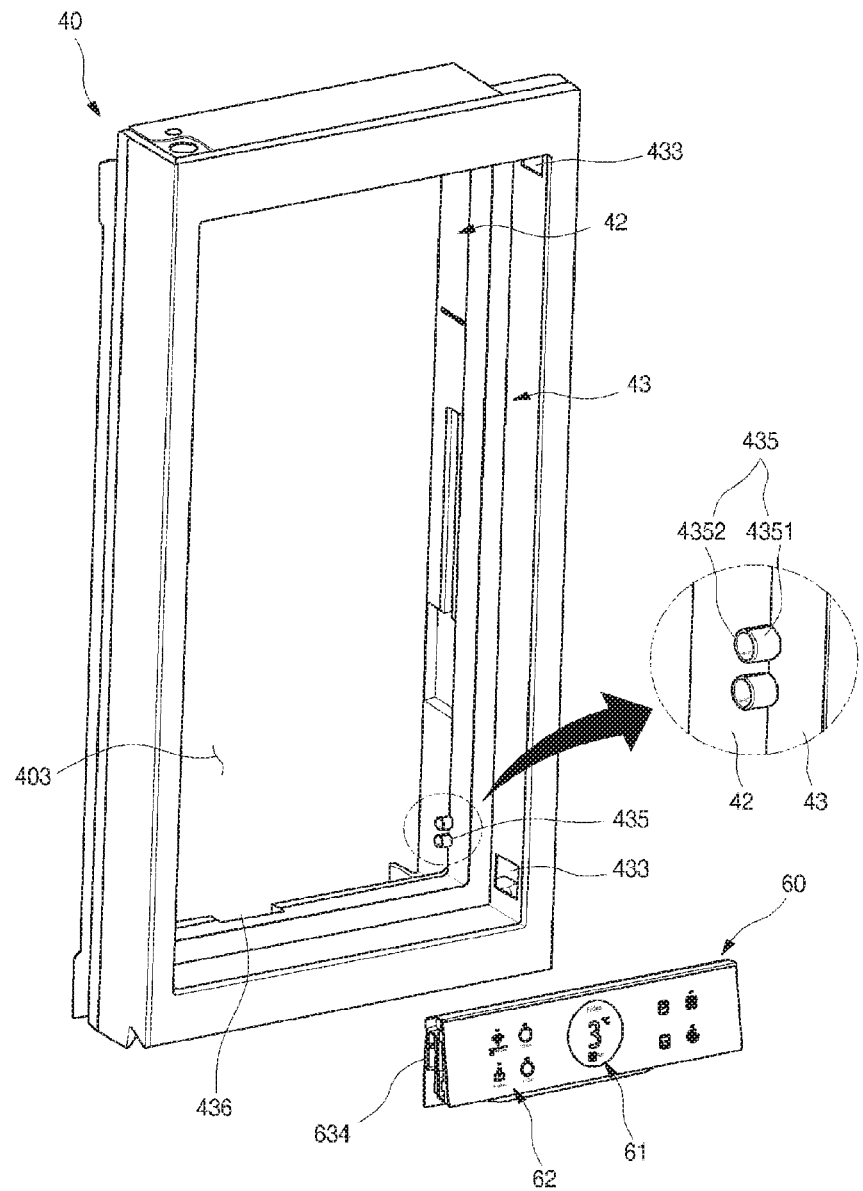
[Fig. 9]

[Fig. 10A]
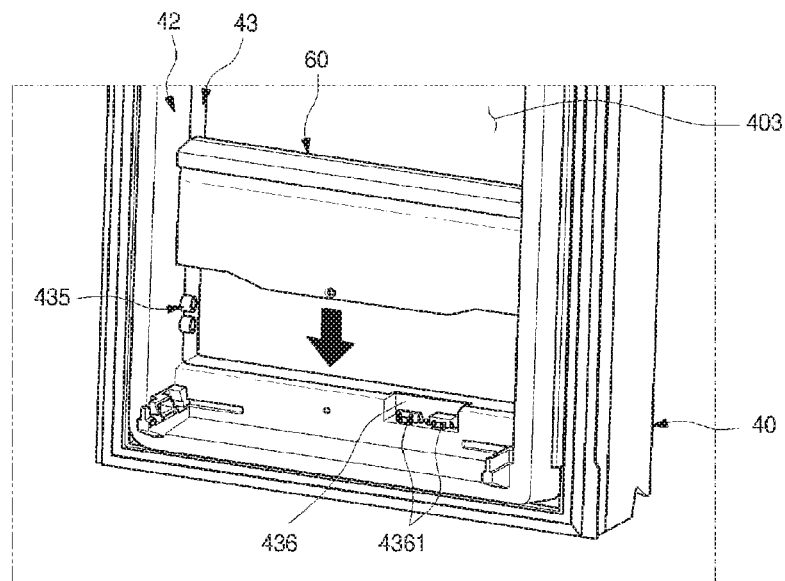
[Fig. 10B]
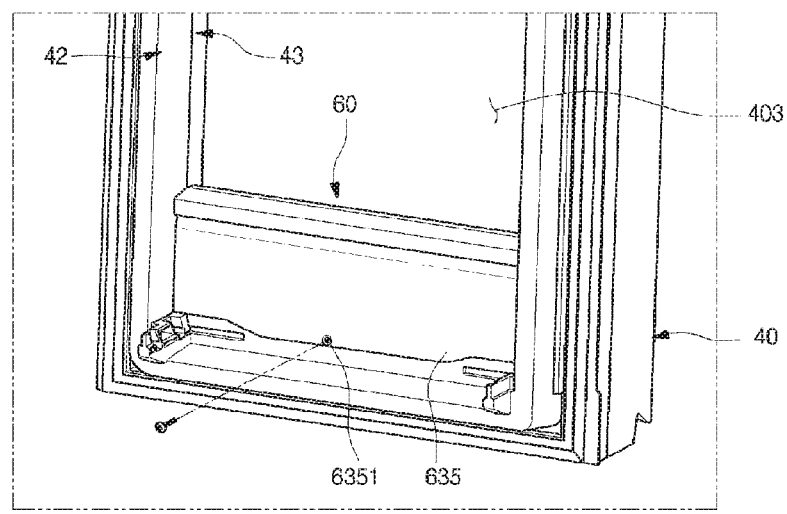

[Fig. 11]
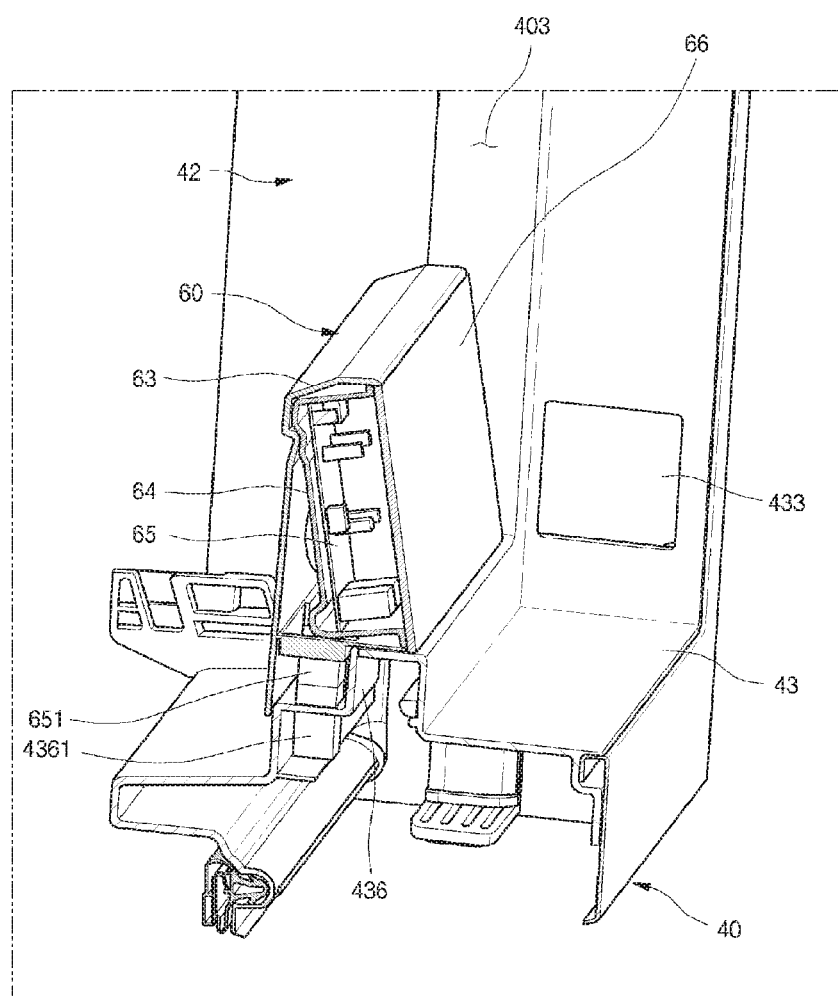

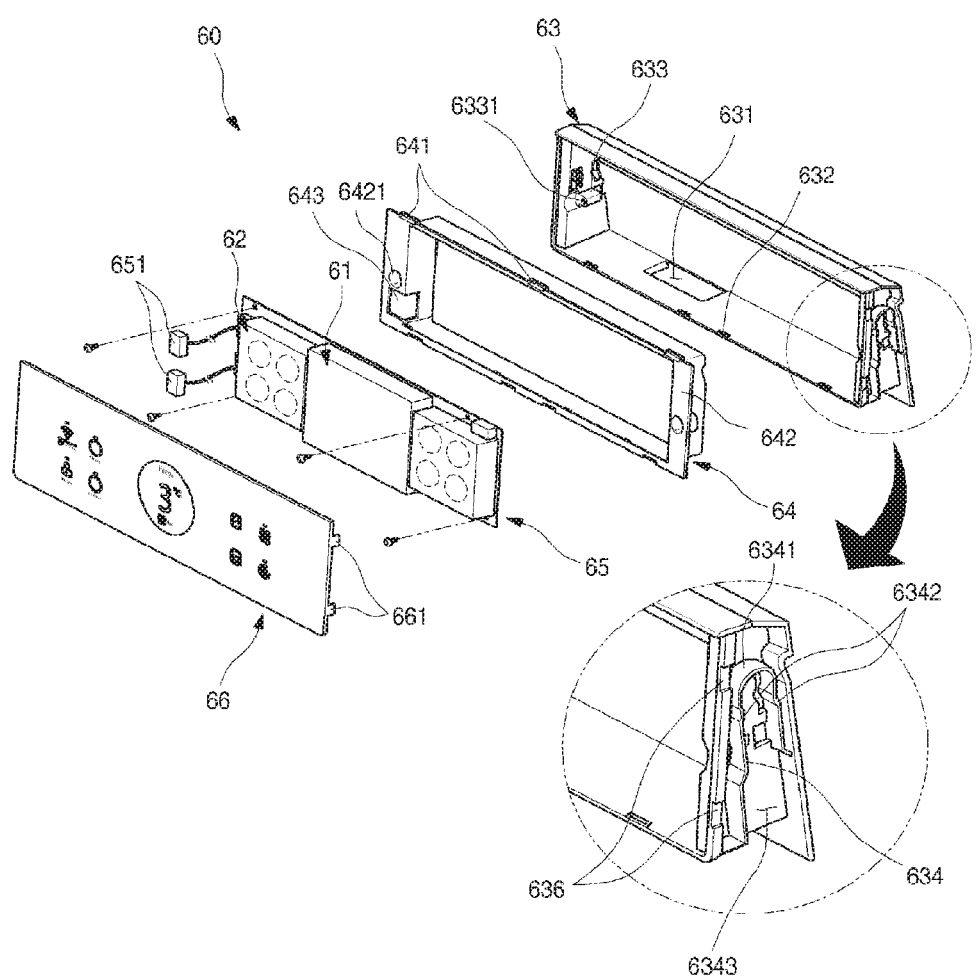
[Fig. 12]

[Fig. 13]
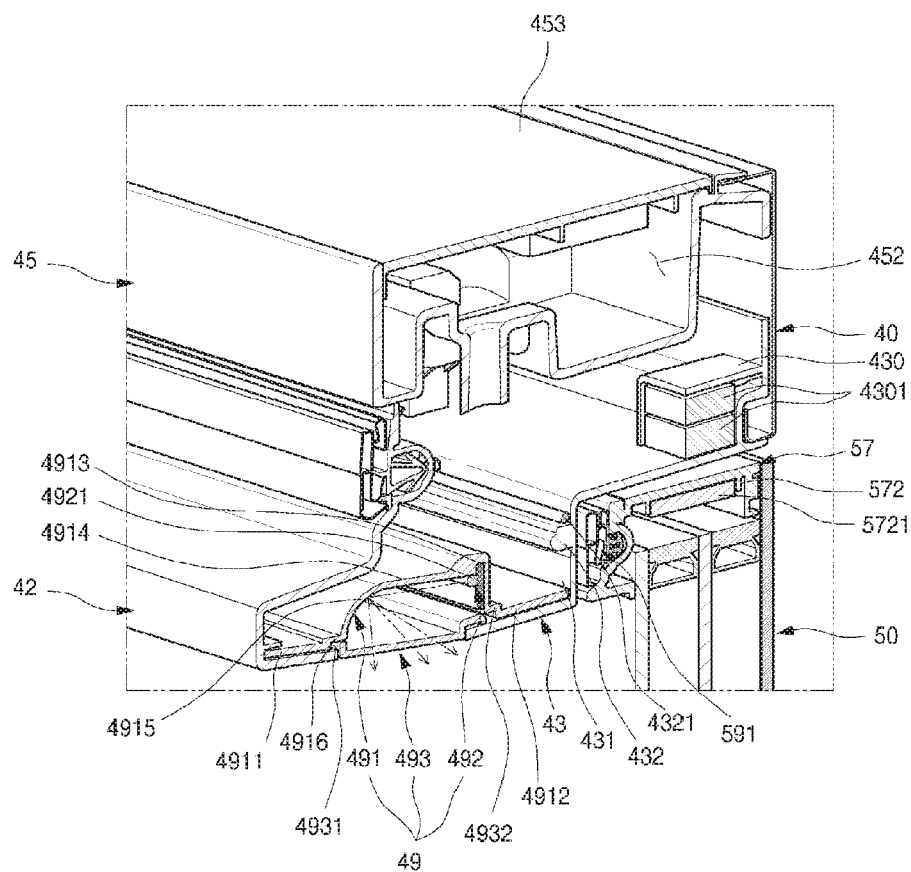

[Fig. 14]
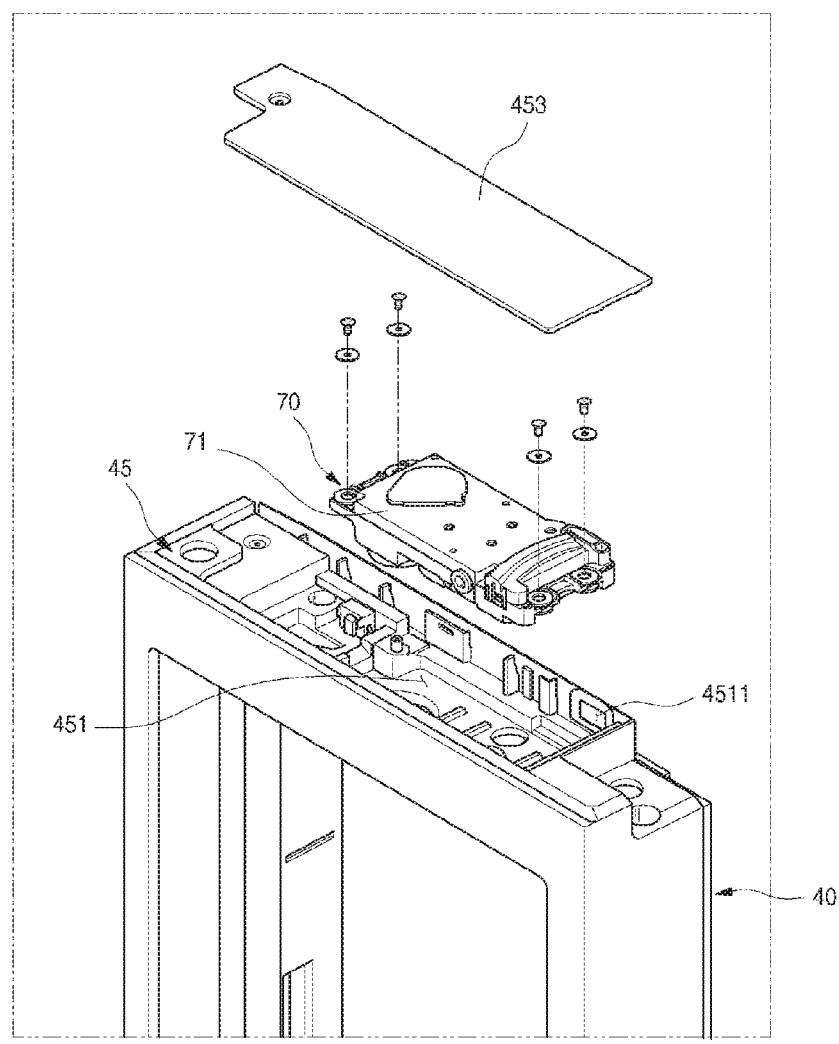

[Fig. 15]
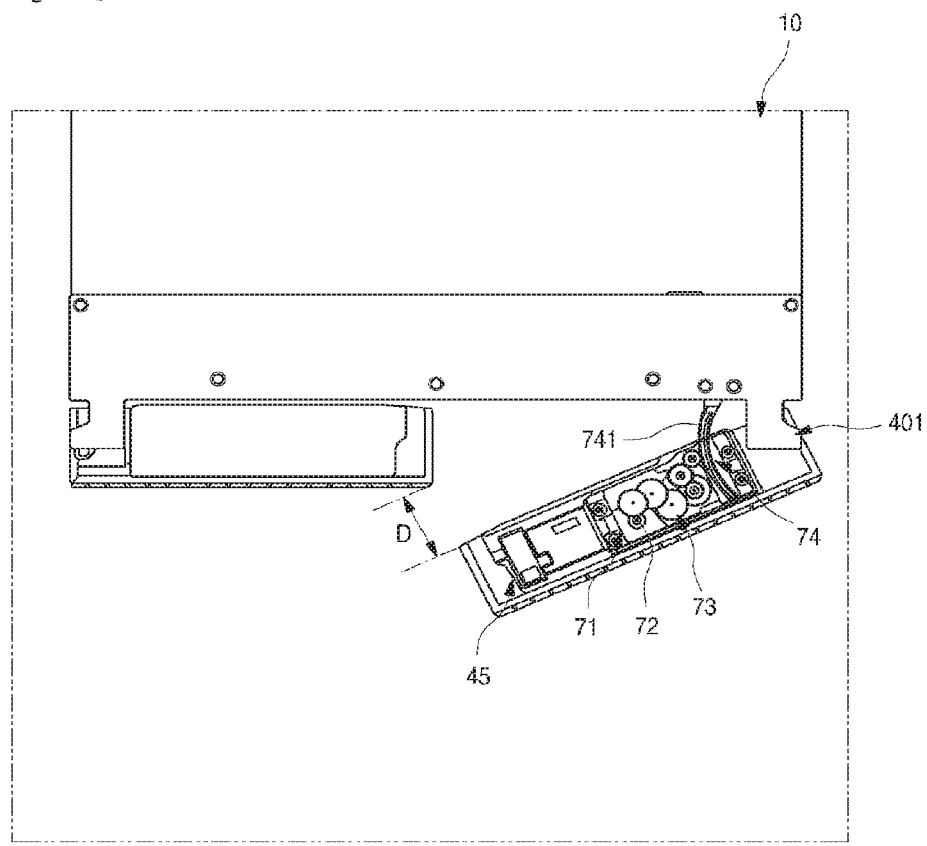

[Fig. 16]
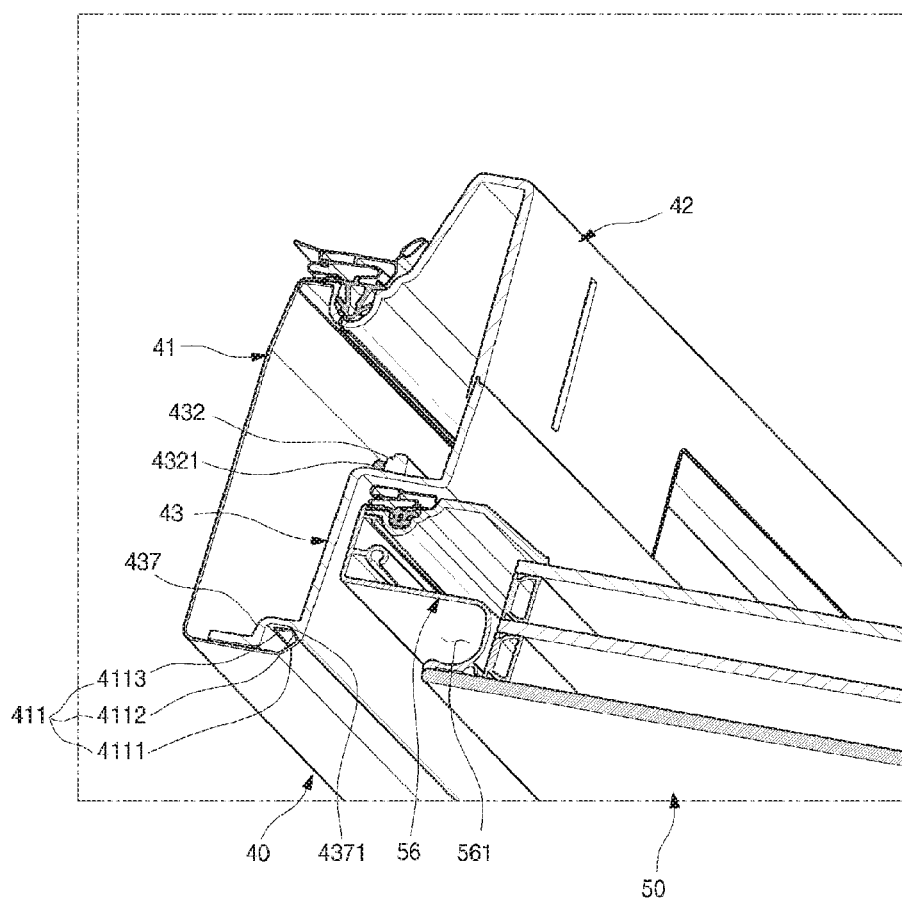

[Fig. 17]
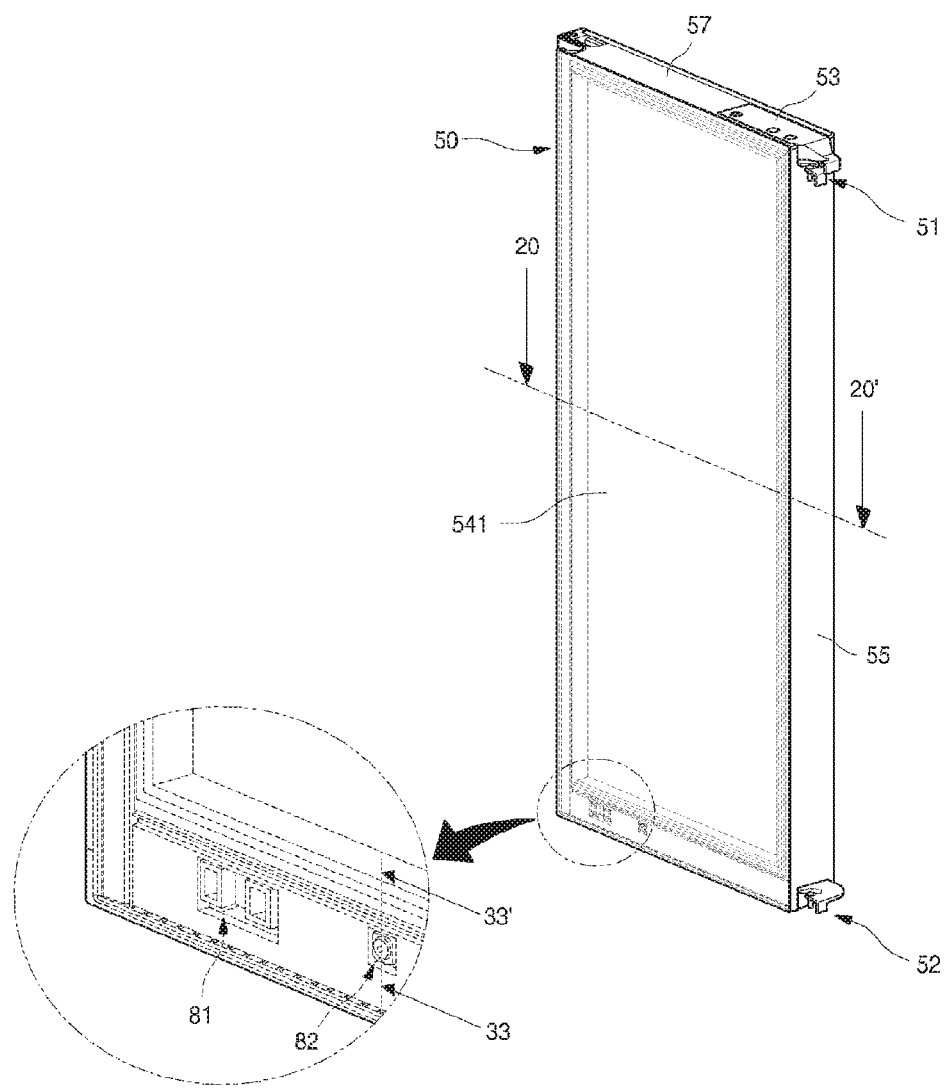

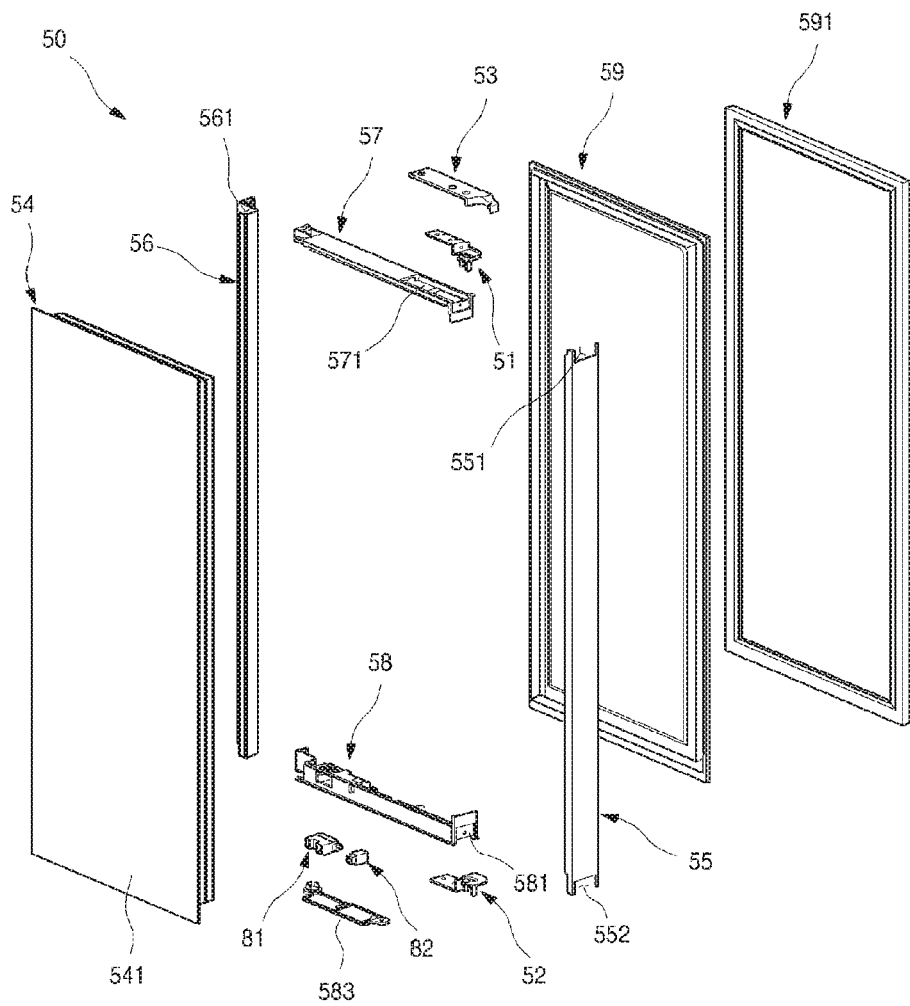
[Fig. 18]

[Fig. 19]
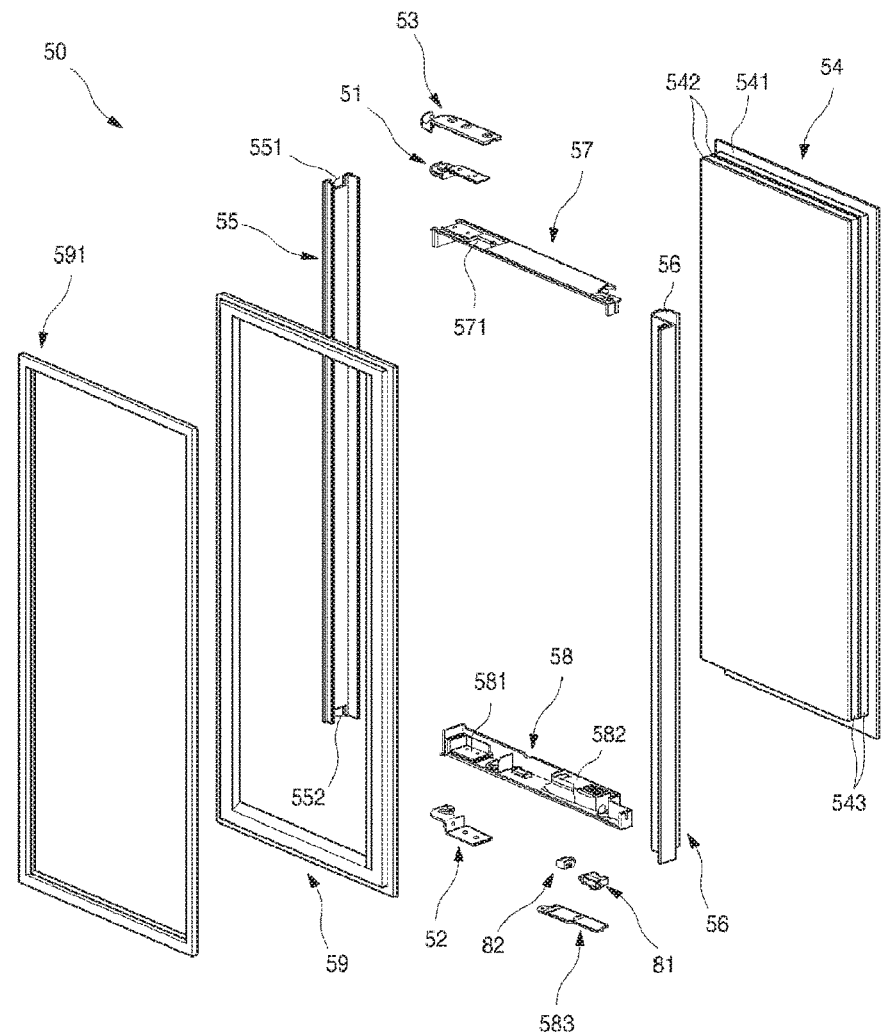
[Fig. 20]
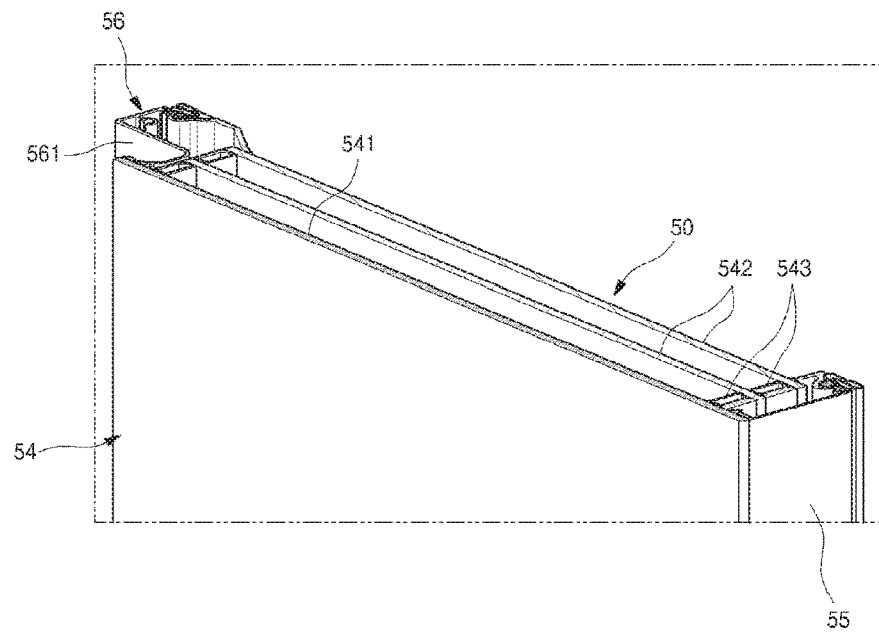

[Fig. 21]
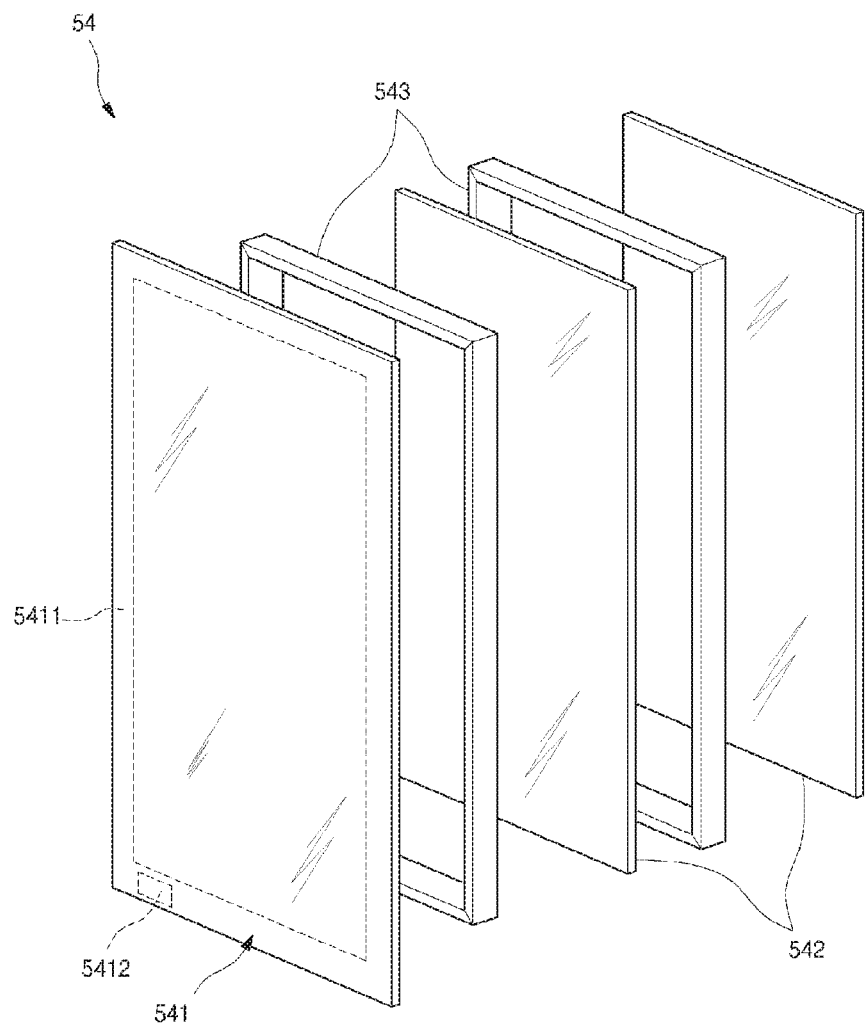
[Fig. 22]
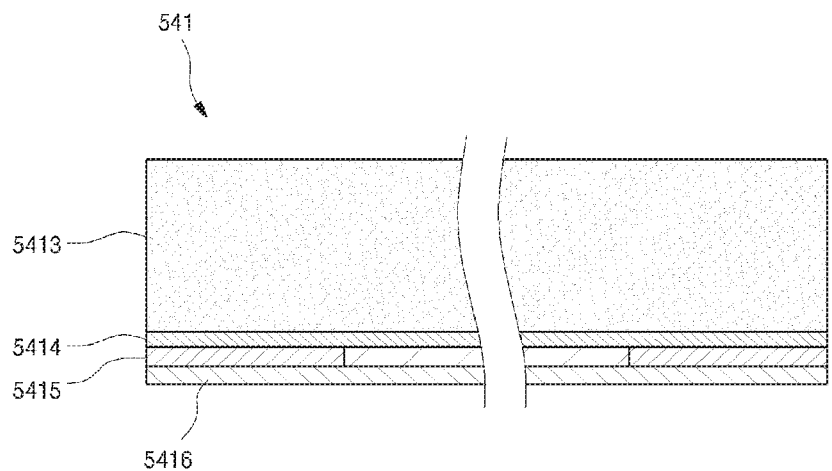

[Fig. 23]
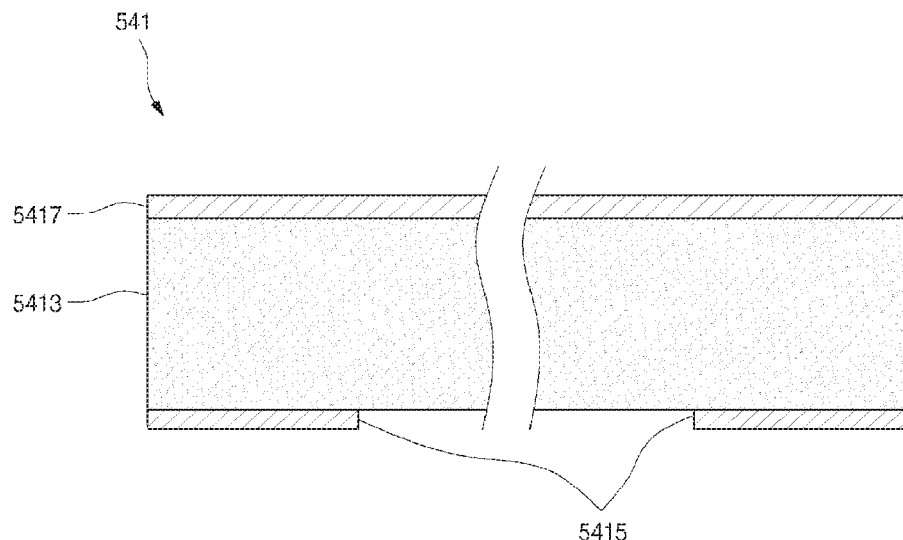
[Fig. 24]
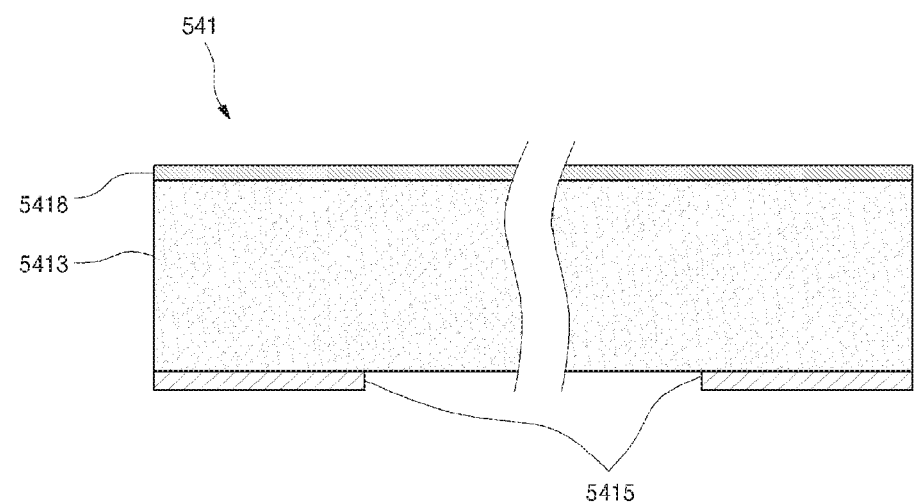
[Fig. 25]
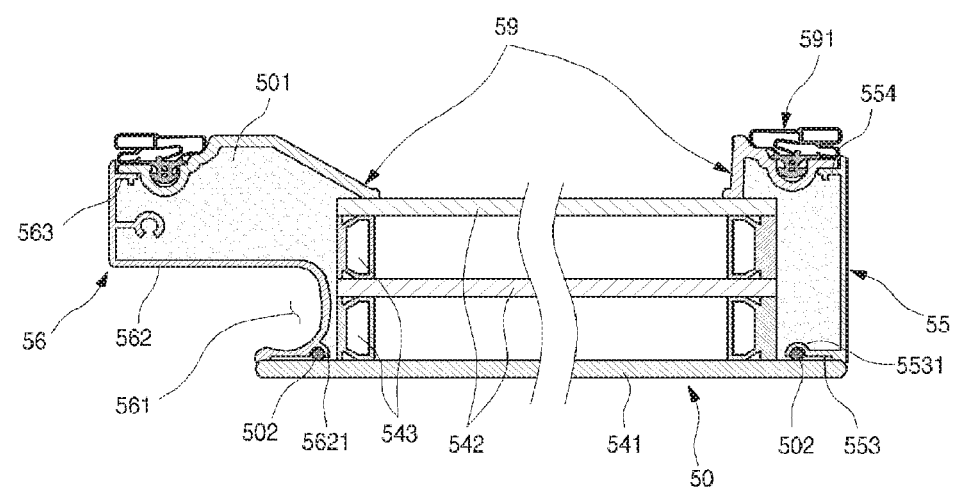

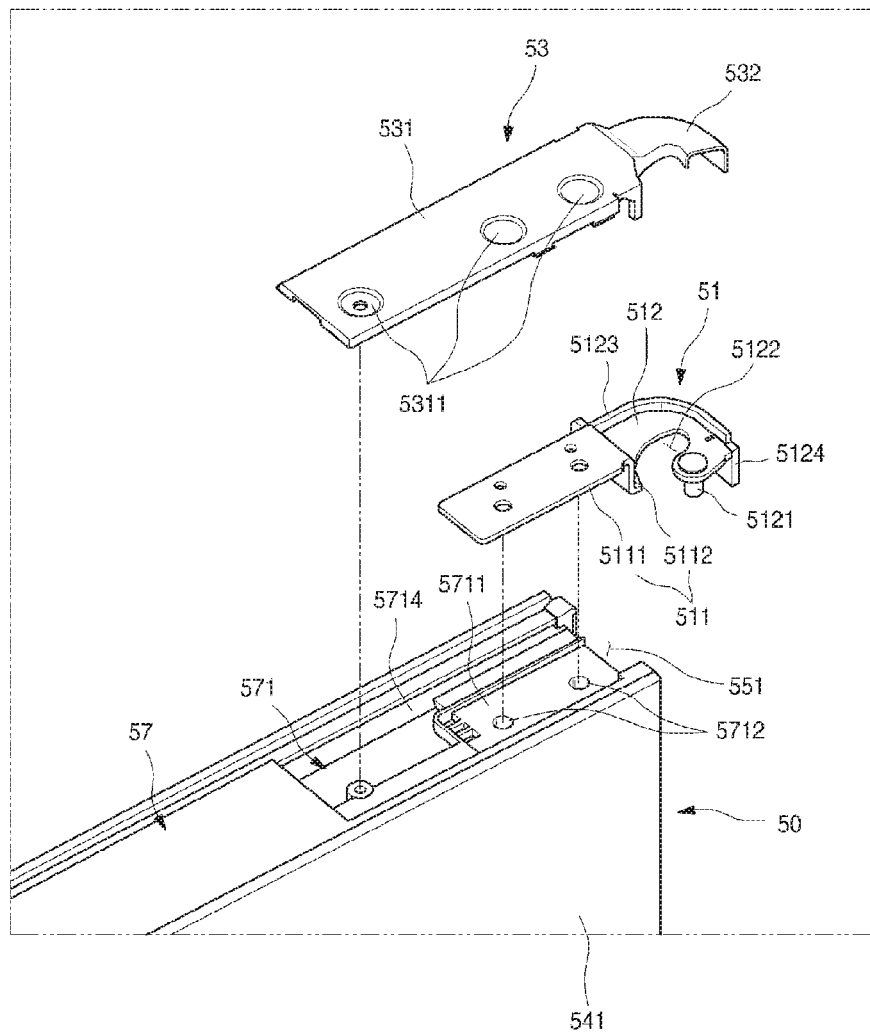
[Fig. 26]

[Fig. 27]
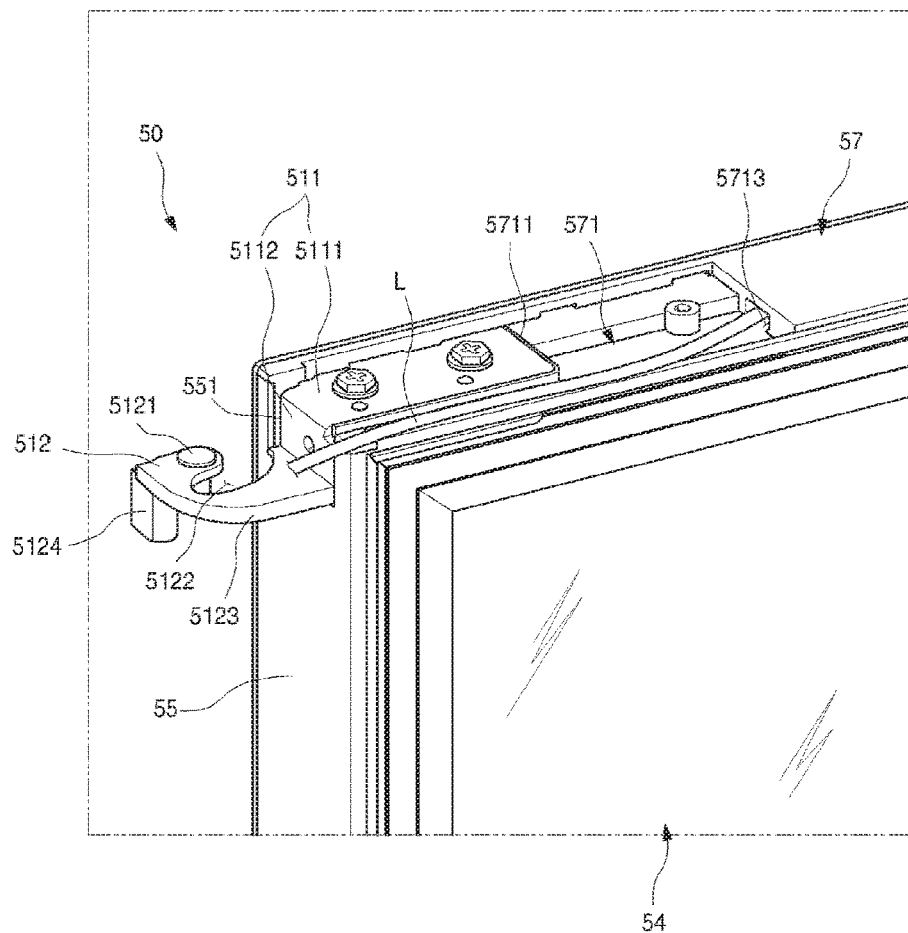
[Fig. 28]
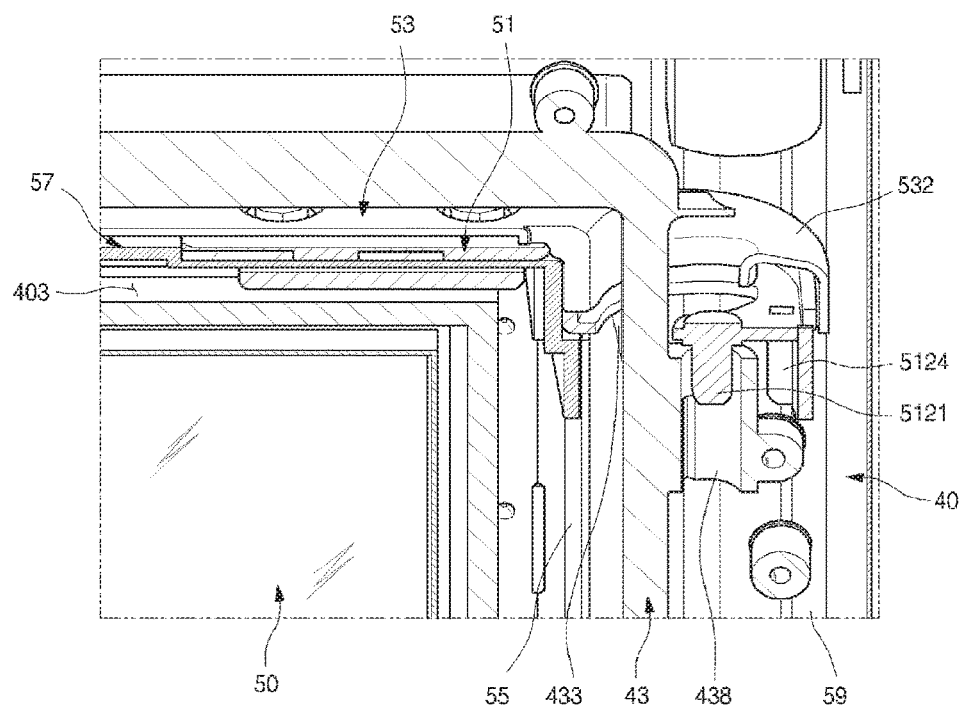

[Fig. 31]
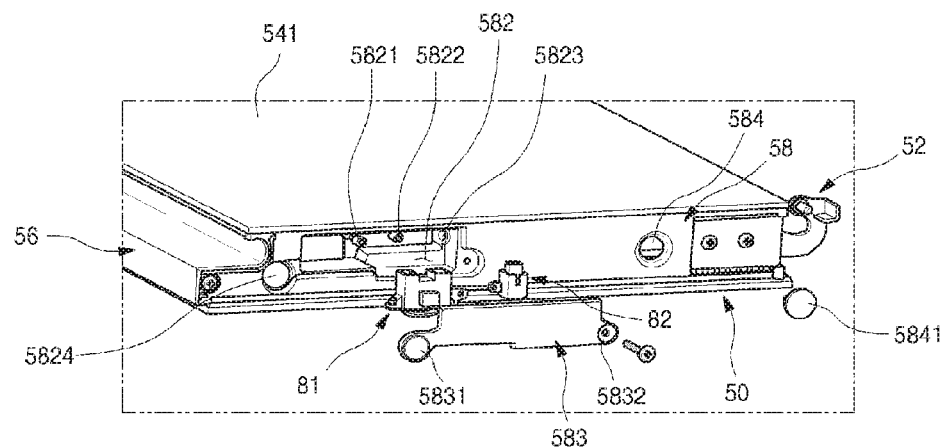
[Fig. 32]
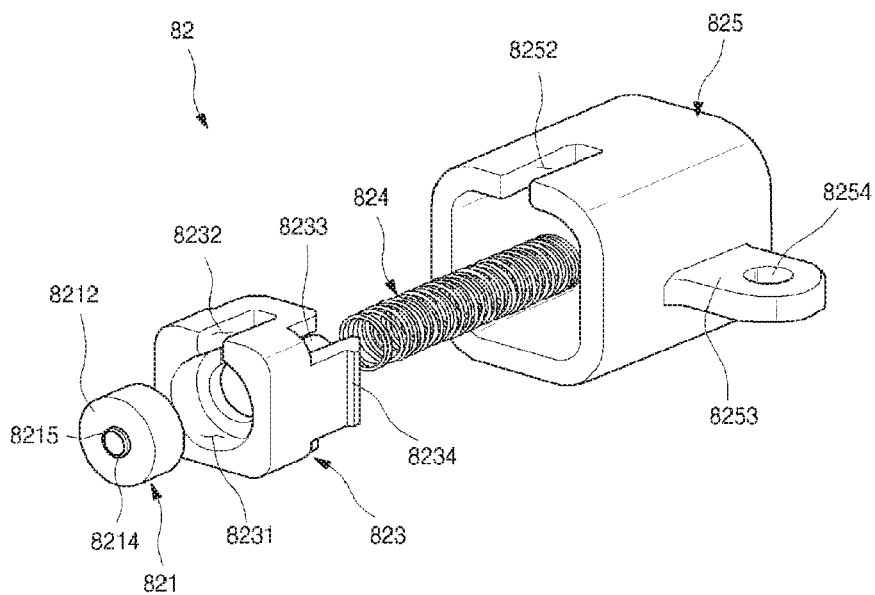

[Fig. 33]
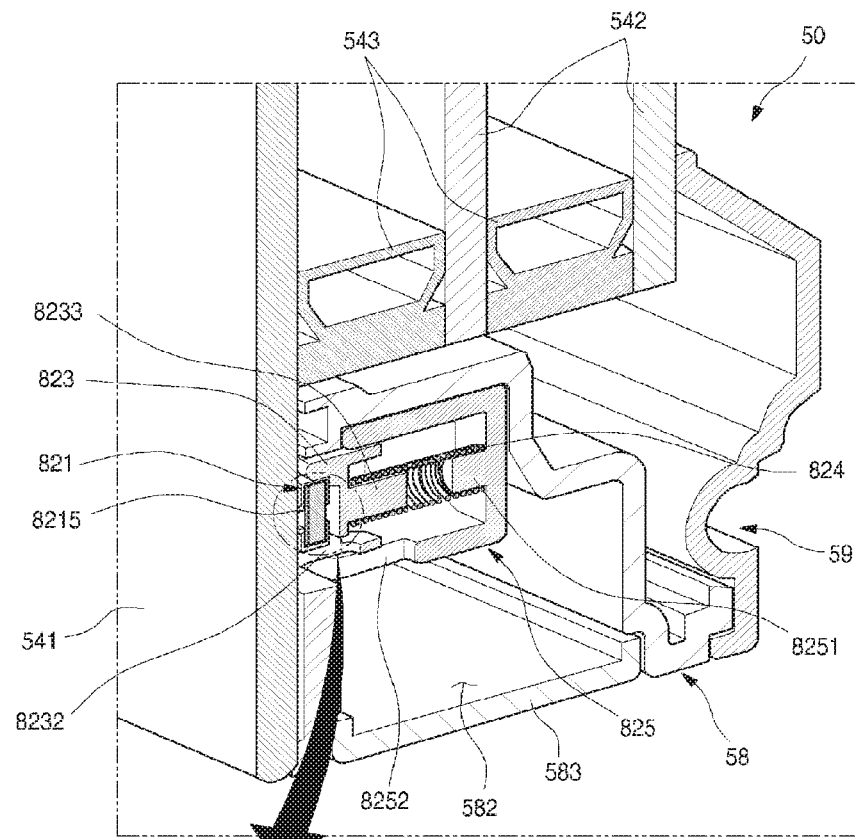
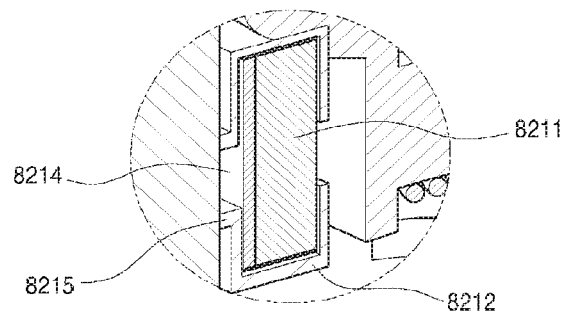
[Fig. 34]
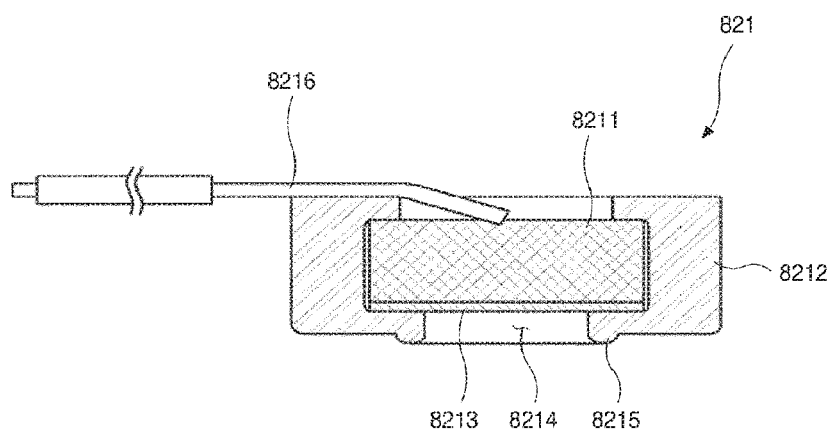

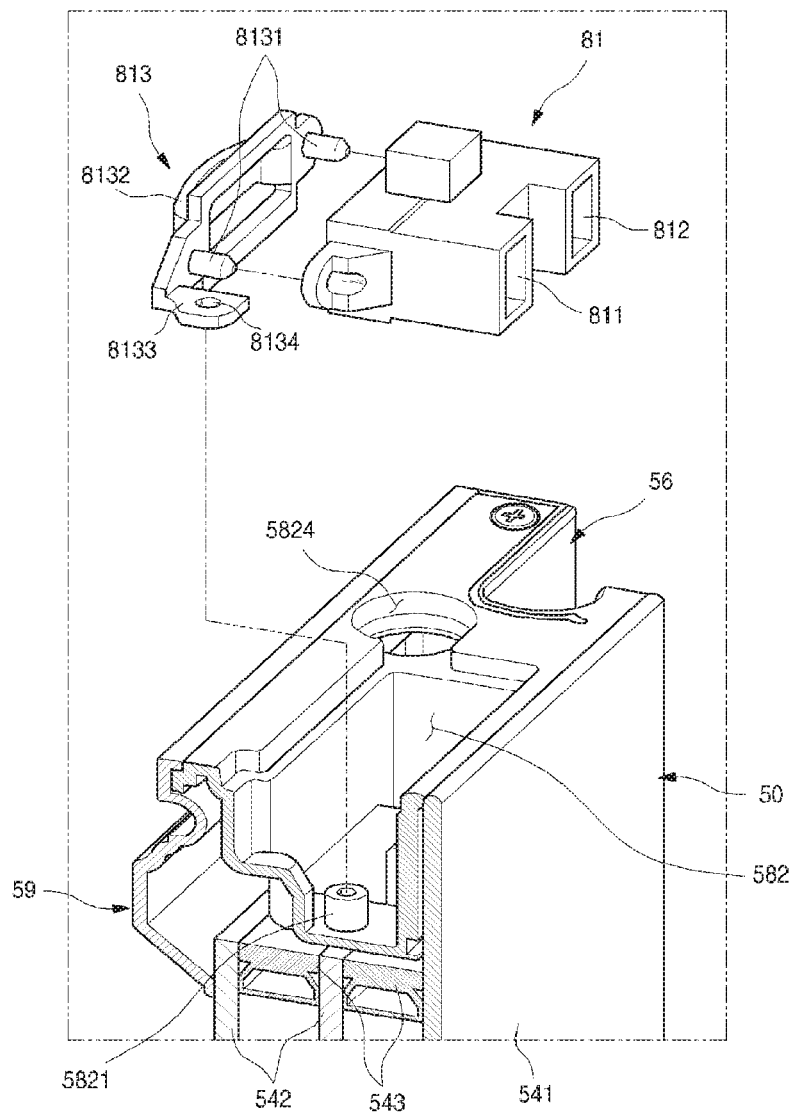
[Fig. 35]

[Fig. 36]
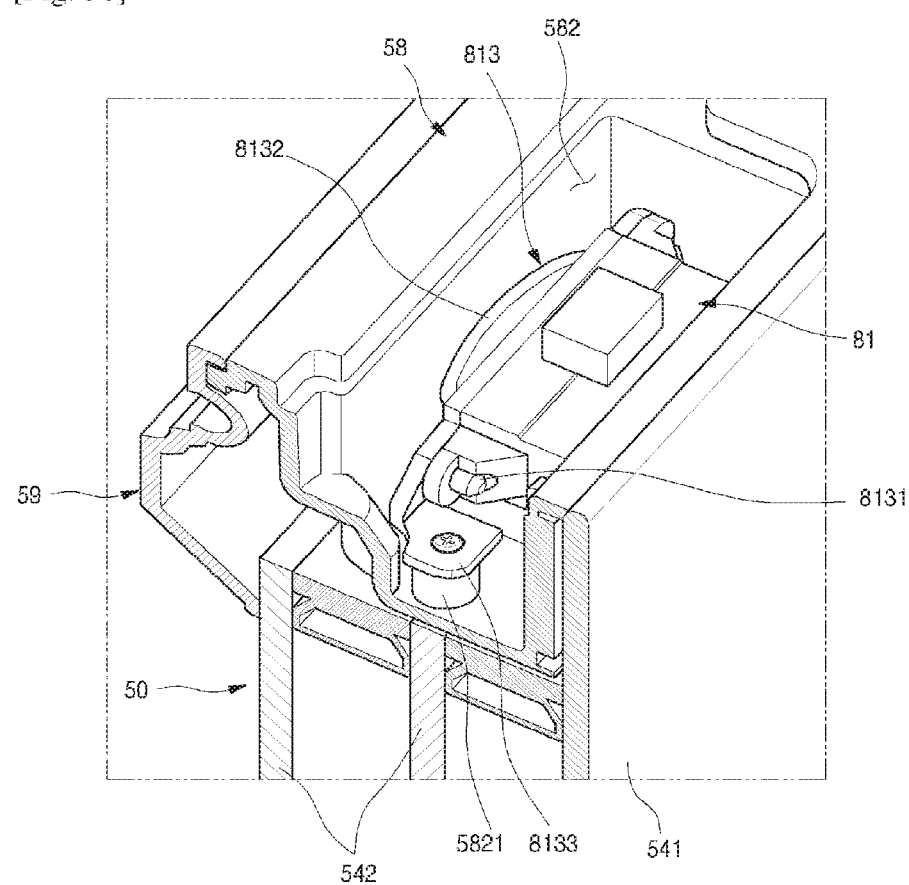

[Fig. 37]
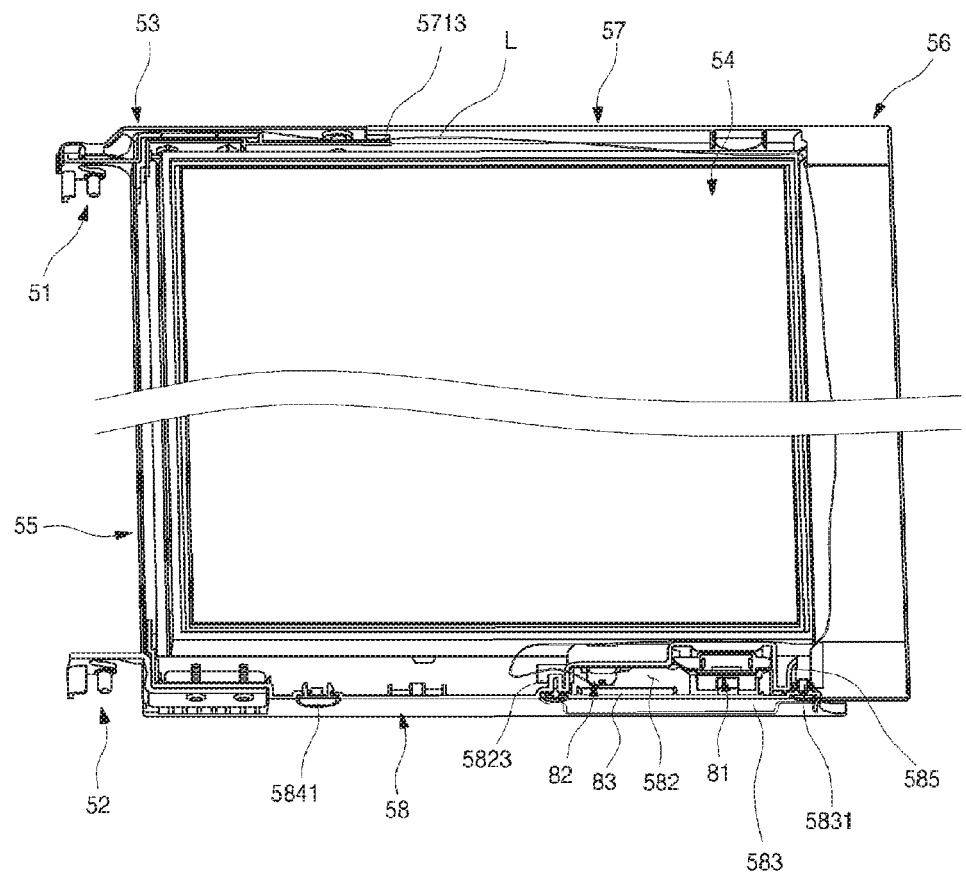

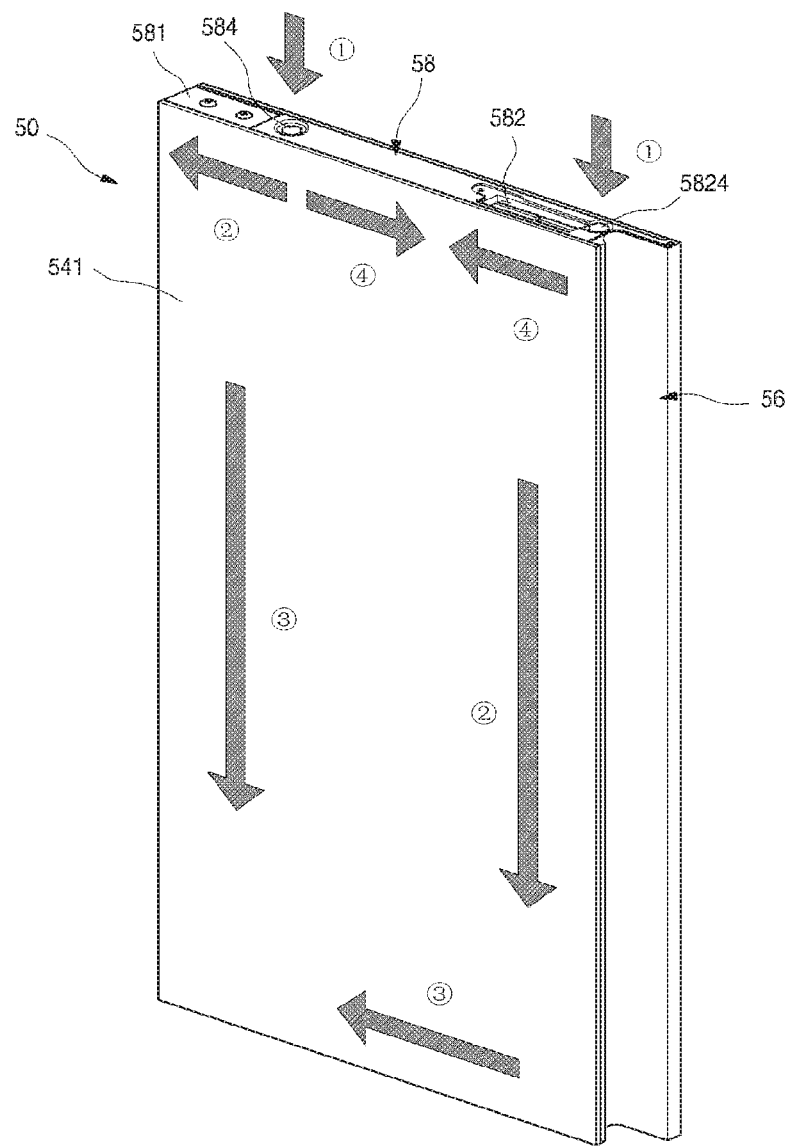
[Fig. 38]

[Fig. 39]
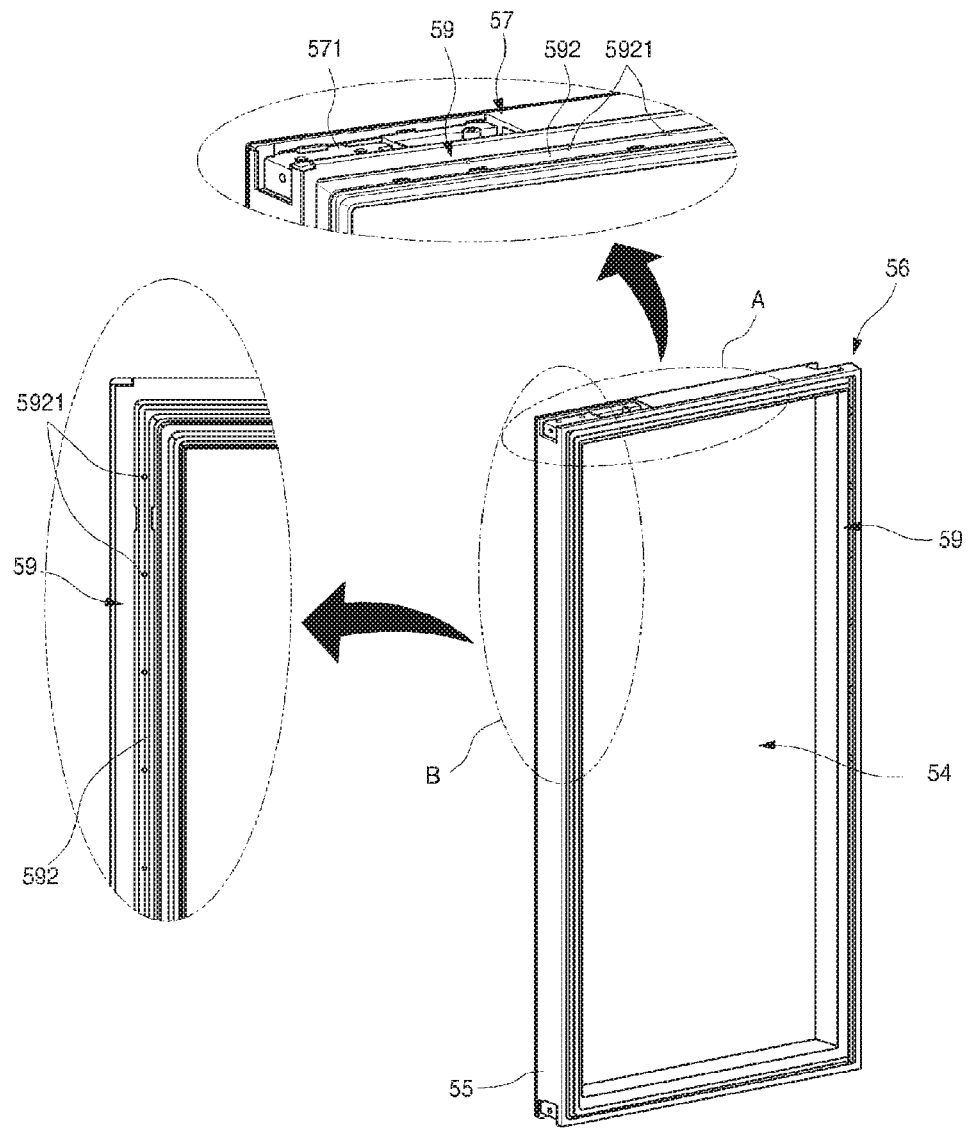

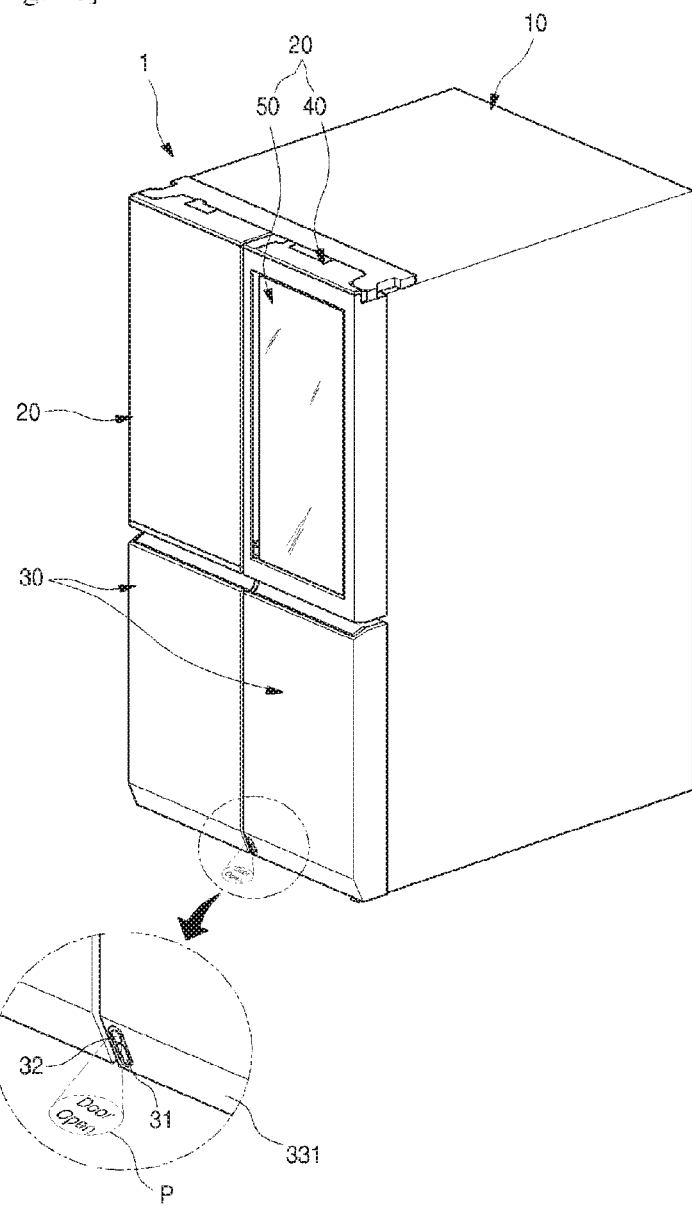
[Fig. 40]

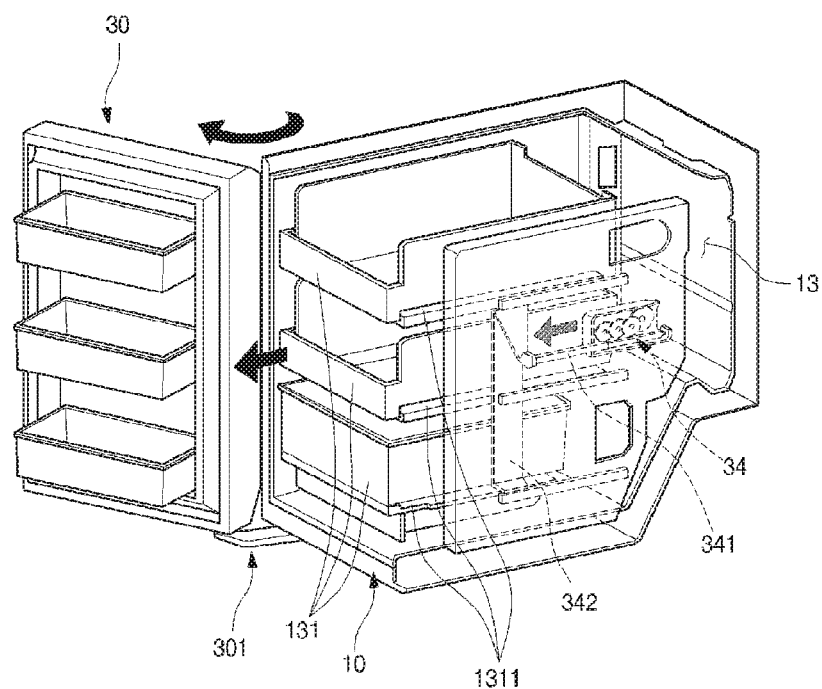
[Fig. 41]

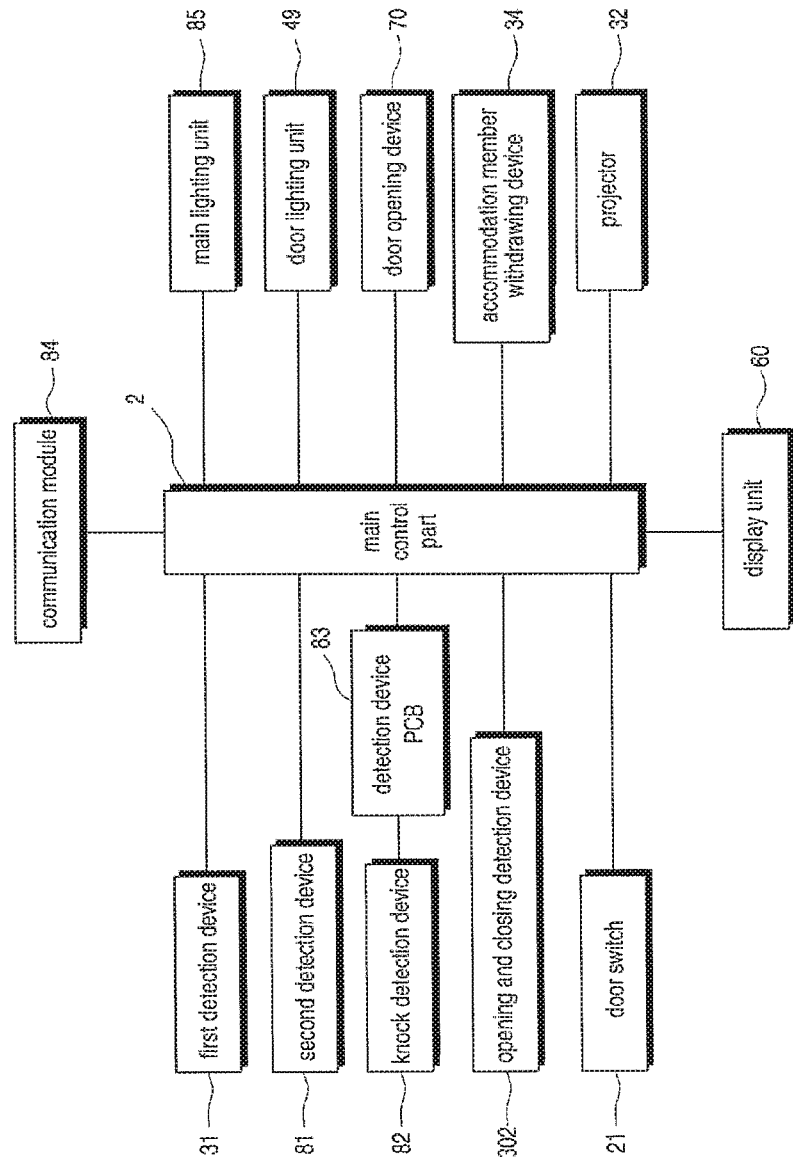
[Fig. 42]

[Fig. 43]
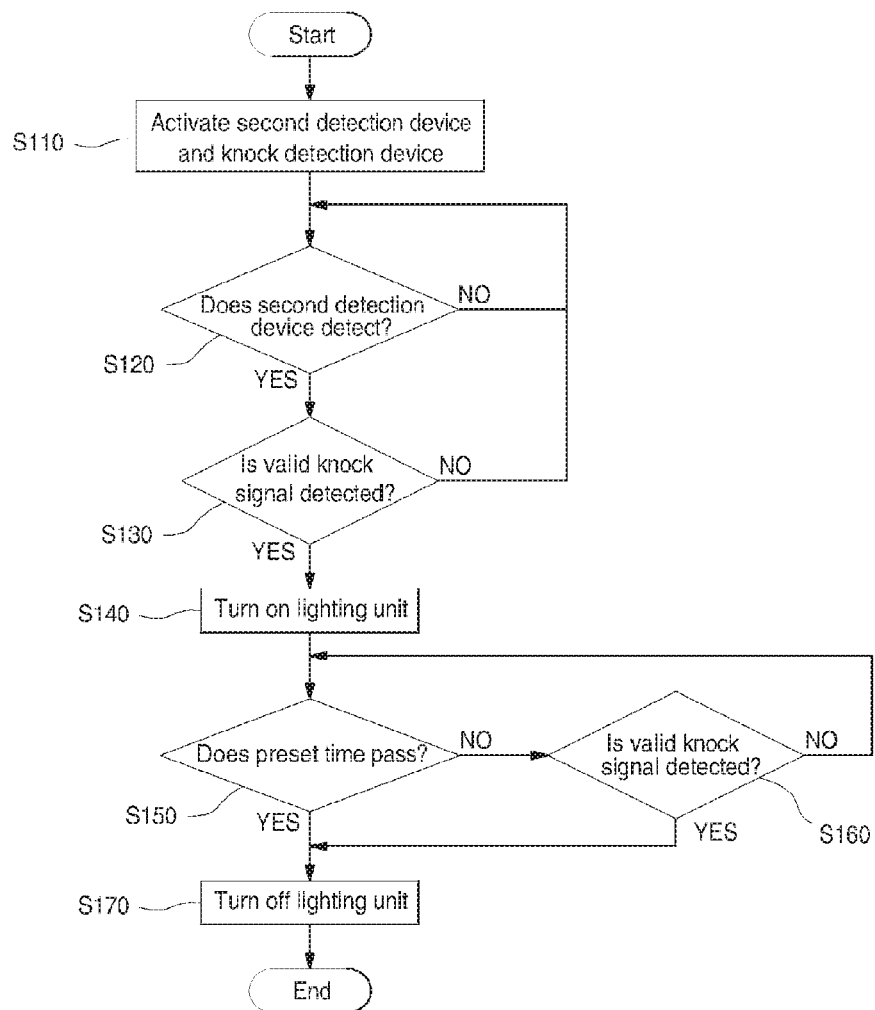

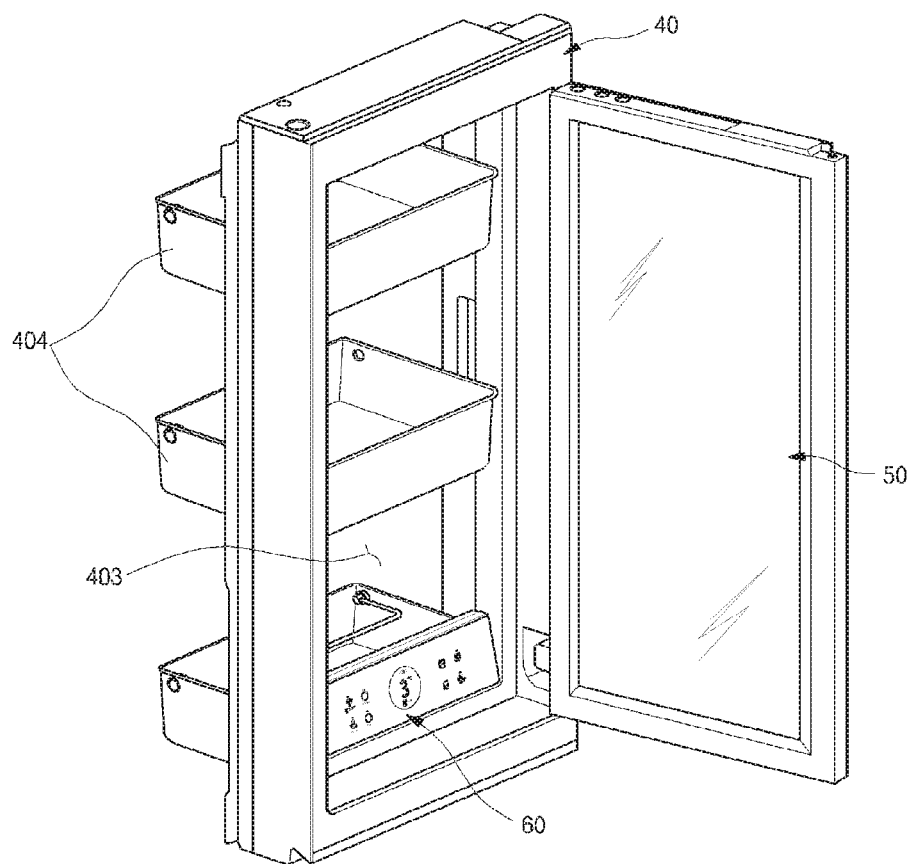
[Fig. 44]

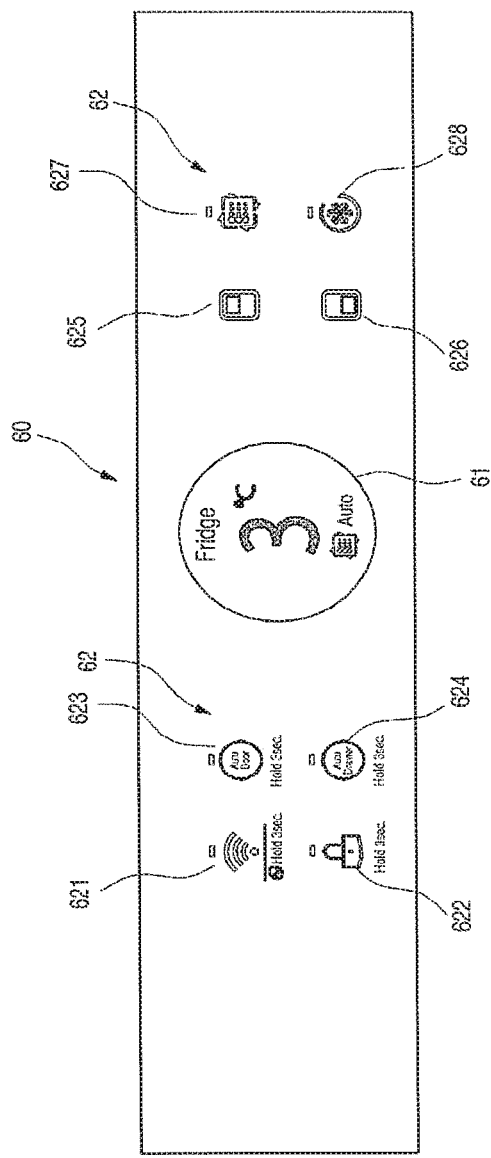
[Fig. 45]

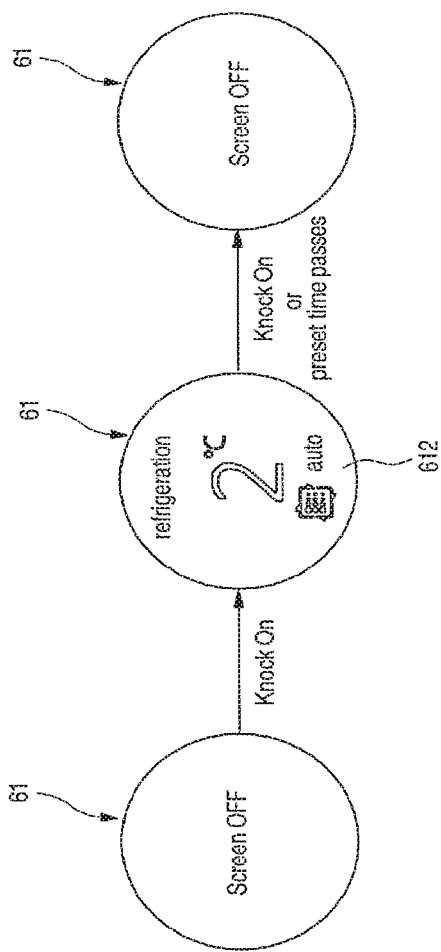
[Fig. 46]

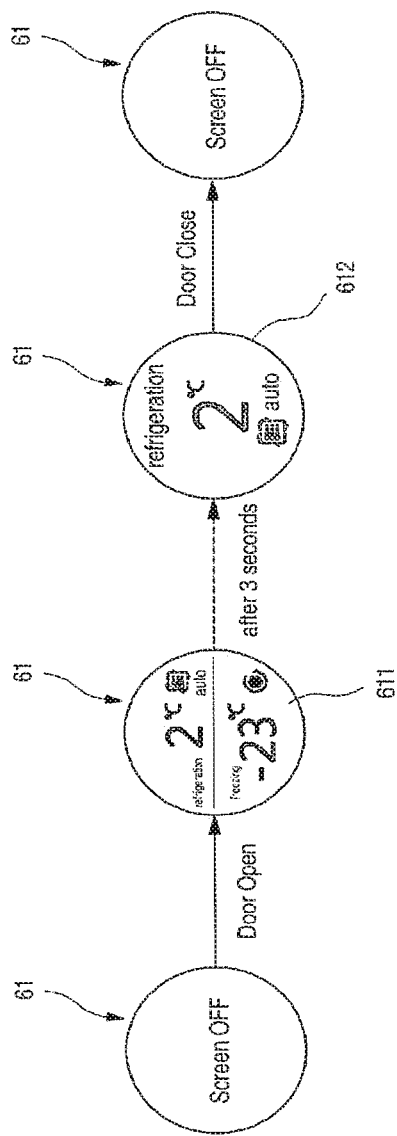
[Fig. 47]

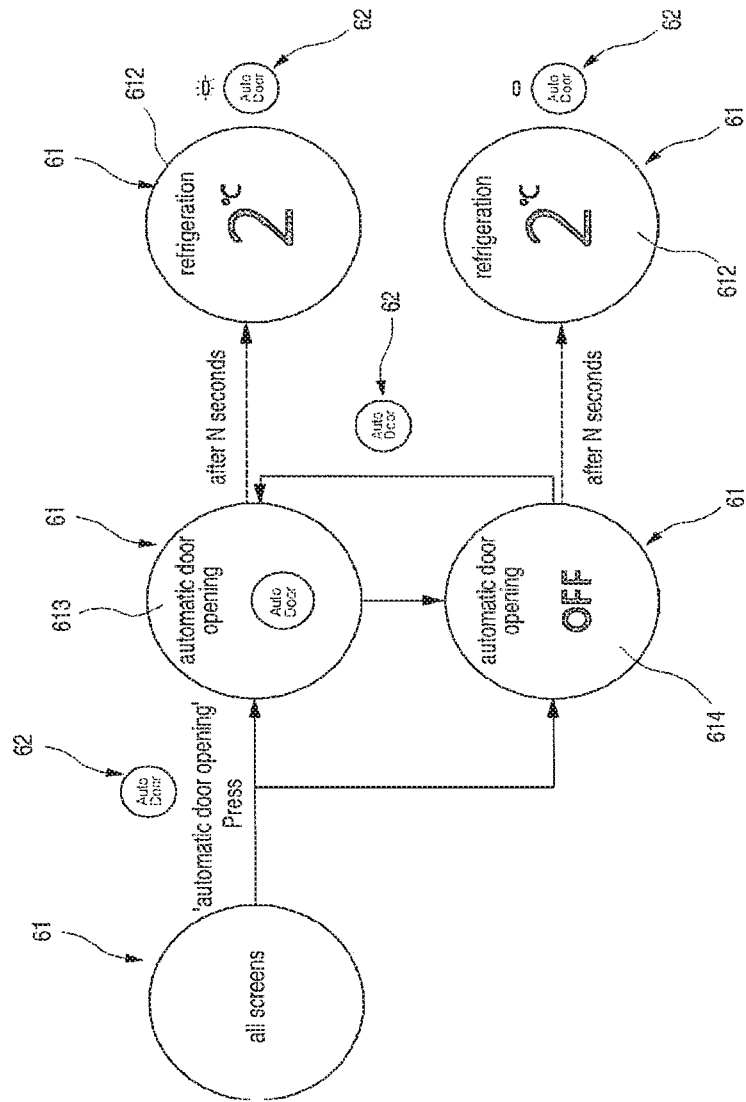
[Fig. 48]

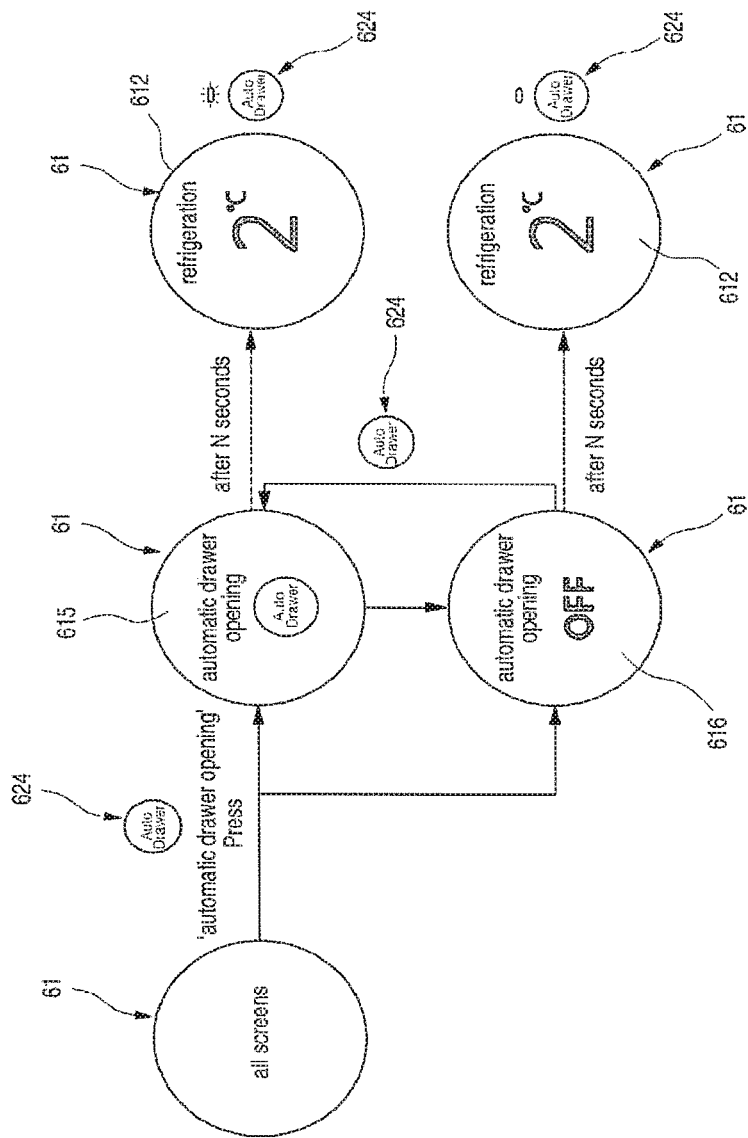
[Fig. 49]

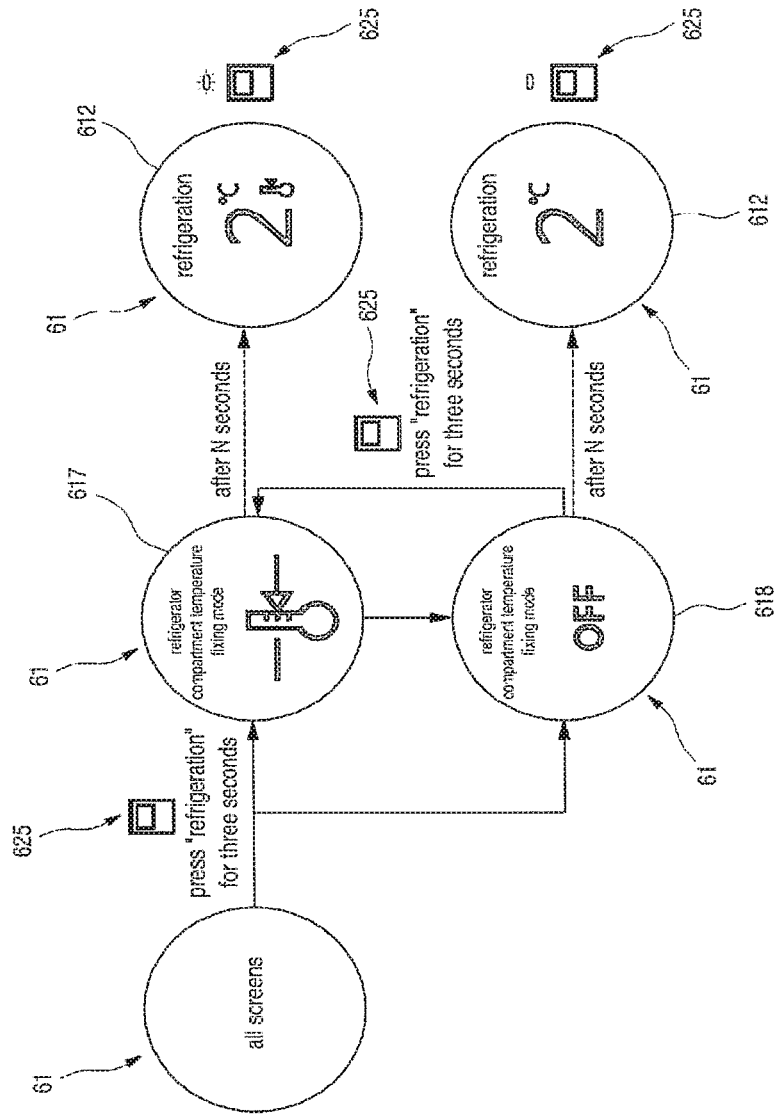

REFRIGERATOR HAVING PANEL ASSEMBLY

CROSS-REFERENCE TO RELATED PATENT APPLICATIONS

This application is a continuation of U.S. application Ser. No. 16/375,662, filed Apr. 4, 2019, which is a divisional of U.S. application Ser. No. 15/561,640 filed Sep. 26, 2017, now U.S. Pat. No. 10,295,249, issued May 21, 2019, which is a U.S. National Stage Application under 35 U.S.C. § 371 of PCT Application No. PCT/KR2016/014068, filed Dec. 1, 2016, which claims priority to Korean Patent Application No. 10-2016-0001295, filed Jan. 5, 2016, whose entire disclosures are hereby incorporated by reference.

TECHNICAL FIELD

A refrigerator and a control method thereof are disclosed herein.

BACKGROUND ART

Generally, a refrigerator is a home appliance which stores food at a low temperature in a storage space formed therein to be shielded by a door. To this end, the refrigerator is formed to cool an inside of the storage space using cooling air generated through heat exchange with a refrigerant circulated in a refrigeration cycle, and thus to keep the stored food in an optimum state.

Recent refrigerators become bigger and have multi-functions according to a change in diet and a tendency toward high-quality of a product. And the refrigerators which have various structures and devices for convenience to provide user convenience and also to enable internal spaces to be efficiently used have been released.

The storage space of the refrigerator may be opened and closed by the door. The refrigerator may be classified into various types according to an arrangement of the storage space and a structure of the door for opening and closing the storage space.

And a separate accommodation space which allows access from an outside may be provided at the door of the refrigerator. Thus, access to the accommodation space may be allowed by opening an auxiliary door or a home-bar door without opening of the entire refrigerator door.

Therefore, the food which is frequently used may be accommodated in the separate accommodation space provided at the refrigerator door. And since the entire refrigerator door is not opened to accommodate the food, a leak of the cooling air in the refrigerator may be minimized.

However, even in such a structure, there is a problem that the food inside the refrigerator may not be checked without opening the refrigerator door. That is, to check whether desired food is accommodated in the space inside refrigerator or in the separate accommodation space provided at the door, the door should be opened. And if there is not the desired food when the auxiliary door or the home-bar door is opened, there is an inconvenience that a main door should be opened, and at this point, the cooling air may leak unnecessarily.

To solve the problems, a part of a front surface of the refrigerator door may be formed of a transparent material. However, in this case, there may be a problem in insulating an inside of the refrigerator. And in the case in which the inside of the refrigerator may be seen through even while not being used, the food is exposed to an outside, and thus there may occur a problem in an external appearance.

DISCLOSURE OF INVENTION

Technical Problem

The present invention is directed to a refrigerator which enables at least a part of a refrigerator door to be selectively transparent by an user's operation, such that the user may see through an inside of the refrigerator while the refrigerator door is closed, and a control method thereof.

Also, the present invention is directed to a refrigerator in which at least a part of a front surface of a refrigerator door is formed of half glass, and a lighting unit in the refrigerator is turned on/off by a user's operation, and thus the user may selectively see through an inside of the refrigerator while the refrigerator door is closed, and a control method thereof.

Also, the present invention is directed to a refrigerator in which a refrigerator door may be selectively transparent by a knocking operation on a refrigerator door, and thus an inside of the refrigerator becomes visible, and a control method thereof.

Also, the present invention is directed to a refrigerator which is able to enhance recognition performance and reliability of an operation for selectively enabling an inside of the refrigerator to be visible through a panel assembly while a refrigerator door is closed, and a control method thereof.

Also, the present invention is directed to a refrigerator having a structure which is provided at a refrigerator door, enables a use to see through an inside of the refrigerator even while the refrigerator door is closed, and also insulates the refrigerator door.

Also, the present invention is directed to a refrigerator which enables an inside of the refrigerator to be seen through while a lighting unit is turned on by a user's operation, and forms a mirror surface while the lighting unit is turned off, thereby forming an exterior of a refrigerator door.

Also, the present invention is directed to a refrigerator which prevents exposure of a detection device detecting an operation for enabling at least a part of a refrigerator door to be selectively transparent, and expands a see-through area.

Also, the present invention is directed to a refrigerator which allows a foaming solution to be smoothly filled into a perimeter surface of the refrigerator except a see-through area, and thus maintains insulation performance.

Also, the present invention is directed to a refrigerator in which a detection device for detecting a user's operation is easily installed and assembled, and maintenance thereof is easily performed.

Also, the present invention is directed to a refrigerator which is able to prevent dew condensation on a surface of a refrigerator door formed of a glass material and enabling an inside of the refrigerator to be seen through.

Also, the present invention is directed to a refrigerator in which a sub-door is provided inside an opening part of a main door to minimize a gap between the main door and the sub-door and also to prevent interference when the door is rotated.

Also, the present invention is directed to a refrigerator in which a sub-door is easily opened and closed, and strength of an opening part is reinforced.

Also, the present invention is directed to a refrigerator which prevents a leak of cooling air due to random opening of a sub-door, and allows a reliable operation.

Solution to Problem

According to an aspect of the present invention, there is provided a refrigerator including a cabinet configured to form a storage space; a door configured to open and close the cabinet, and having an opening which is in communication with the storage space; a panel assembly provided at the opening, and having a half glass structure which allows to selectively see through an inside of the refrigerator; a knock detection device disposed to be in close contact with a rear surface of the panel assembly, and configured to detect a user's knocking operation on the panel assembly; and a lighting unit provided inside the refrigerator, and turned on or off by a signal of the knock detection device while the door is closed, such that the panel assembly selectively becomes transparent.

The refrigerator may further include a second detection device which is provided at the rear surface of the panel assembly to emit light and thus to confirm a user's approach.

The lighting unit may be turned on when detecting signals of both of the knock detection device and the second detection device are input.

A bezel which does not transmit light may be formed at an edge of the rear surface of the panel assembly, and the knock detection device may be disposed at an area of the bezel.

The panel assembly may include a front panel which forms a front surface of the sub-door, and is formed in a half mirror which is selectively transparent by reflecting a part of light and transmitting another part of the light; a plurality of insulation panels which are spaced apart from the front panel, and formed of transparent tempered glass; and a spacer bar which is provided between the front panel and the insulation panel and between the insulation panels, and spaces and seals between the front panel and the insulation panel and between the insulation panels.

The front panel may form an entire front surface of the door, and the insulation panel may be formed to have a size smaller than the front panel, and formed at an internal area of the front panel.

The knock detection device may be disposed at an edge of the front panel which extends to an outside of the insulation panel.

According to another aspect of the present invention, there is provided a refrigerator including a cabinet configured to form a storage space; a main door configured to open and close the cabinet, and having an opening part which is in communication with the storage space; a sub-door rotatably installed inside the opening part and configured to open and close the opening part; a panel assembly configured to form a front surface of the sub-door, and formed of a half glass material; a detection device provided at the sub-door, and configured to detect a user's operation; and a lighting unit provided inside the refrigerator, and turned on or off by a signal of the detection device while the sub-door is closed, such that an inside of the opening part is selectively seen through the panel assembly.

The detection device may be a knock detection device which is in close contact with a rear surface of the panel assembly and detects a user's knocking operation on the panel assembly.

The knock detection device may include a microphone module which is in contact with the rear surface of the panel assembly and receives a sound generated by vibration transmitted through the panel assembly upon a knocking operation; an elastic member which presses the microphone module toward the panel assembly; and a support member in which the elastic member is accommodated, and which is installed and fixed to an inside of the sub-door.

The microphone module may include a microphone accommodation part which is formed of an elastic material and accommodates a microphone, and an opening facing the panel assembly may be formed at the microphone accommodation part, and a protrusion which protrudes along a circumference of the opening and is in close contact with the panel assembly may be also formed.

The panel assembly may include a front panel which forms the front surface of the sub-door, and is formed in a half mirror which is selectively transparent by reflecting a part of light and transmitting another part of the light; a plurality of insulation panels which are spaced apart from the front panel, and formed of transparent tempered glass; and a spacer bar which is provided between the front panel and the insulation panel and between the insulation panels, and spaces and seals between the front panel and the insulation panel and between the insulation panels.

A bezel which does not transmit light may be formed along an edge of the front panel, and the knock detection device may be disposed at a rear surface of the bezel.

A penetration part which transmits light at an area of the bezel may be formed at the front panel, and a second detection device which emits the light, confirms a user's approach, and activates the knock detection device may be further provided at the penetration part.

A detection device accommodation part which is recessed to accommodate the knock detection device may be formed at a bottom surface of the sub-door, and the detection device accommodation part may be shielded by an accommodation part cover.

An injection port cover part which shields a foaming solution injection port through which a foaming solution is injected to form an insulation at an inside of the sub-door may be formed at the accommodation part cover.

A knock PCB which processes a knock signal detected by the knock detection device may be provided at the detection device accommodation part.

A PCB installation part to which the knock PCB is installed and fixed may be formed at the accommodation part cover.

A sub-hinge which protrudes laterally may be provided at an upper end and a lower end of the sub-door, and the sub-hinge may be inserted and rotatably coupled into a hinge hole formed at the opening part.

The sub-hinge may include a door installation part which is installed and fixed to a corner of the upper end or the lower end of the sub-door; and a hinge coupling part which extends from the door installation part and passes through the hinge hole, and the hinge coupling part may include a hinge shaft which is shaft-coupled at an inside of the main door; and a cut-away part which is recessed inward so that a part of the hinge hole is inserted when the sub-door is rotated.

A hinge installation part which is recessed so that the sub-hinge is installed therein may be formed at the upper end of the sub-door, and an electric wire hole through which an electric wire connected to the detection device passes may be formed at the hinge installation part.

A hinge cover which shields the sub-hinge from an upper side thereof, extends to an inside of the hinge hole, and forms a space between the hinge cover and the sub-hinge to guide the electric wire accommodated therein toward the main door may be provided at the hinge installation part.

A side frame which is formed of a metallic material, extends vertically and forms a side surface of the sub-door may be provided at the sub-door.

A hinge insertion part which is recessed inward so that the sub-hinge is inserted and installed therein may be formed at an upper end and a lower end of the side frame.

The front panel may form an entire exterior of the front surface of the sub-door, and may be formed larger than the insulation panel.

A first side frame which forms one side surface of the sub-door and restricts a sub-hinge rotatably supporting the sub-door at upper and lower ends of the sub-door, and a second side frame which forms another side surface of the sub-door facing the first side frame and has a handle recessed inward may be installed at both ends of a rear surface of the insulation panel.

The first side frame and the second side frame may be formed of a metallic material, and a front bent part which is bent to be in contact with a rear surface of the front panel and extends to the spacer bar may be formed at the first side frame and the second side frame, and a heater installation groove in which a sub-door heater disposed along an edge of the front panel is accommodated may be formed at the front bent part.

A bezel which is printed so as not to transmit light and formed to cover the detection device, the front bent part and the sub-door heater may be formed along the edge of the front panel.

One end of the front panel at which the second side frame is installed may be spaced apart from one end of the opening part, and the handle may be recessed from an end of the front panel.

A front surface of the main door may be formed by an outer plate formed of a stainless material, and a multi-bent part which is bent to form an inclined surface along one end of the opening part may be formed at an end of the outer plate facing the handle.

A first injection port which is opened toward between the panel assembly and the second side frame, and a second injection port which is opened to face the panel assembly may be formed at a lower end of the serve door.

A foaming solution guide part which extends toward the second side frame with a curvature and guides a flow of a foaming solution may be formed at the first injection port.

The refrigerator may further include a door restricting member which is provided at the sub-door and the main door which faces each other while the sub-door is closed, and restricts the sub-door from being unintentionally opened by an inertial three when the main door is rotated.

The door restricting member may include a first magnet which is installed inside the main door to be in contact with the opening part; and a second magnet which is installed inside the sub-door to be located on an extension line of the first magnet while the sub-door is closed, and the first magnet and the second magnet may be disposed to generate an attraction.

The sub-door may include one pair of cap decorations which are formed at a front surface of the panel assembly, disposed at an upper side and a lower side of the panel assembly, and forms an upper surface and a lower surface of the sub-door; one pair of side frames which are attached to both ends of a rear surface of the panel assembly and connect the pair of cap decorations so as to form a side surface of the sub-door; and a door liner which forms a rear surface of the sub-door, and a foaming solution may be filled in a space formed by the panel assembly, the cap decorations, the side frame and the sub-door liner, and may form an insulation.

The pair of side frames may include a first side frame in which a sub-hinge rotatably supporting the sub-door is coupled to an upper end and a lower end thereof; and a second side frame having a handle which is recessed inward.

A gasket installation groove in which a sub-door gasket which is in contact with the main door to prevent a leak of cooling air is installed may be formed at a rear surface of the door liner, and a vent hole which discharges air when the foaming solution is injected may be formed at the gasket installation groove, and the vent hole may be covered when the sub-door gasket is installed in the gasket installation groove.

A plurality of vent holes may be arranged along the gasket installation groove at regular intervals.

The vent hole may be formed at a first area which is the most distant from an injection port of the foaming solution for forming the insulation, and a second area which is connected with the first area and at which the second side frame having the handle of the sub-door is disposed.

According to still another aspect of the present invention, there is provided a method of controlling a refrigerator in which a panel assembly which is formed of a half mirror material and installed at an opening part of a door in communication with an inside of the refrigerator is provided so as to selectively see through the inside the refrigerator, including activating a knock detection device which detects a user's knocking operation at an outside of the door while the door is closed; determining whether an input signal of the knock detection device is valid; and turning on a lighting unit disposed inside the refrigerator by a main control part so as to see through the inside of the refrigerator when it is determined that the user's operation is valid.

The knock detection device may be installed at a rear surface of the panel assembly which forms an outer surface of the door, and may detect a sound of surface vibration of the panel assembly.

A detection device which detects a user's approach may be provided at the door, and the main control part may turn on the lighting unit when an input signal of the knock detection device is valid and the detection device detects the user's approach.

A module PCB which is installed together with the knock detection device and processes a signal of the knock detection device may be provided at the door, and the module PCB may determine whether a knock signal is valid.

When the knock signal input from the knock detection device is detected several times within a preset time, the knock signal may be determined as a valid signal by the module PCB.

When the module PCB determines that the knock signal is valid, the valid signal may be transmitted to the main control part.

The main control part may turn off the lighting unit when a preset time passes after the lighting unit is turned on.

The main control part may turn off the lighting unit when a valid signal is input again from the knock detection device after the lighting unit is turned on and a preset time passes.

The details of one or more implementations are set forth in the accompanying drawings and the description below. Other features will be apparent from the description and drawings, and from the claims.

Advantageous Effects of Invention

The refrigerator and the control method thereof according to the proposed embodiment of the present invention have the following effects.

In the refrigerator according to the embodiment of the present invention, the panel assembly which selectively transmits or reflects the light is provided at a part of the door, and the lighting unit which is turned on or off by the user's operation is provided inside the door, and the lighting unit can be turned on by the user's operation while the door is closed, and thus it is possible to see through the inside of the refrigerator.

Therefore, even while the door is not opened, the user can confirm the space inside the refrigerator, and also can check the position of the food, and thus the user convenience can be enhanced. Also, the door can be prevented from being unnecessarily opened and closed, and loss of the cooling air can be prevented, and thus it is possible to improve power consumption and also to enhance storage performance.

And the panel assembly has a structure like a half glass which is seen through while the lighting unit is turned on, and functions as a mirror while the lighting unit is not turned on, and thus an exterior of the refrigerator door can be enhanced.

And the microphone which detects a sound generated by the vibration upon the user's knocking operation on the panel assembly can be provided at the rear surface of the panel assembly. Therefore, the lighting unit can be turned on or off by the user's knocking operation, and thus the panel assembly can be selectively transparent.

Therefore, since the panel assembly can become transparent by the simple operation, and the sound of the vibration transmitted through the same medium is the same even though the user knocks on any positions of the front surface of the panel assembly, the operation can be easily performed, and effectively detected.

Also, the microphone module having the built-in microphone of the knock detection device is in close contact with the rear surface of the panel assembly, and thus a detection rate can be enhanced. At this point, the vibration or the sound wave having a certain wavelength generated upon the knocking on the panel assembly is recognized as the valid signal, and thus the misrecognition due to an abnormal noise like the external noise is prevented.

And the detection device PCB which determines the knock signal is disposed together with the knock detection device, and determines the valid knock signal, and transmits a determined result to the main control part inside the cabinet, and thus the efficiency and reliability in processing the signal can be enhanced by minimizing noise upon the determination of the knock signal. Also, when the signal input from the knock detection device is detected several times within the preset time, the signal is determined as the valid signal, and thus reliability of the operation can be further enhanced.

And the panel assembly includes the front panel formed of the half mirror material, and the plurality of insulation panels formed of the insulation glass, and thus thermal loss through the panel assembly can be prevented. And the spacer bar and the sealant seals between the front panel and the insulation panel and between the plurality of insulation panels, and thus an insulation space is formed, and the insulation space is in a vacuum state, or filled with an inert gas, and thus insulation performance can be further enhanced.

And since the bezel is formed at the front panel, and the knock detection device is located on the bezel, the knocking operation on the front panel can be easily recognized, and the knock detection device is prevented from being exposed to an outside, and thus an exterior can be further improved. Also, the detection device is formed at the bezel provided at the lower end of the front panel, and thus the bezel provided at another portion of the front panel can be relatively thin, and thus a see-through portion of the door can be widened.

And the foaming solution injection port for forming the insulation is formed at the lower end of the door, and the first foaming solution injection port is formed at a position of the second side frame having a relatively wide width so that the foaming solution can be directly injected toward the second side frame. And since a distance between the first side frame and the panel assembly is very narrow, and thus the foaming solution may overflow, the second foaming solution injection port is formed so that the foaming solution is injected toward an inside further than a position of the first side frame, i.e., the lower end of the panel assembly. Therefore, the foaming solution can be smoothly injected, and also can be prevented from being incompletely filled or overflowing, and thus the insulation performance can be maintained.

And the side decoration which is in contact with the front plate is formed of the metallic material such as aluminum having high thermal conductivity. The heater installation part in which the sub-door heater is installed to be in contact with the outer end of the front plate is formed at the side decoration.

Therefore, the surface temperature of the front panel at the outer portion of the spacer bar which is vulnerable to dew condensation is increased, and thus the dew condensation cart be prevented. Also, since the front bent part is formed at the side decoration, and is in close contact with the front panel, the clew condensation can be prevented from being generated along the perimeter of the front panel.

And since the knock detection device, the second detection device which detects the user's approach, and the detection device PCB are accommodated and installed at the detection device accommodation part formed to be recessed at the lower end of the door, installation, assembling and maintenance of the detection device can be easily performed.

And the sub-door which can be seen through is accommodated inside the opening part of the main door, and the upper hinge and the lower hinge extend laterally, and pass through the hinge hole of the opening part, and are rotatably installed therein.

Therefore, an interference space due to the upper hinge and the lower hinge can be prevented, and the sagging of the sub-door can also be prevented, and a gap between the opening part of the main door and the sub-door can be minimized, and thus the external appearance cart be enhanced. Also, the side supporter which supports the upper hinge and the lower hinge is formed of the metallic material, coupled to the upper hinge and the lower hinge so that the installation position thereof is maintained, and thus the interference with the opening part due to deformation of the sub-door can be prevented.

The side supporter formed of the metallic material serves to maintain a shape of the sub-door at both ends of the sub-door, and also enhances the strength of the sub-door.

And the magnet is provided at a position at which the main door faces the sub-door, and the attraction is formed between the main door and the sub-door, and thus while the sub-door is closed, the sub-door can be maintained in the closed state by the magnetic force.

Therefore, the sub-door can be prevented from being unintentionally opened due to a shock generated when the main door is closed and opened or an inertial force generated when the main door is rotated, and also loss of the cooling air and an increase in the power consumption can be prevented.

Even though all the elements of the embodiments are coupled into one or operated in the combined state, the present disclosure is not limited to such an embodiment. That is, all the elements may be selectively combined with each other without departing from the scope of the invention. Furthermore, when it is described that one comprises for includes or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled, in the art that various changes in form and details may be made therein without departing from the spirit and scope of the invention as defined by the appended claims. Therefore, the preferred embodiments should be considered in a descriptive sense only and not for purposes of limitation, and also the technical scope of the invention is not limited to the embodiments. Furthermore, the present invention is defined not by the detailed description of the invention but by the appended claims, and all differences within the scope will be construed as being comprised in the present disclosure.

BRIEF DESCRIPTION OF DRAWINGS

Embodiments will be described in detail with reference to the following drawings in which like reference numerals refer to like elements, and wherein:

FIG. 1 is a perspective view of a refrigerator according to an embodiment of the present invention;

FIG. 2 is a front view illustrating a state in which all doors of the refrigerator are opened;

FIG. 3 is a perspective view illustrating a state in which a sub-door of the refrigerator is opened;

FIG. 4 is a front view illustrating a state in which the sub-door is opaque;

FIG. 5 is a front view illustrating a state in which the sub-door is transparent;

FIG. 6 is a perspective view illustrating a state in which a main door and the sub-door of the refrigerator are coupled to each other;

FIG. 7 is an exploded perspective view illustrating a state in which the main door and the sub-door are separated;

FIG. 8 is an exploded perspective view of the main door;

FIG. 9 is an exploded, perspective view of the main door and a display unit;

FIGS. 10A and 10B are partial perspective views illustrating an installing state of the display unit;

FIG. 11 is a cross-sectional view illustrating an installed state of the display unit;

FIG. 12 is an exploded perspective view of a display assembly;

FIG. 13 is a cross-sectional view taken along line 13-13' of FIG. 1;

FIG. 14 is an exploded perspective view of an installation structure of a door opening device according to the embodiment of the present invention;

FIG. 15 is a view illustrating an operation state of the door opening device;

FIG. 16 is a cross-sectional view taken along line 16-16' of FIG. 1;

FIG. 17 is a perspective view of the sub-door;

FIG. 18 is an exploded perspective view of the sub-door when being seen from a front;

FIG. 19 is an exploded perspective view of the sub-door when being seen from a rear;

FIG. 20 is a cut-away perspective view taken along line 20-20' of FIG. 17;

FIG. 21 is an exploded perspective view of a panel assembly according to the embodiment of the present invention;

FIG. 22 is a cross-sectional view schematically illustrating an example of a front panel of the panel assembly;

FIG. 23 is a cross-sectional view schematically illustrating another example of the front panel of the panel assembly;

FIG. 24 is a cross-sectional view schematically illustrating still another example of the front panel of the panel assembly;

FIG. 25 is a cross-sectional view of the sub-door;

FIG. 26 is an exploded perspective view illustrating a coupling structure of the sub-door and an upper hinge;

FIG. 27 is a partial perspective view illustrating an installed state of the upper hinge;

FIG. 28 is a longitudinal cross-sectional view illustrating a coupling structure of the upper hinge;

FIG. 31 is an exploded perspective view illustrating a coupling structure of the knock detection device and the second detection device of the sub-door when being seen from a lower side;

FIG. 32 is an exploded perspective view of the knock detection device;

FIG. 33 is a cross-sectional view taken along line 33-33' of FIG. 17;

FIG. 34 is a cross-sectional view of a microphone module of the knock detection device;

FIG. 35 is an exploded perspective view illustrating a coupling structure of the second detection device;

FIG. 36 is a partial perspective view illustrating an installed state of the second detection device:

FIG. 37 is a view illustrating an electric wire arrangement inside the sub-door;

FIG. 38 is a perspective view illustrating a state in which a foaming solution is injected into the sub-door;

FIG. 39 is a view illustrating an arrangement of a vent hole of the sub-door;

FIG. 40 is a perspective view illustrating an operation state of a projector of the refrigerator;

FIG. 41 is a cut-away perspective view illustrating an internal structure of a freezer compartment of the refrigerator;

FIG. 42 is a block diagram illustrating a flow of a control signal of the refrigerator;

FIG. 43 is a flowchart sequentially illustrating an operation of the sub-door of the refrigerator;

FIG. 44 is a perspective view illustrating an installed state of the display unit;

FIG. 45 is a view illustrating a configuration of a front surface of the display unit;

FIG. 46 is a view illustrating a change in a display state of the display unit according to a knocking operation;

FIG. 47 is a view illustrating the change in the display state when the sub-door is opened and closed;

FIG. 48 is a view illustrating the change in the display state of the display unit when an auto-door function is set;

FIG. 49 is a view illustrating the change in the display state of the display unit when an auto-drawer function is set; and FIG. 50 is a view illustrating the change in the display state of the display unit when a temperature fixing function is set.

MODE FOR THE INVENTION

Figure 29:
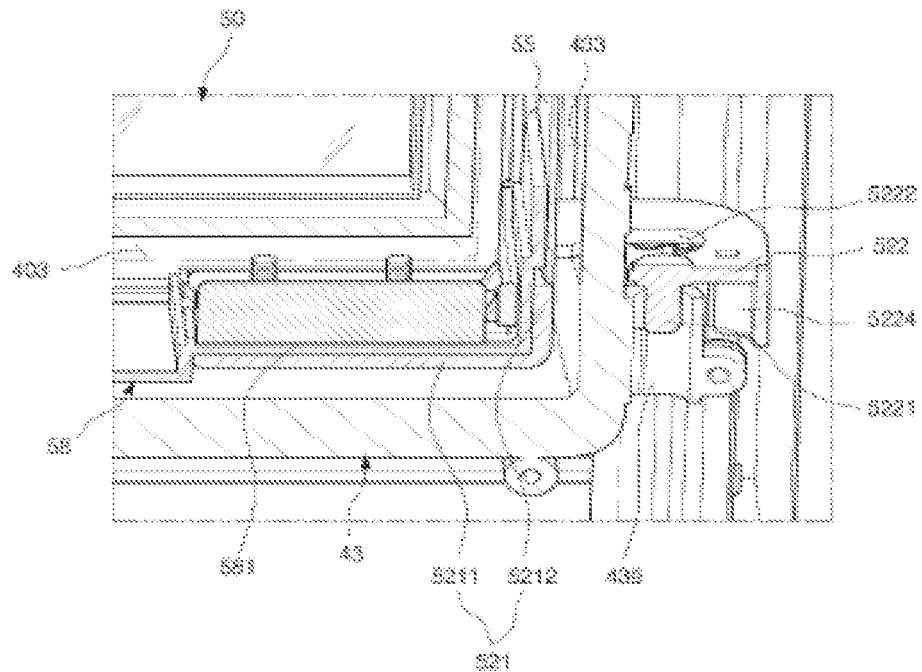
FIG. 29 is a longitudinal cross-sectional view illustrating a coupling structure of the sub-door and a lower hinge.

Hereinafter, exemplary embodiments of the present invention will be described in detail with reference to the accompanying drawings. However, The invention may, however, be embodied in many different forms and should not be construed as being limited to the embodiments set forth herein; rather, alternative embodiments included in other retrogressive inventions or falling within the spirit and scope of the present disclosure can easily be derived through adding, altering, and removing, and will fully convey the concept of the invention to those skilled in the art.

FIG. 1 is a perspective view of a refrigerator according to an embodiment of the present invention. And FIG. 2 is a front view illustrating a state in which all doors of the refrigerator are opened. And FIG. 3 is a perspective view illustrating a state in which a sub-door of the refrigerator is opened.

As illustrated in the drawings, an external appearance of a refrigerator 1 according to an embodiment of the present invention may be formed by a cabinet 10 which forms a storage space and a door which opens and closes the storage space.

An inside of the cabinet 10 may be divided up and down by a barrier 11, and a refrigerator compartment 12 may be formed at an upper portion of the cabinet 10, and a freezer compartment 13 may be formed at a lower portion of the cabinet 10. And various accommodation members 121 such as a shelf, a drawer and a basket may be provided inside the refrigerator compartment 12. If necessary, the accommodation members 121 may be inserted and withdrawn while the door is opened, and may accommodate and store food by the inserting and withdrawing.

A main lighting unit 85 which illuminates the refrigerator compartment 12 may be provided at the refrigerator compartment 12. The main lighting unit 85 may also be disposed at the freezer compartment 13, and may also be disposed at any positions of an inner wall surface of the refrigerator 1.

A drawer type freezer compartment accommodation member 131 which is inserted and withdrawn may be mainly disposed inside the freezer compartment 13. The freezer compartment accommodation member 131 may be formed to be inserted and withdrawn, interlocking with opening of a freezer compartment door 30. And a first detection device 31 which detects a user's body may be provided at a front surface of the freezer compartment door 30. Detailed description of the first detection device 31 will be described again below.

The door may include a refrigerator compartment door 20 and the freezer compartment door 30. The refrigerator compartment door 20 serves to open and close an opened front surface of the refrigerator compartment 12 by rotation, and the freezer compartment door 30 serves to open and close an opened front surface of the freezer compartment 13 by rotation. And one pair of refrigerator compartment doors 20 and one pair of freezer compartment doors 30 may be provided, left and right to shield the refrigerator compartment 12 and the freezer compartment 13, respectively.

A plurality of door baskets may be provided at the refrigerator compartment door 20 and the freezer compartment door 30. The door baskets may be provided so as not to interfere with the accommodation members 121 and 131 while the refrigerator compartment door 20 and the freezer compartment door 30 are closed.

The refrigerator compartment door 20 and the freezer compartment door 30 forms an entire exterior when being seen from a front. And the exterior of each of the refrigerator compartment door 20 and the freezer compartment door 30 may be formed of a metallic material, and the entire refrigerator 1 may have a metallic texture. And if necessary, a dispenser which dispenses water or ice may be provided at the refrigerator compartment door 20.

Meanwhile, the embodiment of the present invention describes an example in which a French type door opening and closing one space by rotating one pair of doors is applied to a bottom freezer type refrigerator having the freezer compartment provided at a lower side thereof. However, the present invention may be applied to all types of refrigerators having the door.

Meanwhile, a right one (in FIG. 1) of the pair of refrigerator compartment doors 20 may be formed to be doubly opened and closed. Specifically, the right refrigerator compartment door 20 may include a main door 40 which is formed of the metallic material to open and close the refrigerator compartment 12, and a sub-door 50 which is rotatably disposed inside the main door 40 to open and close an opening of the main door 40.

The main door 40 may be formed to have the same size as that of a left one (in FIG. 1) of the pair of refrigerator compartment doors 20, may be rotatably installed at the cabinet 10 by a main hinge 401 and a middle hinge 402, and thus may open and close a part of the refrigerator compartment 12.

And an opening part 403 is formed at the main door 40. A door basket 404 is installed at a rear surface of the main door 40 including an inside of the opening part 403. Therefore, a user may have access to the door basket 404 through the opening part 403 without opening of the main door 40. At this point, a size of the opening part 403 may correspond to most of a front surface of the main door 40 except a part of a perimeter of the main door 40.

The sub-door 50 is rotatably installed inside the opening part 403, and opens and closes the opening part 403. And at least a part of the sub-door 50 is formed of a transparent material like glass. Therefore, access to the opening part 403 is allowed through opening of the sub-door 50, and even while the sub-door 50 is closed, it is also possible to see through the inside of the opening part 403. The sub-door 50 may be referred to as a see-through door.

Meanwhile, the glass material forming the sub-door 50 may be formed to be selectively changed into a transparent or opaque state by controlling a light transmittance and a reflectivity thereof according to a user's operation. Therefore, the glass material becomes transparent so that an inside of the refrigerator 1 is visible, only when the user wants, and otherwise, is maintained in the opaque state.

FIG. 4 is a front view illustrating a state in which the sub-door is opaque.

As illustrated in the drawing, when there are not any operations in the refrigerator while all of the main door 40 and the sub-door 50 are closed, the sub-door 50 may have an opaque black color or may be in a state like a mirror surface. Therefore, the sub-door 50 may not enable an internal space of the sub-door 50, i.e., an accommodation space of the main door 40 and an internal space of the refrigerator compartment 12 to be visible.

Therefore, the sub-door 50 may be maintained in a state having the black color, and thus may provide a beautiful and simple exterior having a mirror-like texture to the refrigerator 1. Also, the exterior may harmonize with the metallic texture of the main door 40, the refrigerator compartment door 20 and the freezer compartment door 30, and thus may provide a more luxurious image.

FIG. 5 is a front view illustrating a state in which the sub-door is transparent.

As illustrated in the drawing, in a state in which all of the main door 40 and the sub-door 50 are closed, the sub-door 50 may be transparent by a user's certain operation. When the sub-door 50 is in the transparent state, the accommodation space of the main door 40 and the internal space of the refrigerator compartment 12 may be visible. Therefore, the user may confirm an accommodation state of food in the accommodation space of the main door 40 and the internal space of the refrigerator compartment 12 without opening of the main door 40 and the sub-door 50.

Also, when the sub-door 50 is in the transparent state, a display unit 60 disposed at a rear of the sub-door 50 is in a visible state, and an operation state of the refrigerator 1 may be displayed to an outside.

A specific operating method and configuration for enabling the accommodation space of the main door 40 and the internal space of the refrigerator compartment 12 to be visible will be described below in detail.

FIG. 6 is a perspective view illustrating a state in which the main door and the sub-door of the refrigerator are coupled to each other. And FIG. 7 is an exploded perspective view illustrating a state in which the main door and the sub-door are separated. And FIG. 8 is an exploded perspective view of the main door.

As illustrated in the drawings, an external appearance of the main door 40 may be formed by an outer plate 41 which is formed of a metallic material, a door liner 42 which is coupled to the outer plate 41, and door cap decorations 45 and 46 which are provided at upper and lower ends of the outer plate 41 and the door liner 42.

The outer plate 41 may be formed of a plate-shaped stainless material, and may be formed to be bent and thus to form a part of a front surface and a perimeter surface of the main door 40.

The door liner 42 may be injection-molded with a plastic material, and forms the rear surface of the main door 40. And the door liner 42 may also be formed so that an area thereof corresponding to the opening part 403 is opened. The opening part 403 may have a plurality of uneven structures so that the door basket 404 is installed.

A rear gasket 44 may be provided at a perimeter of a rear surface of the door liner 42. The rear gasket 44 is in close contact with a perimeter of the cabinet 10, and prevents a leak of cooling air between the main door 40 and the cabinet 10.

And a door lighting unit 49 which illuminates the inside of the opening part 403 may be provided at an upper surface of the door liner 42. The door lighting unit 49 may emit light downward from an upper side of the opening part 403, and thus may illuminate the entire opening part 403 including the door basket 404, and may also enable the sub-door 50 to be in the transparent state.

The cap decorations 45 and 46 form an upper surface and a lower surface of the main door 40, and a hinge installation part 451 which enables the main door 40 to be rotatably installed at the cabinet 10 may be formed at each of the cap decorations 45 and 46. An upper end of the main door 40 may be coupled to the main hinge 401, and a lower end of the main door 40 may be coupled to the middle hinge 402, and thus the upper and lower ends of the main door 40 may be rotatably supported.

And a door handle 462 may be formed to be recessed from the lower surface of the main door 40, i.e., the cap decoration 46. The user may put a hand into the door handle 462, may rotate the main door 40, and thus may open and close the refrigerator compartment 12.

Meanwhile, a door frame 43 may be further provided between the outer plate 41 and the door liner 42. The door frame 43 may be coupled between the outer plate 41 and the door liner 42, and may form a perimeter of the opening part 403.

In a state in which the outer plate 41, the door liner 42, the door frame 43, and the cap decorations 45 and 46 are coupled with each other, a foaming solution may be filled inside an internal space of the main door 40, and thus an insulation may be formed therein. That is, the insulation may be disposed at a perimeter area of the opening part 403, and thus isolate a space inside the refrigerator 1 from a space outside the refrigerator 1.

The door frame 43 may be injection-molded with a plastic material which is different from that of the door tinier 42. If necessary, the door frame 43 may be integrally formed with the door liner 42, and may be directly coupled to the outer plate 41.

A frame stepped part 431 which protrudes inward may be formed at an inner surface of the door frame 43. Therefore, when the sub-door 50 is closed, the frame stepped part 431 may support the sub-door 50.

A front gasket 434 may be provided at the frame stepped part 431. The front gasket 434 is in contact with a rear surface of the sub-door 50 when the sub-door 50 is closed, and thus seals between the main door 40 and the sub-door 50. Of course, the front gasket 434 may be omitted, if necessary. Also, the front gasket 434 may be formed in a sheet shape formed of a metallic material, and may also be formed to be in close contact with a sub-door gasket 591 having a magnetic force by the magnetic force.

A frame heater 4321 may be provided at a rear surface of the frame stepped part 431. The frame heater 4321 is disposed along the frame stepped part 431, and heats the frame stepped part 431. The frame stepped part 431 may have a relatively low surface temperature due to an influence of cooling air in the refrigerator 1. Therefore, dew condensation may occur on a surface of the frame stepped part 431. The dew condensation may be prevented by driving of the frame heater 4321.

A hinge hole 433 in which each of sub-hinges 51 and 52 for installing the sub-door 50 is installed is formed at each of both sides of the door frame 43. The hinge hole 433 is formed at a position which faces a side surface of the sub-door 50, and also formed so that each of the sub-hinges 51 and 52 is inserted therein.

Meanwhile, a hinge case 47 may be provided at the inner surface of the door frame 43 (which is in contact with the insulation) corresponding to the hinge hole 433. The hinge case 47 is formed by vertically coupling a first case 471 and a second case 472 to each other. The hinge case 47 forms a space which rotatably accommodates a part of each of the sub-hinges 51 and 52 inserted through the hinge hole 433 when the first case 471 and the second case 472 are coupled to each other.

A hinge installation member 473 is provided at a recessed space of the hinge case 47. The hinge installation member 473 may be fixed by the coupling of the first case 471 and the second case 472. The hinge installation member 473 may be formed of a steel material, and may have a shaft insertion part 4731 in which a hinge shaft of each of the sub-hinges 51 and 52 is inserted.

The hinge case 47 may be installed at the hinge hole 433 which is formed at each of upper and lower portions of the door frame 43. And the hinge cases 47 which are disposed up and down may be formed to have the same structure and shape.

Meanwhile, a hinge frame 48 may be provided at an outside of the door frame 43. The hinge frame 48 is formed to vertically extend, and fixes the hinge cases 47 which are disposed up and down.

Specifically, the hinge frame 48 may be formed of a metallic material or a plastic material having excellent strength, may be formed in a plate shape, and may be formed to vertically extend. An upper end 482 and a lower end 483 of the hinge frame 48 may be bent, and then may be coupled and fixed to the cap decorations 45 and 46 provided at the upper and lower ends of the main door 40. That is, the upper end 482 and the lower end 483 of the hinge frame 48 are fixed to the cap decorations 45 and 46, and thus an installation position thereof may be maintained, and also the hinge frame 48 indirectly supports the sub-hinges 51 and 52.

A case fixing part 481 may be formed at each of upper and lower portions of the hinge frame 48. The case fixing part 481 may be formed by cutting away a part of the hinge frame 48. Therefore, a portion of the hinge case 47 which forms the recessed space may be accommodated and fixed into the cut-away case fixing part 481 of the hinge frame 48. At this point, the hinge case 47 may be coupled to the hinge frame 48 by a separate fastening member such as a screw.

A frame reinforcing part 484 may be formed between the case fixing parts 481, which are formed at the upper and lower portions of the hinge frame 48, to be recessed. And a plurality of frame openings 485 may be formed at the frame reinforcing part 484. The frame reinforcing part 484 may reinforce strength of the hinge frame 48, may prevent the hinge frame 48 from being bent or deformed, and may also maintain an installation position of the hinge case 47.

And when the foaming solution is injected into the main door 40, a surface area is increased, and thus adhesion with the foaming solution is enhanced. Also, the foaming solution may pass through the frame openings 485, and thus flowability of the foaming solution may be improved. When the insulation is molded, the hinge frame 48 may be buried and fixed in the insulation.

The sub-hinges 51 and 52 may include an upper hinge 51 which is installed at an upper end of the sub-door 50 and a lower hinge 52 which is installed at a lower end of the sub-door 50. And the upper hinge 51 and the lower hinge 52 may extend laterally toward the hinge hole 433, and may be coupled at an inside of the main door 40.

Therefore, the sub-hinges 51 and 52 may be installed at accurate positions, and may have a structure which extends laterally. Accordingly, since there is not an interfering structure with the sub-hinges 51 and 52 at a gap between the main door 40 and the sub-door 50, a distance between the main door 40 and the sub-door 50 may be maintained in a very narrow state, and the exterior may be further enhanced. Also, since the distance between the main door 40 and the sub-door 50 is maintained in the very narrow state, and deflection of the sub-door 50 is effectively prevented, the interference with the main door 40 upon the rotation of the sub-door 50 may be prevented.

And a hinge cover 53 which shields the upper hinge 51 and guides access of an electric wire of the sub-door 50 may be further provided at an upper side of the upper hinge 51.

FIG. 9 is an exploded perspective view of the main door and the display unit. And FIGS. 10A and 10B are partial perspective views illustrating an installing state of the display unit.

As illustrated in the drawings, the display unit 60 may be provided at the opening part 403 of the main door 40. The display unit 60 serves to display an operation state of the refrigerator 1 and also to operate the refrigerator 1, and is formed so that the user recognizes through the sub-door 50 from an outside when the sub-door 50 is in the transparent state. That is, the display unit 60 is not visible from the outside while the sub-door 50 is in the opaque state, but may indicate a variety to information to the outside while the sub-door 50 is in the transparent state.

Or course, the display unit 60 may include a display 61 which displays state information of the refrigerator 1, and various operating buttons 62 which set the operation of the refrigerator 1. The operation of the refrigerator 1 may be operated by the operating buttons 62.

The display unit 60 may be separably provided at a lower end of the opening part 403. Therefore, when it is necessary to check or repair the display unit 60, the display unit 60 may be separated. And after the main door 40 is assembled, the display unit 60 which is assembled as a separate module may be simply installed. Also, the display unit 60 which has a necessary function according to a specification of the refrigerator 1 may be selectively installed.

To install and separate the display unit 60, a display installing protrusion 435 is formed at both inner side surfaces of the opening part 403. And a display connection part 436 for electrical connection with the display unit 60 may be provided at the lower end of the opening part 403.

The display installing protrusion 435 may be formed by protruding a side surface of the opening part 403, more specifically, a part of the door liner 42 and a part of the door frame 43. That is, the display installing protrusion 435 is formed by coupling a liner side installation part 4352 and a frame side installation part 4351 to each other, and may be formed in a protrusion shape having a circular cross section. Therefore, when the display unit 60 is installed, the display installing protrusion 435 is maintained in an installed state, and thus coupling between the door liner 42 and the door frame 43 may be more firmly maintained. A plurality of display installing protrusions 435 may be formed and may be arranged vertically.

The display installing protrusion 435 has a structure which is matched with a display guide 634 formed at both of left and right side surfaces of the display unit 60. The display guide 634 has a structure which is opened downward. Therefore, when the display unit 60 is moved downward from an upper side, the display installing protrusion 435 and the display guide 634 are coupled to each other. And in a state in which the display unit 60 is installed, the display unit 60 may be seated and fixed to the lower end of the opening part 403.

The display connection part 436 may be formed at a bottom surface of the door liner 42. The display connection part 436 may be formed to be recessed or stepped downward, and may be formed so that at least a part of the display unit 60 is inserted therein when the display unit 60 is installed.

And a door connector 4361 may be provided at the display connection part 436. The door connector 4361 may be connected with an electric wire which supplies electric power for an operation of the display unit 60 and transmits a signal, and may be electrically connected with the display unit 60 by a separable structure of the display 61.

That is, the door connector 4361 protrudes upward from a bottom surface of the display connection part 436, and may be coupled and electrically connected to a display connector 651 provided at a bottom of the display unit 60 when the display unit 60 is installed.

A plurality of door connectors 4361 may be provided, and may be formed separately according to functions of the display unit 60. That is, the door connectors 4361 may be independently formed corresponding to the display 61 and the operating buttons 62 of the display unit 60, and may also be formed so that the separate electric power and signal are transmitted to each of them.

Meanwhile, a case extension part 635 is formed at a lower end of a rear surface of the display unit 60. And a screw hole 6351 in which a screw is fastened is formed at the case extension part 635, and thus the display unit 60 may be maintained in a coupled state to the main door 40.

FIG. 11 is a cross-sectional view illustrating an installed state of the display unit. And FIG. 12 is an exploded perspective view of a display assembly.

As illustrated in the drawings, the display unit 60 may include an outer case 63 which forms an external appearance, an inner case 64 which is provided inside the outer case 63, a display PCB 65 and a display cover 66.

The outer case 63 forms an entire exterior of the display unit 60, and has an accommodation space formed therein to accommodate the inner case 64.

The accommodation space is opened forward, and a connector opening 631 for coupling to the door connector 4361, through which the electric wire connected to the display connector 651 passes, may be formed at a bottom surface of the accommodation space. The display connector 651 may be provided at a lower side of the connector opening 631, and if necessary, the display connector 651 may be fixed to the connector opening 631.

Therefore, when the display unit 60 is installed, at the opening part 403 of the main door 40, the display connector 651 and the door connector 4361 may be coupled and connected to each other by moving the display unit 60 up and down. By such a connection, the power supplying and the signal transmitting to the display unit 60 may be enabled.

A plurality of case coupling protrusions 632 which protrude to be coupled to the inner case 64 are formed at inner upper and lower ends of the accommodation space. The case coupling protrusions 632 may be formed at an opened entrance side of the accommodation space, and may be formed at regular intervals.

A case support part 633 which supports the inner case 64 is formed to protrude inward from both of left and right sides of an inner surface of the accommodation space. A screw hole 6331 in which a screw is inserted may be further formed at the case support part 633, and the inner case 64 may be installed and fixed to the case support part 633.

The display guide 634 is formed at both of left and right side surfaces of the outer case 63. The display guide 634 may be formed in a rib shape which protrudes from both of the left and right side surfaces of the outer case 63. And the display guide 634 is formed to be opened downward, and the display installing protrusion 435 may be inserted through an opened lower side thereof.

The display guide 634 is formed so that a width thereof becomes narrower upward from an opened entrance 6343 thereof. An upper end 6341 of the display guide 634 may be formed to have the same size as a diameter of the display installing protrusion 435. Therefore, the display installing protrusion 435 may be easily inserted into the display guide 634, and may be restricted by the upper end 6341 of the display guide 634.

Also, a fixing part 6342 which protrudes inward is further formed at the display guide 634. A distance between the fixing parts 6342 may be formed somewhat smaller than the diameter of the display installing protrusion 435. Therefore, the display guide 634 may be elastically deformed while passing through the fixing part 6342, and may be fitted and fixed when being moved to the upper end 6341 of the display guide 634.

The inner case 64 may be injection-molded with a plastic material, and may provide a space in which the display PCB 65 is installed. A center of the inner case 64 is formed to be recessed with a size corresponding to the display PCB 65, and a plurality of case coupling grooves 641 are formed at a perimeter of the inner case 64, and the case coupling protrusion 632 is coupled therein.

A case seating part 642 which extends laterally and is seated on the case support part 633 is formed at both side surfaces of the inner case 64. The inner case 64 is coupled to the outer case 63 by a screw fastened into a screw hole 6421 of the case seating part 642.

A case hole 643 is formed at one side surface of the inner case 64. The case hole 643 serves as a passage of the electric wires connected to the display PCB 65, and the electric wires may pass through the case hole 643, and may be connected to the display connector 651 through the connector opening 631.

The display PCB 65 may be accommodated in a space formed inside the inner case 64. The display 61 and the plurality of operating buttons 62 may be installed at the display PCB in the form of a module. And elements on the display PCB 65 may be covered and sealed with a resin material for waterproofing and moisture-proofing.

The display 61 may be formed in a panel type which displays the operation slate and operation information of the refrigerator 1. And the plurality of operating buttons 62 may be provided at both of left and right sides of the display 61, and may be formed to be operated by a user's operation which pushes the display cover 66.

While the display PCB 65 is installed at the inner case 64, the inner case 64 is accommodated inside the outer case 63, and the display 61 is coupled so as to shield an opening of the outer case 63. Therefore, the display PCB 65 and the inner case 64 may be shielded by the display 61.

The display cover 66 may be formed to have a size corresponding to an opened front surface of the outer case 63. Therefore, the display cover 66 may form an exterior of a front surface of the display unit 60. And a center of the display cover 66 is formed so that information output from the display 61 is projected therethrough. The display 61 may be exposed through an opening of the display cover 66, or may be exposed to an outside by forming a part of the display cover 66 to be transparent.

The plurality of operating buttons 62 may be provided at both of the left and right sides of the display 61. The plurality of operating buttons 62 may also be correspondingly indicated on both sides of the display cover 66. The operating buttons 62 indicated on the display cover 66 are not actual operating buttons 62, but are indicated at corresponding positions, and may be touched or pushed by the user.

A case fixing member 661 which installs and fixes the display cover 66 is formed to protrude from both of left and right side ends of the display cover 66. An end of the case fixing member 661 may be formed in a hook shape, and may be hooked and restricted by a case restricting groove 636 formed at both side surfaces of the outer case 63, and thus the display cover 66 may be installed and fixed.

FIG. 13 is a cross-sectional view taken along line 13-13' of FIG. 1.

As illustrated in the drawing, the door lighting unit 49 may be provided at an upper portion of the main door 40. The door lighting unit 49 may be formed at a space between the door liner 42 and the door frame 43. Of course, an installation position of the door lighting unit 49 is not limited, and may be formed at one of the door liner 42 and the door frame 43, and may be disposed at a position which illuminates the inside of the opening part 403.

The door lighting unit 49 may include a lamp case 491 which is installed inside the main door 40, a lamp PCB 492 which is provided at one side of the lamp case 491 and at which a plurality of LEDs 4921 are disposed, and a lamp cover 493 which shields art opened surface of the lamp case 491 and is exposed through the opening part 403.

The lamp cover 493 is formed to extend long along the door liner 42, and includes a recessed part 4914 which forms a recess space therein to accommodate the lamp PCB 492. Specifically, a surface of the recessed part 4914 which faces the lamp PCB 492 may be formed to be rounded, and light emitted from the lamp PCB 492 is reflected by a rounded surface 4915 having a predetermined curvature, and directed to the lamp case 491. A film which increases the reflectivity of the light may be attached to or coated on an inner surface of the recessed part 4914, particularly, the rounded surface 4915.

A lamp PCB installation part 4913 at which the lamp PCB 492 is installed is formed at one surface which faces the rounded surface 4915. The lamp PCB installation part 4913 enables the lamp PCB 492 to be installed and fixed in a direction perpendicular to the lamp cover 493. At this point, the lamp PCB installation part 4913 and the lamp PCB 492 are located above the door frame 43 so as to be covered by an end of the door frame 43 when being seen from a lower side. Therefore, the LEDs 4921 may be covered by the end of the door frame 43 without an additional bezel, and thus a phenomenon in which the light looks as if forming a lump may be prevented.

A first case installation part 4911 and a second case installation part 4912 are formed at both ends of the recessed part 4914. The first case installation part 4911 and the second case installation part 4912 are installed to be in surface contact with inner side surfaces of the door liner 42 and the door frame 43, respectively, and thus the lamp case 491 may be hooked and restricted or adhered inside the main door 40.

And cover insertion grooves 4916 and 4917 may be formed at the first case installation part 4911 and the second case installation part 4912. The cover insertion grooves 4916 and 4917 may be formed to be stepped, and thus a space in which both ends of the lamp cover 493 are inserted when the lamp case 491 is installed may be formed between the first case installation part 4911 and the door liner 42 and between the second case installation part 4912 and the door frame 43.

The lamp cover 493 is formed so that the light reflected by the rounded surface 4915 of the recessed part 4914 is transmitted therethrough. The lamp cover 493 serves to shield an opening of the recessed part 4914 and also to shield a space between the door liner 42 and the door frame 43.

The lamp cover 493 is formed to be transparent or translucent, such that the light reflected by the rounded surface 4915 and uniformly spread is transmitted therethrough. Therefore, the light passing through the lamp cover 493 illuminates the inside of the refrigerator 1 in an indirect illumination method, and have an effect like surface emitting.

To effectively diffuse the light, a film may be attached to or coated on the lamp cover 493. And if necessary, when the lamp cover 493 is injection-molded, particles or a material for diffusing the light may be added.

Meanwhile, cover fixing parts 4931 and 4932 which are inserted into the cover insertion grooves 4916 and 4917 may be formed to protrude from both ends of the lamp cover 493 so that the lamp cover 493 is installed and fixed. The cover fixing parts 4931 and 4932 formed at both sides of the lamp cover 493 may be coupled or fitted inside the cover insertion grooves 4916 and 4917 in the form of a hook, and thus the lamp cover 493 may be installed and fixed.

The door lighting unit 49 may be selectively turned on/off by a user's operation. When the door lighting unit 49 is turned on, the rear surface of the sub-door 50 and the opening part 403 become bright. When the inside of the refrigerator 1 is brighter than an outside of the refrigerator 1 by turning on the door lighting unit 49, the light emitted by the door lighting unit 49 is transmitted through the sub-door 50. Therefore, the sub-door 50 may be seen to be transparent by the user, and thus the accommodation space inside the main door 40 may be seen from an outside through the sub-door 50.

Of course, the main lighting unit 85 may be separately provided inside the refrigerator compartment 12. When the main lighting unit 85 is turned on/off, the space inside the refrigerator 1 may be seen from the outside through the sub-door 50. The main lighting unit 85 provided inside the refrigerator compartment 12 may be turned on/off together with the door lighting unit 49, or may be independently turned on/off.

Meanwhile, a heater support part 432 which protrudes backward is formed at the rear surface of the frame stepped part 431. The heater support part 432 may be formed along a perimeter of the frame stepped part 431, and may be formed to protrude backward. And a protruding position of the heater support part 432 is located at an outside (an upper side in FIG. 13) of the frame stepped part 431 so that the frame heater 4321 is located at an outer end of the frame stepped part 431.

And the frame heater 4321 heats a corner of the frame stepped part 431 at which there is a high possibility of dew condensation. The corner of the frame stepped part 431 is a portion which is in contact with an outer portion of the sub-door gasket 591, has a relatively low temperature, is in contact with external air, and thus has the high possibility of dew condensation. Therefore, the outside of the frame stepped part 431 is heated by the frame heater 4321, and the dew condensation is prevented.

Meanwhile, door restricting members 4301 and 5721 are provided at positions corresponding to the main door 40 and the sub-door 50, respectively. The door restricting members 4301 and 5721 enable the sub-door 50 for itself to be restricted to the main door 40 without a separate restricting structure, and thus prevent the sub-door 50 from being undesirably opened by an inertial force generated when the main door 40 is rotated.

Specifically, a first magnet installation part 430 is formed at an inner side surface of the door frame 43 which forms an upper surface of the opening part 403, and a first magnet 4301 is installed and fixed to the first magnet installation part 430.

And a second magnet installation part 572 is formed at an upper portion of the sub-door 50 corresponding to the first magnet installation part 430, and a second magnet 5721 is installed and fixed to the second magnet installation part 572. The second magnet installation part 572 is formed at an inner side surface of an upper cap decoration 57 which forms an upper surface of the sub-door 50, and thus the second magnet 5721 is not exposed to the outside.

While the sub-door 50 is closed, the first magnet 4301 and the second magnet 5721 are located at positions which face each other, and also disposed so that facing surfaces thereof have different polarities from each other. Therefore, the sub-door 50 is maintained in a closed state by an attraction between the first magnet 4301 and the second magnet 5721. Of course, when a rotating force of the sub-door 50 applied by a user's operation is larger than a magnetic force of the first magnet 4301 and the second magnet 5721, the sub-door 50 may be rotated.

When the first magnet 4301 and the second magnet 5721 are located on the same extension line, the magnetic force may be applied strongly. An arrangement structure of the first magnet 4301 and the second magnet 5721 is in parallel with an extending direction of a rotating axis of the sub-door 50. Therefore, when the sub-door 50 starts to be opened, the first magnet 4301 and the second magnet 5721 cross each other, and thus the magnetic force may be considerably weakened. Accordingly, after the sub-door 50 is rotated at a predetermined angle, opening of the sub-door 50 may be smoothly performed.

Meanwhile, the cap decoration 45 is provided at the upper end of the main door 40. Although not illustrated in the drawings, the foaming solution is injected into an internal space formed by the outer plate 41, the door liner 42, the door frame 43 and the cap decoration 45, and thus the insulation is formed therein. An opening device accommodation part 452 is formed at the cap decoration 45 to be recessed downward. The opening device accommodation part 452 may be shielded by a cap decoration cover 453.

FIG. 14 is an exploded perspective view of an installation structure of a door opening device according to the embodiment of the present invention. And FIG. 15 is a view illustrating an operation state of the door opening device.

As illustrated in the drawings, the opening device accommodation part 452 is formed at the cap decoration 45 on an upper surface of the main door 40. And a door opening device 70 may be provided inside the opening device accommodation part 452. An opened upper surface of the opening device accommodation part 452 is shielded by the cap decoration cover 453.

The door opening device 70 for automatically opening the main door 40 may include a driving motor 72 which is provided inside an opening device case 71, a push rod 74 which pushes and opens the main door 40, and gears 73 which transmits power of the driving motor 72 to the push rod 74.

A rack gear 741 which is engaged with the gears 73 is formed at an outer surface of the push rod 74, and thus may be inserted and withdrawn through a rod hole 4511 formed at the rear surface of the main door 40.

And the push rod 74 is formed to have a predetermined curvature. Therefore, even when the main door 40 is rotated, a front end of the push rod 74 may continuously push the cabinet 10 while being maintained in a stably contacting state with a front surface of the cabinet 10, and thus may open the main door 40.

In a state in which the user is holding food and thus cannot use his/her hands, the main door 40 may be rotated at a predetermined angle by the door opening device 70, and thus the user may put a part of his/her body like an elbow therein, and may open the main door 40.

For example, by the operation of the door opening device 70, the main door 40 may be opened so that a distance D between the main door 40 and the adjacent refrigerator compartment door 20 is about 90 mm. At this point, a rotating angle of the main door 40 may be 24° to 26°. When the refrigerator compartment door 20 is automatically opened by the distance D, the user may put the elbow or a part of his/her body in an opened gap of the refrigerator compartment door 20, and may additionally open the refrigerator compartment door 20 even while holding an object and thus cannot use his/her hands.

Of course, since the door opening device 70 is disposed inside the cap decoration 45 having a limited width, a length of the push rod. 74 which is inserted and withdrawn is limited. Therefore, to minimize the length of the push rod 74, the door opening device 70 is located at a position as close as possible to a rotating axis of the main hinge 401 so that a force for opening the main door 40 may be effectively transmitted. And to ensure an opening angle of the main door 40, the gears 73 may be combined and arranged so that the push rod 74 having the predetermined length is maximally withdrawn.

The door opening device 70 may be installed at the opening device accommodation part 452 by a screw. And the door opening device 70 may be supported at an inside of the opening device accommodation part 452 by a shock absorbing member through which the screw passes, and thus vibration and noise generated when the door opening device 70 is operated may be prevented.

Meanwhile, the door opening device 70 is selectively driven by the user's operation, and rotates the main door 40 by an operation of the driving motor 72 when a door opening signal is input by the user. At this point, since the user's hands cannot be used, an operation input of the door opening device 70 may be performed in a position detecting method or a motion detecting method, instead of a direct input method by the user's body contact. This will be described again below in detail.

FIG. 16 is a cross-sectional view taken along line 16-16' of FIG. 1.

As illustrated in the drawing, in the main door 40, an external appearance formed at both sides of the opening part 403 is formed by coupling the outer plate 41, the door frame 43 and the door liner 42.

At this point, a front support part 437 which is bent to support the outer plate 41 may be formed at a front end of the door frame 43. A front accommodation part 4371 in which an end of the outer plate 41 is introduced, in a bent state may be formed at an end of the front support part 437.

The end of the outer plate 41 which is located at the front accommodation part 4371 forms a multi-bent part 411 which is continuously bent several times. The multi-bent part 411 forms one end of the opening part 403. At this point, the one end of the opening part 403 at which the multi-bent part 411 is located is close to a handle 561 formed at a second side frame 56 of the sub-door 50.

The multi-bent part 411 is bent at a portion forming the front surface of the main door 40 to have a predetermined slope, and forms a first bent part 4111. An inclined surface of the first bent part 4111 may be formed to be directed toward the opening part 403, and an end of the first bent part 4111 forms one end of the opening part 403.

And a second bent part 4112 which is bent in a direction opposite to the first bent part 4111 is formed at the end of the first bent part 4111. And a third bent part 4113 which is bent in parallel with the front surface of the main door 40 is formed at an extending end of the second bent part 4112. The second bent part 4112 and the third bent part 4113 may be located inside the front accommodation part 4371, and may be in close contact with and supported by the front support part 437.

Therefore, the one end of the opening part 403 at which the multi-bent part 411 is formed is a portion at which the handle 561 of the sub-door 50 is located, and the user's hand comes in and out frequently. In a process in which the user's hand comes in and out, the user's hand may be in contact with one end of the opening part 403. At this point, the user's hand may smoothly come in and out without being caught or scratched by the inclined surface of the first bent part 4111. At the same time, strength may be reinforced by the multi-bent part 411, and the outer plate 41 may be prevented from being deformed by a shock generated while the user's hand comes in and out frequently.

The handle 561 forms one side surface of the sub-door 50, and is formed long vertically, and also formed to have a predetermined space between the one side surface of the sub-door 50 and one end of the opening part 403, such that the user puts his/her hand therein and then pulls.

Meanwhile, the frame heater 4321 and the heater support part 432 are formed to protrude from the rear surface of the frame stepped part 431 of the door frame 43 and thus to heat the frame stepped part 431, thereby preventing the dew condensation.

FIG. 17 is a perspective view of the sub-door. And FIG. 18 is an exploded perspective view of the sub-door when being seen from a front. And FIG. 19 is an exploded perspective view of the sub-door when being seen from a rear.

As illustrated in the drawings, the sub-door 50 may be formed in a shape corresponding to that of the opening part 403. The sub-door 50 may include a panel assembly 54 which is formed by stacking a plurality of glass layers at regular intervals, side frames 55 and 56 which forms both side surfaces of the sub-door 50, a sub-door liner 59 which forms a perimeter of the rear surface of the sub-door 50, and the upper cap decoration 57 and a lower cap decoration 58 which forms an upper surface and a lower surface of the sub-door 50.

The panel assembly 54 forms an entire front surface of the sub-door 50. The panel assembly 54 may include a front panel 541 which forms an exterior of a front surface thereof, and an insulation panel 542 which is formed to be spaced apart from a rear surface of the front panel 541. A plurality of insulation panels 542 may be provided, and a spacer bar 543 is provided between the front panel 541 and the insulation panel 542 and between the plurality of insulation panels 542.

The front panel 541 and the insulation panel 542 may be formed of glass or a see-through material, and thus the inside of the refrigerator 1 may be selectively seen through. And the front panel 541 and the insulation panel 542 may have an insulating material or an insulating structure, and may be formed to prevent a leak of cooling air in the refrigerator 1. A configuration of the panel assembly 54 will be described below in detail.

The side frames 55 and 56 forms both of left and right side surfaces of the sub-door 50. The side frames 55 and 56 may be formed of a metallic material, and serves to connect the panel assembly 54 with the door liner 42.

The side frames 55 and 56 may include a first side frame 55 forming one surface at which the sub-hinges 51 and 52 are installed, and a second side frame 56 at which the handle 561 enabling the user to perform a rotating operation is formed.

The first side frame 55 is formed long vertically, and also formed to connect between the upper hinge 51 and the lower hinge 52. Specifically, hinge insertion parts 551 and 552 in which the upper hinge 51 and the lower hinge 52 are inserted are formed at upper and lower ends of the first side frame 55, respectively. The hinge insertion parts 551 and 552 are formed at the upper and lower ends of the first side frame 55 to be recessed, and may be formed to have a corresponding shape, such that a part of the upper hinge 51 and the lower hinge 52 is matched therewith.

The first side frame 55 may be formed of a metallic material such as aluminum or a material having high strength, and may enable the upper hinge 51 and the lower hinge 52 to be maintained at accurate installation positions, such that the installation positions are not changed by a weight of the sub-door 50. Therefore, the sub-door 50 may maintain an initial installation position at the main door 40, and an outer end of the sub-door 50 and the opening part 403 of the main door 40 may not interfere with each other when being rotated, and may maintain a very closely contacting state with each other.

Like the first side frame 55, the second side frame 56 may be formed of the metallic material or the material having high strength. The second side frame 56 may be formed to extend from the upper end of the sub-door 50 to the lower end thereof, and may have the handle 561 which is recessed to allow the user to put his/her hand therein.

The upper cap decoration 57 forms the upper surface of the sub-door 50, and connects upper ends of the first side frame 55 and the second side frame 56, and is also coupled to an upper end of the panel assembly 54 and an upper end of the sub-door liner 59.

And an upper hinge installation part 571 is formed at one end of the upper cap decoration 57. The upper hinge installation part 571 is recessed so that the upper hinge 51 and the hinge cover 53 are installed therein, and upper surfaces of the hinge cover 53 and the upper cap decoration 57 form the same plane while the hinge cover 53 is installed.

The lower cap decoration 58 forms the lower surface of the sub-door 50, and connects lower ends of the first side frame 55 and the second side frame 56, and is also coupled to a lower end of the panel assembly 54 and a lower end of the sub-door liner 59.

And a lower hinge installation part 581 is formed at one end of the lower cap decoration 58. The lower hinge installation part 581 is recessed so that the lower hinge 52 is installed therein. And a detection device accommodation part 582 in which a second detection device 81 and a knock detection device 82 are installed is formed at the lower cap decoration 58. The detection device accommodation part 582 may be shielded by an accommodation part cover 583.

The second detection device 81 which is installed at the lower cap decoration 58 is a device which checks a user's approach, and the knock detection device 82 is a device which detects a user's knocking operation on the sub-door 50. The second detection device 81 and the knock detection device 82 are attached to the rear surface of the front panel 541, and may be provided at a lower end of the front panel

541 close to the second side frame 56. By the second detection device 81 and the knock detection device 82, the sub-door 50 may selectively become transparent, and thus an inside of the sub-door 50 may be seen through. Detailed structures of the second detection device 81 and the knock detection device 82 will be described below.

The sub-door liner 59 forms a shape of a perimeter of the rear surface of the sub-door 50, and may be injection-molded with a plastic material. The sub-door liner 59 is coupled to the first side frame 55, the second side frame 56, the upper cap decoration 57 and the lower cap decoration 58. And the foaming solution is injected into an internal space of a perimeter of the sub-door 50 formed by the sub-door liner 59, and the insulation (not shown) is filled therein, and thus an insulation structure of the perimeter of the sub-door 50 is provided.

That is, the insulation structure is formed at a center portion of the sub-door 50 by the insulation panel 542 forming the panel assembly 54, and a perimeter of the panel assembly 54 may have the insulation structure by the insulation.

The sub-door gasket 591 is provided at a rear surface of the sub-door liner 59. The sub-door gasket 591 is formed to be in close contact with the main door 40 when the sub-door 50 is closed. Therefore, the leak of the cooling air between the main door 40 and the sub-door 50 may be prevented.

FIG. 20 is a cut-away perspective view taken along line 20-20' of FIG. 17. And FIG. 21 is an exploded perspective view of the panel assembly according to the embodiment of the present invention.

As illustrated in the drawings, an entire exterior of the sub-door 50 is formed by the panel assembly 54, and the first side frame 55 and the second side frame 56 are coupled to both ends of the panel assembly 54. And the foaming solution is filled in a space formed by the panel assembly 54, the first side frame 55 and the second side frame 56, and forms the insulation.

The panel assembly 54 may include the front panel 541 which forms the entire front surface of the sub-door 50, at least one or more insulation panels 542 which are disposed at a rear of the front panel 541, and the spacer bar 543 which supports between the front panel 541 and the insulation panel 542 and between the plurality of insulation panels 542.

The front panel 541 may be formed of a glass material which is selectively seen through according to a light transmittance and reflectivity, and thus may be referred to as a half mirror. The front panel 541 is formed so that a rear of the sub-door 50 is selectively seen through according to ON/OFF of the main lighting unit 85 or the door lighting unit 49 in the refrigerator 1.

That is, in a state in which the door lighting unit 49 is turned on, light inside the refrigerator 1 penetrates the front panel 541, and thus the front panel 541 looks transparent. Therefore, a space inside the refrigerator 1 located at the rear of the sub-door 50 or the accommodation space formed at the main door 40 may be seen from the outside while the sub-door 50 is closed.

And in a state in which the door lighting unit 49 is turned off, the light does not penetrate the front panel 541, but is reflected, and thus the front panel 541 serves as a mirror surface. In this state, the space inside the refrigerator located at the rear of the sub-door 50 or the accommodation space formed at the main door 40 may not be seen from the outside.

A bezel 5411 is formed along a perimeter of the rear surface of the front panel 541. The bezel 5411 may be formed so that the light is not transmitted therethrough, and thus the side frames 55 and 56, the upper cap decoration 57, the lower cap decoration 58 and the spacer bar 543 which are coupled to the front panel 541 are prevented from being exposed forward through the front panel 541.

And the second detection device 81 and the knock detection device 82 may be disposed at the bezel 5411 which is formed at the lower end of the front panel 541, and the knock detection device 82 is disposed so as to be covered.

Meanwhile, in the bezel 5411 which is formed at the lower end of the front panel 541, a penetration part 5412 may be formed at a position corresponding to the second detection device 81. The penetration part 5412 may be formed in a shape corresponding to a front surface of the second detection device 81, and the bezel 5411 is not printed thereon.

That is, the bezel 5411 having a predetermined width is printed along a perimeter of the front panel 541, except the penetration part 5412. The penetration part 5412 enables the light emitted from the second detection device 81 not to interfere with the bezel 5411, but to pass through the front panel 541 and thus to be transmitted and received.

And the front surface of the second detection device 81 which is in contact with the penetration part 5412 may be formed to have the same color as that of the bezel 5411. Therefore, even in a state in which the front surface of the second detection device 81 is exposed by the penetration part 5412, an area of the penetration part 5412 may not be easily exposed, and may have a sense of unity with the front panel 541.

Meanwhile, the first side frame 55 and the second side frame 56 are installed at the rear surface of the front panel 541. The first side frame 55 and the second side frame 56 are adhered to both side ends of the rear surface of the front panel 541, respectively, and may be adhered to an inside of an area of the bezel 5411.

And the spacer bar 543 is formed at the perimeter of the rear surface of the front panel 541. The spacer bar 543 enables the front panel 541 and the insulation panel 542 to be spaced apart from each other, and also serves to seal therebetween.

The spacer bar 543 may also be disposed between the plurality of insulation panels 542. The front panel 541, the insulation panel 542 and the plurality of spacer bars 543 may be bonded to each other by an adhesive, and a sealant may be coated to seal among the front panel 541, the insulation panel 542 and the spacer bar 543.

The insulation panel 542 may be formed to have a size smaller than that of the front panel 541, and may be located within an internal area of the front panel 541. And the insulation panel 542 may be chemical strengthening glass in which glass is soaked in an electrolyte solution at a glass transition temperature or more, and thus chemically strengthened.

A low-radiation coating layer for reducing heat transfer into the storage compartment due to radiation may be formed at a rear surface of the insulation panel 542. Glass on which the low-radiation coating layer is formed is referred to as low-e glass. The low-radiation coating layer may be formed by sputtering silver or the like on a surface of the glass.

A sealed space between the front panel 541 and the insulation panel 542 and a sealed space between the plurality of insulation panels 542 which are formed by the spacer bar 543 may create a vacuum state so as to be insulated.

If necessary, an inert gas for the insulation, such as argon, may be filled in the sealed space between the front panel 541 and the insulation panel 542 and the sealed space between the plurality of insulation panels 542. The inert gas has more excellent insulation property than that of general air. Therefore, insulation performance may be ensured by forming a predetermined, space between the front panel 541 and, the insulation panel 542 and between the plurality of insulation panels 542 in which the inert gas is filled.

The insulation panel 542 may be formed in a single panel, and may be installed to be spaced apart from the front panel 541. If necessary, two or more insulation panels 542 may be provided to be spaced apart from each other.

Hereinafter, a structure of the front panel 541 having various applicable types of half mirror structures will be described.

FIG. 22 is a cross-sectional view schematically illustrating an example of a front panel of the panel assembly.

As illustrated in the drawing, the front panel 541 according to an example embodiment may include a glass layer 5413 which forms an exterior, a vacuum deposition layer 5414 which is formed at a rear surface of the glass layer 5413, a bezel print layer 5415 which is formed at a rear surface of the vacuum deposition layer 5414, and a transparent print, layer 5416 which forms entire rear surfaces of the bezel print layer 5415 and the vacuum deposition layer 5414.

Specifically, the glass layer 5413 may be formed of green glass which is widely used as transparent glass, and forms an entire surface of the front panel 541. Of course, various other transparent glass materials, such as white glass, other than the green glass may be used.

The vacuum deposition layer 5414 serves to enable the front panel 5411 to have a half glass property, and may be formed at the rear surface of the glass layer 5413 by vacuum-depositing a titan compound ($TiO_2$). That is, the vacuum deposition layer 5414 is formed at the entire rear surface of the glass layer 5413. While the door lighting unit 49 is not turned on, the light is reflected by the vacuum deposition layer 5414, and thus the front panel 541 looks like a mirror when being seen from a front.

The bezel print layer 5415 forms the perimeter of the rear surface of the front panel 541, and the bezel 5411 may be formed by the bezel print layer 5415. The bezel print layer 5415 is formed so that the light is not transmitted therethrough even while the door lighting unit 49 is turned on, and thus elements which are disposed along the perimeter of the rear surface of the front panel 541 may be shielded.

And the transparent print layer 5416 may be formed at the entire rear surface of the front panel 541 including the bezel print layer 5415 and the vacuum deposition layer 5414. The transparent print layer 5416 may be formed to be transparent, such that the light is transmitted therethrough, and serves to protect the front panel 541 while the front panel 541 or the panel assembly 54 is processed.

In particular, the transparent print layer 5416 prevents the vacuum deposition layer 5414 from being damaged. For coupling with the insulation panel 542, the front panel 541 is formed so that the spacer bar 543 or the like is attached thereto. At this point, the front panel 541 may be manufactured separately from the insulation panel 542, and then transported. In this process, when the transparent print layer 5416 is not provided, the vacuum deposition layer 5414 may be damaged, and thus may not perform a half glass function. Therefore, in a structure in which the vacuum deposition layer 5414 is formed at the rear surface of the glass layer 5413, the transparent print layer 5416 should be provided.

FIG. 23 is a cross-sectional view schematically illustrating another example of the front panel of the panel assembly.

As illustrated in the drawing, the front panel 541 according to another example embodiment may include a glass layer 5413 which forms an exterior, a ceramic print layer 5417 which is formed at a front surface of the glass layer 5413, and a bezel print layer 5415 which is formed at a rear surface of the glass layer 5413.

Specifically, the glass layer 5413 is formed of a glass material through which the light is transmitted, and also which is seen through. A glass material called dark gray glass which imperceptibly has a dark gray color in a transparent state may be used.

When the door lighting unit 49 is not turned on, and thus the front panel 541 is in a mirror-like state, the dark gray color of the glass layer 5413 serves to subsidiarily provide a color sense which enables the front panel 541 to have a texture which looks like an actual mirror.

The ceramic print layer 5417 is formed at the entire front surface of the glass layer 5413, and may be formed in a silk screen printing using reflectance ink which reflects the light.

The reflectance ink includes the titan compound ($TiO_2$) as a main component, a viscosity-controlling resin, an organic solvent, and an additive. The reflectance ink may be manufactured to have a predetermined viscosity for the silk screen printing.

And the ceramic print layer 5417 may be formed in a thickness of 40 to 400 nm. And the ceramic print layer 5417 may have flatness similar to a mirror surface through the silk screen printing using the reflectance ink, and may also be formed like the mirror surface when being reinforced by heating.

The ceramic print layer 5417 is separately formed on the surface of the glass layer 5413, and has a different refractive index from that of the glass. Therefore, some of the light incident from the outside of the refrigerator 1 to the front panel 541 may be reflected by the ceramic print layer 5417, and the rest may be reflected by the glass layer 5413, and may have an effect like the mirror due to an interference effect of the light which is reflected. That is, due to the interference effect of the light which is reflected by a boundary surface of another medium having a different refractive index, the front panel 541 may look like the mirror when being seen from an outside.

However, when the door lighting unit 49 is turned on, the light is emitted from the inside of the refrigerator 1 toward the glass layer 5413, and the light transmitted through the glass layer 5413 passes through the ceramic print layer 5417. Therefore, the front panel 541 may look transparent when being seen from the outside of the refrigerator 1, and the space in the refrigerator 1 may be visible.

At this point, the ceramic print layer 5417 is formed so that the transmittance of the front panel 541 is about 20% to 30%. When the transmittance is 20% or less, it is difficult to see through the space in the refrigerator 1 due to a low transparency of the front panel 541 even while the door lighting unit 49 is turned on. And when the transmittance is 30% or more, the space in the refrigerator 1 is visible even while the door lighting unit 49 is turned off, and thus the surface effect like the mirror may not be expected. Therefore, for the half mirror effect, it is preferable that transmittance of the front panel 541 is about 20% to 30%.

And to form a surface having a high brightness, such as the mirror surface, the ceramic print layer 5417 is reinforced by heating to a predetermined temperature. An organic component is completely removed through the heating, and the titan compound ($TiO_2$) is calcined on the glass layer 5413.

Meanwhile, when the front panel 541 is heated after the ceramic print layer 5417 is printed by the silk screen printing, the heating is performed at a high temperature so that the organic component of the reflectance ink is completely removed, and the titan compound is calcined. However, when the heating is performed at an excessively high temperature, bending may occur. Therefore, it is preferable that the heating is performed within a range at which the surface is not deformed. And for removing of the organic component and calcination of the titan compound, the front panel 541 may be heated in stages at different temperatures.

And the bezel print layer 5415 forms the perimeter of the rear surface of the front panel 541, and the bezel 5411 may be formed by the bezel print layer 5415. The bezel print layer 5415 is formed so that the light is not transmitted therethrough even while the door lighting unit 49 is turned on, and thus may shield the elements which are disposed along the perimeter of the rear surface of the front panel 541.

Meanwhile, the bezel print layer 5415 may be formed in an inorganic printing method (glass printing). The bezel print layer 5415 may be printed using a ceramic pigment as a main component in which frit, an inorganic pigment and oil are mixed. Therefore, in the bezel print layer 5415, the resin is decomposed and volatilized by the heating in the glass reinforcing process, and the frit melts and covers the pigment, and then may be attached on the surface of the glass layer 5413.

Such an inorganic printing method has smaller fragments and higher durability than an organic printing method. And a glass component may melt and may be integrally molded with the glass layer 5413, and thus in a multi-layering process with the additional insulation panel 542, it is possible to reduce heat loss and also to provide an excellent adhesive property.

FIG. 24 is a cross-sectional view schematically illustrating still another example of the front panel of the panel assembly.

As illustrated in the drawing, the front panel 541 according to still another example embodiment may include a glass layer 5413 which forms an exterior, a hard coating layer 5418 which is formed at a front surface of the glass layer 5413, and a bezel print layer 5415 which is formed at a rear surface of the glass layer 5413.

Specifically, the glass layer 5413 is formed of a glass material through which the light is transmitted, and also which is seen through. A glass material called gray glass which imperceptibly has a dark gray color in a transparent state may be used.

The gray glass has a somewhat brighter color than the dark gray glass described in the above-described example embodiment. This difference may be caused by a difference between the ceramic print layer 5417 and the hard coating layer 5418 which are formed on the glass layer 5413.

When the door lighting unit 49 is not turned on, and thus the front panel 541 is in the mirror-like state, the gray color of the glass layer 5413 serves to subsidiarily provide a color sense which enables the front panel 541 to have a texture which looks like the actual mirror.

The hard coating layer 5418 is formed at the entire front surface of the glass layer 5413, and also formed to have a light transmittance of 25 to 50% and a reflectivity of 45 to 65%, and to have a half mirror property, such that the transmittance and the reflectivity may be simultaneously increased.

The hard coating layer 5418 may be formed in a thickness of about 30 to 80 nm, and may be configured with triple layers of iron, cobalt and chrome. Of course, one or two layers of the triple layers may be omitted, considering the transmittance, the reflectivity and a color difference.

The hard coating layer 5418 may be formed in an atmospheric pressure chemical vapor deposition (APCVD) method in which a vaporized coating substance is formed on the entire surface of the glass layer 5413, or in a spraying method in which a liquid coating material is sprayed.

The hard coating layer 5418 is separately formed on the surface of the glass layer 5413, and has a different refractive index from that of the glass layer 5413. Therefore, some of the light incident from the outside of the refrigerator 1 to the front panel 541 may be reflected by the hard coating layer 5418, and the rest may be reflected by the glass layer 5413. Therefore, the front panel 541 may have an effect like the mirror due to an interference effect of the light which is reflected. That is, due to the interference effect of the light which is reflected by a boundary surface of another medium having a different refractive index, the front panel 541 may look like the mirror when being seen from an outside.

However, when the door lighting unit 49 is turned on, the light is emitted from the inside of the refrigerator 1 toward the glass layer 5413, and the light transmitted through the glass layer 5413 passes through the hard coating layer 5418. Therefore, the front panel 541 may look transparent when being seen from the outside of the refrigerator 1, and the space in the refrigerator 1 may be visible.

The hard coating layer 5418 is formed so that the transmittance of the front panel 541 is about 20% to 30%. When the transmittance is 20% or less, it is difficult to see through the space in the refrigerator 1 due to a low transparency of the front panel 541 even while the door lighting unit 49 is turned on. And when the transmittance is 30% or more, the space in the refrigerator 1 is visible even while the door lighting unit 49 is turned off, and thus the surface effect like the mirror may not be expected. Therefore, for the half mirror effect, it is preferable that transmittance of the front panel 541 is about 20% to 30%.

The bezel print layer 5415 forms the perimeter of the rear surface of the front panel 541, and the bezel 5411 may be formed by the bezel print layer 5415. The bezel print layer 5415 is formed so that the light is not transmitted therethrough even while the door lighting unit 49 is turned on, and thus may shield the elements which are disposed along the perimeter of the rear surface of the front panel 541. The bezel print layer 5415 may be formed in the inorganic printing method.

FIG. 25 is a cross-sectional view of the sub-door.

As illustrated in the drawing, the side frames 55 and 56 are provided at both sides of the panel assembly 54. The side frames 55 and 56 may be attached and fixed to the front panel 541, may be coupled to the sub-door liner 59 so as to form a space in which the insulation is accommodated, and may also insulate the perimeter of the sub-door 50.

The second side frame 56 is formed at a position which faces the first side frame 55, and may be configured to form another side surface of the sub-door 50. And a first front bent part 553 and a first rear bent part 554 may be formed at both ends of the first side frame 55.

The first front bent part 553 may be formed to be bent and thus to be in contact with the rear surface of the front panel 541, and may extend to a position of the spacer bar 543. Therefore, a temperature outside the sub-door 50 may be transferred to the rear surface of the front panel 541 along the first side frame 55 formed of the metallic material, and thus the dew condensation at one side of the front panel 541 which is in contact with the first front bent part 553 may be prevented.

And a first heater installation groove 5531 at which a sub-door heater 502 is installed may be further formed at the first side frame 55. The first heater installation groove 5531 may be formed at an end of the first front bent part 553 so that the sub-door heater 502 is disposed at a position close to the spacer bar 543. Therefore, the sub-door heater 502 may be vertically disposed long along the first side frame 55. Due to a property of the first side frame 55 formed of the metallic material, the dew condensation at the front panel 541 may be prevented by heating the rear surface of the front panel 541 which is in contact with the first front bent part 553.

The first rear bent part 554 is bent from a rear end of the first side frame 55, and coupled to the sub-door liner 59. At this point, the first rear bent part 554 is formed to support the sub-door liner 59, and may be formed to support a load transmitted through the sub-door gasket 591 when the sub-door 50 is closed.

The second side frame 56 is provided at a position which faces the first side frame 55, and may be configured to form still another side surface of the sub-door 50. The second side frame 56 is formed to be located at a position close to one surface of the opening part 403 of the main door 40. And a second front bent part 562 and a second rear bent part 563 may be formed at both ends of the second side frame 56.

The second front bent part 562 extends from an end of the second side frame 56, and is recessed to form the handle 561 in which the user's hand is put. The handle 561 may be formed to be recessed toward a lateral side of the panel assembly 54. Therefore, the handle 561 is not exposed, and only a part of the second side frame 56 may be exposed forward when being seen from a front.

And the second front bent part 562 forms the handle. 561, and may be formed to extend from one end of the second side frame 56 and to be in contact with the rear surface of the front panel 541. Therefore, a temperature outside the sub-door 50 may be transferred to the rear surface of the front panel 541 along the second side frame 56 formed of the metallic material, and thus the dew condensation at one side of the front panel 541 which is in contact with the second front bent part 562 may be prevented.

Specifically, the second front bent part 562 is recessed from an outer side further than the front panel 541 toward the front panel 541, and a recessed end may be formed to be recessed inward further than an outer end of the front panel 541. And the second front bent part 562 may be located at a rear of the front panel 541, and thus the user may put his/her hand into the handle 561 formed by the second front bent part 562, and then may rotate the sub-door 50.

And a second heater installation groove 5621 at which the sub-door heater 502 is installed may be further formed at the second front bent part 562. The second heater installation groove 5621 enables the sub-door heater 502 to be disposed at a position close to the spacer bar 543. Therefore, the sub-door heater 502 may be vertically disposed long along the second side frame 56. Due to a property of the second side frame 56 formed of the metallic material, the dew condensation at the front panel 541 may be prevented by heating the rear surface of the front panel 541 which is in contact with the second front bent part 562.

A portion of an inner side surface of the second front bent part 562 which is in contact with the front panel 541 may be formed to be rounded, and thus may allow the user to easily grip and pull forward the portion.

Meanwhile, the second rear bent part 563 is bent from a rear end of the second side frame 56, and coupled to the sub-door liner 59. At this point, the second rear bent part 563 is formed to support the sub-door liner 59, and may be formed to support the load transmitted through the sub-door gasket 591 when the sub-door 50 is closed.

FIG. 26 is an exploded perspective view illustrating a coupling structure of the sub-door and the upper hinge. And FIG. 27 is a partial perspective view illustrating an installed state of the upper hinge.

As illustrated in the drawings, the upper hinge installation part 571 which is recessed so that the upper hinge 51 and the hinge cover 53 are installed therein may be formed at the upper cap decoration 57 of the sub-door 50. The upper hinge installation part 571 is formed at an upper end of the upper cap decoration 57, and may be formed to be connected to the adjacent first side frame 55.

That is, the hinge insertion part 551 formed at an upper end of the first side frame 55 and the upper hinge installation part 571 of the upper cap decoration 57 may be connected to each other, and thus the upper hinge 51 may be installed at a corner of the sub-door 50 to which the upper hinge installation part 571 and the hinge insertion part 551 are connected. And although not illustrated, the lower cap decoration 58 provided at the lower end of the sub-door 50 has the same structure, and thus the lower hinge 52 may be installed at a corner of the sub-door 50.

A hinge accommodation part 5711 which is recessed to have a shape corresponding to the upper hinge 51 is formed at the upper hinge installation part 571. And a hinge fixing hole 5712 in which the screw passed through the upper hinge 51 is fastened is formed at the hinge accommodation part 5711.

And an electric wire guide part 5714 and an electric wire hole 5713 through which an electric wire L disposed at the upper hinge 51 passes may be formed at one side of the upper hinge installation part 571. The electric wire L guided through the electric wire guide part 5714 is connected to the second detection device 81 and the knock detection device 82, and guided to the upper cap decoration 57 via the lower cap decoration 58 and the second side frame 56. Then, the electric wire L may be introduced into the electric wire guide part 5714 through the electric wire hole 5713 formed at the upper hinge installation part 571, and may be guided to an outside of the sub-door 50 through the electric wire guide part 5714. The electric wire L guided along the electric wire guide part 5714 is guided in an extending direction of the upper hinge 51, and introduced into the main door 40 through the hinge hole 433 of the main door 40 together with one side of the upper hinge 51.

Meanwhile, the upper hinge 51 is installed and fixed to the upper hinge installation part 571 by a screw, and may include a door installation part 511 which is fixed to the sub-door 50, and a rotary coupling part 512 which is rotatably coupled to the main door 40.

And the door installation part 511 may include a horizontal part 5111 which is fixed to the upper hinge installation part 571, and a vertical part 5112 which is fixed to the hinge insertion part 551 of the first side frame 55. The horizontal part 5111 and the vertical part 5112 are formed perpendicularly to each other, and thus the upper hinge 51 may be maintained in a fixed state to a corner of the upper end of the sub-door 50.

The rotary coupling part 512 may be formed to extend from an end of the horizontal part 5111 toward the outside of the sub-door 50. The rotary coupling part 512 may be formed to be bent in one direction, and a hinge shaft 5121 may be formed at an extending end thereof. The hinge shaft 5121 is formed to extend downward from the plate-shaped rotary coupling part 512.

And a cut-away part 5122 is formed at the rotary coupling part 512 to have the same shape as a shape that the rotary coupling part 512 is bent laterally. The cut-away part 5122 is formed to be recessed inward from one side at which the hinge shaft 5121 is formed. And the rotary coupling part 512 may be cut so as to be rounded in a rotating radius direction of the sub-door 50 when the sub-door 50 is opened and closed. Therefore, when the sub-door 50 is rotated to be opened while the upper hinge 51 is coupled to the main door 40, one end of the door frame 43 forming the hinge hole 433 is inserted into the cut-away part 5122.

And a flange 5123 which prevents a deformation of the rotary coupling part 512 and reinforces strength may be formed along an outer end of the rotary coupling part 512. The flange 5123 may be formed to extend in a direction which perpendicularly intersects with the rotary coupling part 512.

A stopper 5124 may be further formed at one end of the rotary coupling part 512. The stopper 5124 is formed at one side of the rotary coupling part 512 close to the hinge shaft 5121, and extends downward so as to interfere with one side of the main door 40 or the hinge hole 433 while the sub-door 40 is rotated to be completely opened, and thus prevents the sub-door 50 from being further opened.

The hinge cover 53 is formed to shield an opening of the upper hinge installation part 571 and also to shield the upper hinge 51 from an upper side thereof. The hinge cover 53 may include a cap decoration shielding part 531 which shields the upper hinge installation part 571, and a hinge shielding part 532 which shields the rotary coupling part 512 of the upper hinge 51.

The cap decoration shielding part 531 may have a shape corresponding to the upper hinge installation part 571, and may also have a plurality of screw holes 5311 so that a screw is directly fastened to the upper cap decoration 57, or the screw passing through the door installation part 511 is moved in and out.

The hinge shielding part 532 may be formed to extend along a shape of the rotary coupling part 512 of the upper hinge 51, and may also be formed to cover the rotary coupling part 512 from an upper side thereof. And the hinge shielding part 532 is disposed to be somewhat spaced apart from the rotary coupling part 512, and thus to form a space between the hinge shielding part 532 and the rotary coupling part 512, and thus the electric wire L passed through the electric wire guide part 5714 may be guided through the space between the hinge shielding part 532 and the rotary coupling part 512.

FIG. 28 is a longitudinal cross-sectional view illustrating a coupling structure of the upper hinge.

As illustrated in the drawing, the upper hinge 51 has a structure which is installed and fixed to the upper hinge installation part 571 of the upper cap decoration 57, and shielded by the hinge cover 53.

And while the sub-door 50 is installed at the main door 40, the upper hinge 51 is inserted into the hinge hole 433, and the rotary coupling part 512 of the upper hinge 51 is located inside the main door 40.

In this state, the hinge shaft 5121 of the upper hinge 51 may be inserted into a shaft installation part 438 of the main door 40. The shaft installation part 438 may be fixed to the inside of the main door 40 by a separate member, and may be integrally formed with the door frame 43 forming the main door 40. The shaft installation part 438 is formed to form a space in which the hinge shaft 5121 is inserted, and to be rotated while a rotating shaft is inserted into the shaft installation part 438.

And when the sub-door 50 is rotated to be opened while the upper hinge 51 is coupled to the main door 40, the upper hinge 51 is also rotated with rotation of the sub-door 50. At this point, a side end of the hinge hole 433 is inserted into the cut-away part 5122 of the upper hinge 51, and thus interference may be prevented.

Due to such a structure of the upper hinge 51, the sub-door 50 may be rotatably disposed inside the opening pail. 403 of the main door 40 while the sub-door 50 is closed. And the upper hinge 51 extends laterally, and is rotatably coupled to the inside of the main door 40, and thus the interference of the upper hinge 51 is prevented while the sub-door 50 is closed. Therefore, an outer surface of the sub-door 50 and an inner surface of the opening part 403 may be formed to be in close contact with each other, and thus even when the sub-door 50 is rotated, the sub-door 50 is not sagged or deformed by a stable supporting structure of the upper hinge 51.

And the electric wire L introduced through the electric wire guide part 5714 of the upper cap decoration 57 may pass through the hinge hole 433 via the hinge shielding part 532 of the hinge cover 53, and may be guided to the inside of the main door 40. Therefore, even while the sub-door 50 is being rotated, the electric wire L is not exposed to the outside, and is guided to the inside of the main door 40 while being shielded by the hinge cover 53.

FIG. 29 is a longitudinal cross-sectional view illustrating a coupling structure of the sub-door and the lower hinge.

As illustrated in the drawing, the lower hinge 52 has the same structure as that of the upper hinge 51, except a bending direction which is bent upward. To install the lower hinge 52, the lower hinge installation part 581 is formed at the lower cap decoration 58 to be recessed, and the lower hinge 52 may be installed and fixed to the lower hinge installation part 581 and the hinge insertion part 552 of the first side frame 55. That is, the lower hinge 52 has a structure which is installed and fixed to a corner of the lower end of the sub-door 50.

Meanwhile, each of the upper hinge 51 and the lower hinge 52 has a structure which is inserted and fixed by the first side frame 55. Due to a property of the first side frame 55 formed of the metallic material, the first side frame 55 may stably support the upper hinge 51 and the lower hinge 52, and may stably fix the sub-door 50 without the sagging or the deformation of the sub-door 50 even in an environment in which the load is applied. Accordingly, a space between the sub-door 50 and the main door 40 may be designed and maintained to be very narrow, and thus the external appearance may be enhanced.

The lower hinge 52 and may include a door installation part 521 which is installed and fixed to the lower hinge installation part 581 by a screw, and a rotary coupling part 522 which is rotatably coupled to the main door 40.

The door installation part 521 may include a horizontal part 5211 which is fixed to the lower hinge installation part 581, and a vertical part 5212 which is fixed to the hinge insertion part 552 of the first side frame 55. And the rotary coupling part 522 may extend from an end of the horizontal part 5211 so as to pass through the hinge hole 433 of the main door 40, and a hinge shaft 5221 is formed at one extending end.

The hinge shaft 5221 may be inserted into a shaft installation part 439 formed inside the main door 40, and thus the lower hinge 52 may be rotatably coupled. And a cut-away part 5222 is formed at the rotary coupling part 522 so that one side end of the hinge hole 433 is inserted therein when the sub-door 50 is rotated. And a stopper 5224 which restricts rotation of the sub-door 50 may be further formed at the rotary coupling part 522.

Like this, the sub-door 50 may be rotatably installed at the main door 40 by the upper hinge 51 and the lower hinge 52 which extend laterally from upper and lower ends of one side surface thereof. The sub-door 50 which has a relatively heavy weight due to the provided panel assembly 54 may be stably fixed to the inside of the opening part 403.

Figure 30:
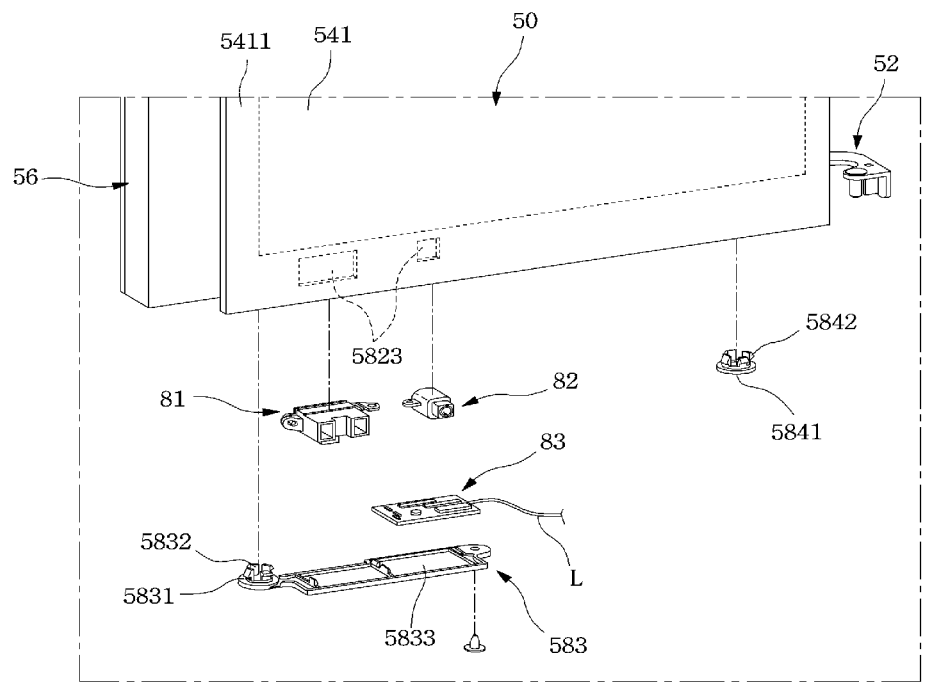
FIG. 30 is an exploded perspective view illustrating a coupling structure of a knock detection device and a second detection device of the sub-door when being seen from a front.

FIG. 30 is an exploded perspective view illustrating a coupling structure of the knock detection device and the second detection device of the sub-door when being seen from a front. And FIG. 31 is an exploded perspective view illustrating a coupling structure of the knock detection device and the second detection device of the sub-door when being seen from a lower side.

As illustrated in the drawings, the second detection device 81 and the knock detection device 82 may be provided at the lower end of the sub-door 50. The second detection device 81 serves to detect a user's position, and to check whether the user stands in front of the refrigerator 1 to operate the refrigerator 1.

The second detection device 81 may be located on an extension line of the first detection device 31, and may be arranged vertically with the first detection device 31. And an installation height of the second detection device 81 corresponds to the lower end of the sub-door 50, and thus an ordinary adult may be detected, but a child having a small height, an animal, or other things smaller than the height of the second detection device 81 may not be detected.

And the knock detection device 82 is formed to recognize whether the user knocks on the front panel 541 of the sub-door 50. A certain operation of the refrigerator 1 may be designated by a knocking operation detected by the knock detection device 82. For example, the door lighting unit 49 may be turned on by the user's knocking operation, and thus the sub-door 50 may become transparent.

A specific structure of the second detection device 81 and the knock detection device 82 will be described below in detail.

The lower hinge 52 may be installed at the lower cap decoration 58 which forms the lower surface of the sub-door 50, and the detection device accommodation part 582 may be formed at one side which is distant from the lower hinge 52, i.e., one side which is close to the second side frame 56 so as to be recessed.

The detection device accommodation part 582 is formed to have a size which accommodates the second detection device 81 and the knock detection device 82. And an opened lower surface of the detection device accommodation part 582 may be shielded by the accommodation part cover 583.

The case fixing part 481 to which a screw for fixing the accommodation part cover 583 to the lower cap decoration 58 is fastened is formed at one side of the accommodation part cover 583. An injection port cover part 5831 is further formed at the other side of the accommodation part cover 583. The injection port cover part 5831 is formed on the lower cap decoration 58, and also formed to shield a first injection port 5824 through which the foaming solution filled to mold an insulation 501 is injected. And a plurality of hook parts 5832 are formed at an upper surface of the injection port cover part 5831 to be fitted into the first injection port 5824. Therefore, the injection port cover part 5831 is fitted into the first injection port 5824, and the case fixing part 481 is fixed to the lower cap decoration 58 by fastening the screw, and the entire accommodation part cover 583 is installed and fixed to the lower cap decoration 58.

When the accommodation part cover 583 is installed at the lower cap decoration 58, the detection device accommodation part 582 may be shielded, and the first injection port 5824 may also be shielded.

And a PCB installation part 5833 is further formed at the accommodation part cover 583. A detection device PCB 83 for processing a signal of the second detection device 81 and the knock detection device 82 is installed at the PCB installation part 5833. The detection device PCB 83 is connected to the second detection device 81 and/or the knock detection device 82, and may be seated at the PCB installation part 5833.

The detection device PCB 83 serves to process the signal of the second detection device 81 and/or the knock detection device 82, and is located at a position close to the second detection device 81 and the knock detection device 82, and configured to process the signals.

In the case in which the detection device PCB 83 for processing the signal is located at a distance, there may be a problem that noise generated when the signal to be processed is transferred through a signal line may be increased. However, since the detection device PCB 83 is located at a position at which the second detection device 81 and the knock detection device 82 are installed, a main control part 2 receives only a valid knock-on signal. Accordingly, the noise due to the signal line between the main control part 2 and the detection device PCB 83 may be minimized. That is, the main control part 2 may receive the signal of which the noise is minimized through the detection device PCB 83. Therefore, it is possible to ensure an accurate recognition rate.

In particular, in the case of the knock detection device 82, a signal output through a microphone 8211 is indicated by mV unit, but the main control part 2 which controls an entire operation of the refrigerator 1 generally receives a signal which is basically indicated by V unit. Therefore, due to a scale difference in a physical signal, it is not preferable that the main control part 2 determines whether the knock-on signal is normal.

The refrigerator 1 is an electronic appliance using a high voltage/a high current. Therefore, an electrical noise generation amount is relatively great. This means that the signal of mV unit output from the microphone 8211 may be further vulnerable to the electrical noise.

Therefore, since the detection device PCB 83 is located close to the knock detection device 82, the noise may be remarkably reduced, and thus the recognition rate may be enhanced.

Meanwhile, a second injection port 584 through which the foaming solution is injected is further formed at one side of the lower cap decoration 58 close to the lower hinge 52. The second injection port 584 may be shielded by a separate injection port cover 5841. And a plurality of hook parts 5842 are formed at an upper surface of the injection port cover 5841 to be fitted into the second injection port 584.

A first boss 5821 to which a screw for fixing the second detection device 81 is fastened, and a second boss 5822 for fixing the knock detection device 82 are respectively formed at a bottom surface of the detection device accommodation part 582.

And an electric wire hole 5823 is formed at one surface of the detection device accommodation part 582. The electric wire L which is connected to the detection device PCB 83, the second detection device 81 and the knock detection device 82 may be guided to the outside of the sub-door 50 through the electric wire hole 5823.

Meanwhile, a through part 5825 which is opened so that the second detection device 81 and the knock detection device 82 are in close contact with the front panel 541 may be formed at a front surface of the detection device accommodation part 582 which is in contact with the front panel 541.

FIG. 32 is an exploded perspective view of the knock detection device. And FIG. 33 is a cross-sectional view taken along line 33-33' of FIG. 17. And FIG. 34 is a cross-sectional view of a microphone module of the knock detection device.

A structure of the knock detection device 82 will be described in detail with reference to the drawings. The knock detection device 82 may include a microphone module 821 which detects the knock-on signal, a holder 823 which accommodates the microphone module 821, an elastic member 824 which presses the holder 823 and the microphone module 821 toward the front panel 541 so that the holder 823 and the microphone module 821 are in close contact with the front panel 541, and a support member 825 which supports the elastic member 824 and the holder 823.

The microphone module 821 includes the microphone 8211 which directly senses a sound wave, and a microphone accommodation part 8212 which accommodates the microphone 8211. The microphone 8211 serves to directly sense the sound wave, is formed in a circular shape having a predetermined thickness, and installed and fixed into the microphone module 821. One surface of the microphone 8211 may be referred to as a sound wave receiving part 8213 which receives the sound wave, and the sound wave receiving part 8213 is disposed toward an opening 8214 of the microphone accommodation part 8212. And the other side of the microphone 8211 may be connected to a signal line 8216, and the signal line 8216 may also be connected to the detection device PCB 83.

The microphone accommodation part 8212 is formed of an elastic material such as rubber, and also formed to be in close contact with the front panel 541. To this end, the opening 8214 may be formed at one side of the microphone accommodation part 8212 close to the microphone 8211 installed in the microphone accommodation part 8212, and a circular protrusion 8215 may be formed at a circumference of the opening 8214. And the protrusion 8215 serves to enable the microphone accommodation part 8212 not to be inclined in one direction when the microphone accommodation part 8212 is in close contact with the front panel 541, and also to enable an entire opened front surface of the opening part 403 to be maintained in a closely contacting state with the front panel 541.

A predetermined sealed space may be formed between the opening 8214 and the sound wave receiving part 8213 which are in close contact with each other by the protrusion 8215. Therefore, a front of the closely contacting space is sealed by a medium, i.e., the front panel 541. Accordingly, vibration transmitted through an inside of the medium vibrates air in the predetermined space, and the sound wave due to the vibration may be received by the microphone 8211.

Due to such a sealing process, introduction of external noise or vibration into the predetermined space may be minimized. Thus, an error in determining a knocking operation or a malfunction due to the external noise may be considerably reduced, and a very accurate recognition rate may be ensured. That is, accuracy in determining the knocking operation when a knock-on input is applied may be remarkably increased.

A module seating part 8231 in which the microphone module 821 is accommodated and which is opened toward the front panel 541 may be formed at the holder 823. The microphone module 821 may be formed so that at least the protrusion 8215 protrudes further than a front surface of the holder 823 while the microphone module 821 is seated on the module seating part 8231.

A holder slot 8232 through which the signal line connected to the microphone 8211 passes is formed at the holder 823. The holder slot 8232 is formed to be opened at one side of the module seating part 8231.

Also, a first elastic member fixing part 8233 which protrudes so that the elastic member 824 is installed and fixed thereto is formed at a rear surface of the holder 823. The first elastic member fixing part 8233 may be formed to extend and to pass through one end of the elastic member 824 having a coil shape.

A holder coupling part 8234 which is formed in a hook shape and coupled to the support member 825 is formed at both sides of the holder 823. Due to the holder coupling part 8234, the holder 823 is coupled so as not to be separated by the support member 825. And also, due to the hook shape of the holder coupling part 8234, movement of the holder 823 in a direction which is inserted into the support member 825 is not restricted.

A front surface of the support member 825 is formed to be opened, and also formed so that the holder 823 is inserted through the opened front surface thereof. And a second elastic member fixing part 8251 which protrudes so that the elastic member 824 is installed and fixed thereto may be formed at an inside of the holder 823. The second elastic member fixing part 8251 may be located on an extension line of the first elastic member fixing part 8233, and may be inserted so as to pass through one end of the elastic member 824.

Therefore, even though the elastic member 824 is compressed to press the holder 823, the elastic member 824 may stably press the holder 823 toward the front panel 541 without being buckled.

By the elastic member 824, the microphone module 821 may be maintained in a closely contacting state with the front panel 541, and particularly, may be always maintained in the closely contacting state with the front panel 541 without a position change of the microphone module 821 due to a shock generated when the main door 40 and the sub-door 50 are closed and opened or an inertial force generated when the main door 40 and the sub-door 50 are rotated.

A support member slot 8252 may be formed at one side of the support member 825. The support member slot 8252 may be formed on an extension line of the holder slot 8232. Therefore, the signal line passing through the holder slot 8232 may pass through the support member slot 8252, and may be connected to the detection device PCB 83.

A support member fixing part 8253 is formed at the other side of the support member 825. The support member fixing part 8253 extends outward, and is seated in the second boss 5822 which protrudes from the detection device accommodation part 582. And the screw passes through a screw hole 8254 of the support member fixing part 8253, and is fastened to the second boss 5822, and the support member 825 is installed and fixed on the lower cap decoration 58.

Meanwhile, the knock detection device 82 is installed at the area of the bezel 5411 of the front panel 541, and thus the knock detection device 82 is not exposed to the outside when being seen from an outside of the front panel 541.

Meanwhile, the knock detection device 82 is located at an edge of the front panel 541, but an effective input part for the user's knocking operation is not limited thereto. In a state in which the knock detection device 82 is in close contact with the medium, even though the knocking operation is applied to any positions, the sound wave may be transmitted through the continuous same medium due to a property of the microphone 8211 which detects the sound wave generated by the vibration, instead of the vibration and thus may be effectively detected. Therefore, a position of the knock detection device 82 may be disposed at one end at which the electric wires may be arranged and a visible area of the sub-door 50 may also be maximized. At the same time, even though the user knocks on any point of the front panel 541, the sound wave may be detected through the microphone 8211 which is in close contact with the same medium.

Specifically, an area to which a user's knocking input is applied may be an entire area which is defined by the front surface of the front panel 541. Most of the front panel 541 except a boundary portion thereof is substantially a see-through area which selectively becomes transparent, and the knock detection device 82 may not be disposed thereat.

Therefore, it is preferable that the knock detection device 82 is located at the area of the bezel 5411 in the front panel 541. In particular, the bezel 5411 located at an upper end and left and right sides of the front panel 541 may be minimized by locating the knock detection device 82 at the lower end of the front panel 541 rather than both of the left and right sides thereof. By such a shape of the bezel 5411, the see-through area may be expanded. Since the knock detection device 82 is located at the lower end of the front panel 541 on which a user's eyes are relatively less focused, the wider see-through area may be provided to the user.

Since the knock detection device 82 is located at the area of the bezel 5411, is not exposed to an outside, and has a structure which is in close contact with the front panel 541, the user's knocking operation may be detected even though the user knocks on any position of the front panel 541.

Meanwhile, there may be a lot of environmental factors other than the knocking operation in which the vibrations are exerted on the front surface of the front panel 541. The front surface of the panel assembly 54 may be vibrated, by the shock generated when the main door 40 and the sub-door 50 are opened and closed, an external loud noise or the like, and such an input due to the external environments may be recognized as a knock signal.

Therefore, the detection device PCB 83 may be set so that a user's operation which knocks several times the front surface of the sub-door 50 may be recognized as a normal knock input. More specifically, the user's operation which knocks several lames the front surface of the sub-door 50 at predetermined time intervals may be recognized as the normal knock input.

For example, when the user knocks twice the front surface of the sub-door 50 within a predetermined time, it may be recognized as the normal knock input. When a general user's knock pattern is analyzed, it may be understood that a time interval between a first knock and a second knock is less than about 600 ms. That is, when it is considered that 1 second (s) is 100 ms, a case in which the first knock and the second knock are performed at a time interval less than 1 second may be recognized as the normal knock input.

Therefore, by setting the time interval, an abnormal input may be remarkably prevented from being misrecognized as the knock signal.

Meanwhile, there may be a deviation in a knock intensity according to the user. However, since the medium is the same, it may be understood that the deviation in the knock intensity may be large, but a deviation in a vibration pattern is very small. Therefore, the deviation in the knock intensity may be offset through an algorithm, and the normal knock input may be effectively recognized using a knock input pattern and the time interval between the knocks as factors.

On the contrary to this, it means that the abnormal input may be remarkably prevented from being recognized as the knock input.

FIG. 35 is an exploded perspective view illustrating a coupling structure of the second detection device. And FIG. 36 is a partial perspective view illustrating an installed state of the second detection device.

As illustrated in the drawings, the second detection device 81 may be located inside the detection device accommodation part 582, and may be located at a lateral side of the knock detection device 82.

The second detection device 81 is a device which detects a user's approach, and a position sensing device (PSD) may be used as the second detection device 81. That is, the second detection device 81 includes a light emitting part 811 and a light receiving part 812, and is formed so that the infrared light is emitted from the light emitting part 811, an angle of the reflected light is measured by the light receiving part 812, and thus a position of the user is recognized. An approach distance which is detected by the PSD may be set, and a detectable distance of the second detection device 81 is set to less than 1 m, and thus, when the user is located within a distance of 1 m from the front surface of the refrigerator 1, it may be recognized that the user is located in front of the refrigerator 1 to operate the refrigerator 1.

Like the knock detection device 82, an installation position of the second detection device 81 corresponds to the lower end of the sub-door 50 located at an upper side. Since the installation position corresponds to a height of about 1 m from a floor, the child having the small height or other things having the low height may not be detected.

A pressing member 813 may be further provided at a rear of the second detection device 81. The pressing member 813 is formed to press the second detection device 81 so that the second detection device 81 is installed and fixed to the detection device accommodation part 582, and also the second detection device 81 is in close contact with the front panel 541.

Specifically, a detection device fixing part 8131 which is fixed to a rear surface of the second detection device 81 is formed at the pressing member 813. The detection device fixing part 8131 is coupled to both side ends of the second detection device 81, and thus the pressing member 813 and the second detection device 81 may be integrally coupled to each other.

And an elastic part 8132 which protrudes backward to be rounded is formed between the detection device fixing parts 8131. The elastic part 8132 may be elastically deformed by a pressure, and an end of the elastic part 8132 which protrudes while the second detection device 81 is installed is in close contact with a wall surface of the detection device accommodation part 582, and elastically deformed. Therefore, the second detection device 81 may be in close contact with the front panel 541 by an elastic restoring force of the elastic part 8132. Therefore, the light emitting part 811 and the light receiving part 812 may be completely in close contact with the rear surface of the front panel 541.

At this point, the front surface of the second detection device 81 passes through the through part 5825 formed at the front surface of the detection device accommodation part 582, and may be disposed at an area of the penetration part 5412 which is formed at the bezel 54111 to be transparent.

Therefore, the second detection device 81 has a structure which is actually exposed to the outside through the penetration part 5412. However, the second detection device 81 may have a black color or a dark gray color which is the same as or similar to a color of the front panel 541 having a half mirror structure, and thus may not be easily seen when being seen from an outside.

That is, the light emitted from the second detection device 81 does not interfere with the bezel 5411, and the second detection device 81 is prevented from being remarkably exposed, and thus the external appearance is also prevented from being degraded.

Meanwhile, a pressing member fixing part 8133 is formed at one side of the pressing member 813. The pressing member fixing part 8133 is formed to extend outward, and seated at the first boss 5821 which protrudes from the detection device accommodation part 582. And the screw passing through a screw hole 8134 of the pressing member fixing part 8133 is fastened to the first boss 5821, and thus the pressing member 813 is installed and fixed on the lower cap decoration 58.

FIG. 37 is a view illustrating an electric wire arrangement inside the sub-door.

As illustrated in the drawing, in the sub-door 50, while the second detection device 81 and the knock detection device 82 are assembled, the detection device accommodation part 582 is shielded by the accommodation part cover 583. At this point, the detection device PCB 83 is installed at an inner surface of the accommodation part cover 583, and the electric wire L which is connected to the second detection device 81, the knock detection device 82 and the detection device accommodation part 582 is guided to an outside of the detection device accommodation part 582 through the electric wire hole 5823.

In the sub-door 50, a space in which the insulation 501 is formed is provided at an outer perimeter of the panel assembly 54, i.e., an internal area of the upper cap decoration 57, the lower cap decoration 58, the first side frame 55 and the second side frame 56.

Therefore, an empty space is formed before the foaming solution for molding the insulation 501 is injected, and the electric wire L passing through the electric wire hole 5823 of the detection device accommodation part 582 may be guided along a space formed by the second side frame 56 and the upper cap decoration 57.

And the electric wire L guided to the upper hinge installation part 571 through the electric wire hole 5713 of the upper hinge installation part 571 may be covered by the hinge cover 53. And the electric wire L is guided to the inside of the main door 40 through a space between the hinge cover 53 and the upper hinge 51, and is not exposed to the outside even while the sub-door 50 is being rotated.

Meanwhile, the first injection port 5824 and the second injection port 584 are formed at the lower cap decoration 58, and may be shielded by the injection port cover 5841 and the injection port cover part 5831 formed at the accommodation part cover 583.

The first injection port 5824 is located at a lateral side of the detection device accommodation part 582, and may be located at a position close to the second side frame 56. The first injection port 5824 is formed as outward as possible. When the first injection port 5824 is formed at a position which is at least partially overlapped with a space between the panel assembly 54 and the second side frame 56, it is easy to inject the foaming solution between the panel assembly 54 and the second side frame 56. However, since the inference may occur due to a shape of the handle 561 formed at the second side frame 56, it is preferable that first injection port 5824 is formed as outward as possible.

A foaming solution guide part 585 which is formed inside the first injection port 5824 to be rounded toward the second side frame 56 may be formed inside the lower cap decoration 58. Therefore, when the foaming solution is injected through the first injection port 5824, the foaming solution may naturally flow to the space between the second side frame 56 and the panel assembly 54.

The second injection port 584 is formed on the lower cap decoration 58 close to the lower hinge installation part 581. The second injection port 584 is located to avoid the interference with the lower hinge installation part 581. At this point, the second injection port 584 may be formed at a position which is spaced laterally further than a space formed by the first side frame 55 and the panel assembly 54.

A width of the space between the first side frame 55 and the panel assembly 54 is narrow, and thus the foaming solution may overflow when the foaming solution is directly injected. To solve the problem, the foaming solution is primarily injected into a relatively wide space formed by the lower cap decoration 58 and the panel assembly 54, and then naturally flows to the space formed by the first side frame 55 and the panel assembly 54.

Like this, there is a difference in fluidity of the foaming solution according to positions of the first injection port 5824 and the second injection port 584. The foaming solution may be simultaneously injected at both of the first injection port 5824 and the second injection port 584, and may be filled at the perimeter of the sub-door 50.

FIG. 38 is a perspective view illustrating a state in which the foaming solution injected into the sub-door. And FIG. 39 is a view illustrating an arrangement of a vent hole of the sub-door.

Referring to the drawings, in a state in which the accommodation part cover 583 and the injection port cover 5841 are opened, the foaming solution is injected toward the first injection port 5824 and the second injection port 584. At this point, a pressure of the foaming solution injected to each of the first injection port 5824 and the second injection port 584 may be set differently. That is, the foaming solution which is injected to the first injection port 5824 having a relatively wide flowing space may be injected at a relatively high pressure.

A flowing path of the foaming solution will be described with reference to FIG. 38. The foaming solution injected to the first injection port 5824 is introduced into a space formed by the second side frame 56 and the panel assembly 54 through the foaming solution guide part 585. Then, the foaming solution flows continuously to a space formed by the upper cap decoration 57 and the panel assembly 54.

The foaming solution injected to the second injection port 584 is first injected into the space formed by the lower cap decoration 58 and the panel assembly 54, and then flows continuously to the space between the first side frame 55 and the panel assembly 54.

The foaming solution which is simultaneously injected to both of the first injection port 5824 and the second injection port 584 is combined at an area A of the upper cap decoration 57 or an area B of the first side frame 55. Then, the foaming solution is fully filled in a space formed by the upper cap decoration 57, the first side frame 55 and the second side frame 56, and then finally filled in the space formed by the lower cap decoration 58 and the panel assembly 54. After the filling of the foaming solution is completed, the first injection port 5824 and the second injection port 584 are shielded by the accommodation part cover 583 and the injection port cover 5841.

Meanwhile, a vent hole 5921 through which air remaining in the sub-door 50 is discharged when the foaming solution is injected is formed at the sub-door liner 59. The vent hole 5921 may be formed at a gasket installation groove 592 at which the sub-door gasket 591 formed along the sub-door liner 59 is installed.

The gasket installation groove 592 may be formed to be recessed along a perimeter of the sub-door liner 59, and the vent hole 5921 may be formed in the gasket installation groove 592 at regular intervals. And after the foaming solution is fully filled, the sub-door gasket 591 is installed at the gasket installation groove 592. Therefore, the vent hole 5921 may be covered by the sub-door gasket 591, and may not be exposed to an outside.

Meanwhile, the vent hole 5921 may be formed at a partial section of the entire gasket installation groove 592. The vent hole 5921 may be formed at regular intervals; along areas A and B at which the upper cap decoration 57 and the first side frame 55 are disposed, and particularly, may be formed at regular intervals based on a corner at which the upper cap decoration 57 and the first side frame 55 meet.

Therefore, the air in the sub-door 50 may be discharged at an area close to a point at which the foaming solutions injected into the first injection port 5824 and the second injection port 584 are combined. The air may be continuously discharged until the foaming solution is completely filled.

FIG. 40 is a perspective view illustrating an operation state of a projector of the refrigerator. And FIG. 41 is a cut-away perspective view illustrating an internal structure of a freezer compartment of the refrigerator.

As illustrated in the drawings, the freezer compartment 13 may be opened and closed by one pair of the freezer compartment doors 30. And the first detection device 31 and a projector 32 may be provided, at a right one (in FIG. 40) of the pair of freezer compartment doors 30.

It is preferable that the first detection device 31 and the projector 32 are provided at the right one of the pair of freezer compartment doors 30 at which the sub-door 50 is located. And the first detection device 31 may be vertically disposed on an extension line of the second detection device 81.

An inclined surface 331 which is formed to be inclined downward toward an inside may be formed at a lower portion of the freezer compartment door 30. And the first detection device 31 and the projector 32 may be provided at the inclined surface 331.

The projector 32 serves to project light on a floor surface located in front of the refrigerator 1. An image P such as a design and a character may be projected through the projector 32. For example, when the projector 32 is turned on, the image P including a word like "Door open" may be displayed on the floor surface located in front of the refrigerator 1.

Meanwhile, the first detection device 31 may be disposed at a lower side of the projector 32. The projector 32 and the first detection device 31 may be formed in one module, and may be installed together at the inclined surface 331.

The first detection device 31 may be configured with a kind of proximity sensor which detects a position, and may be provided at the lower side of the projector 32, and may detect whether an object is located at a position of the image P projected by the projector 32.

That is, when the user locates his/her body like a foot on the image P projected by the projector 32, the first detection device 31 may detect the body. A PSD sensor or an ultrasonic sensor may be used as the first detection device 31, and various kinds of proximity sensors which recognize a distance of about 10 to 20 cm may be used.

The projector 32 and the first detection device 31 may be installed on the inclined surface 331 to project the image right in front of the refrigerator 1 or at a lower side of the inclined surface 331 and to detect the object. Therefore, an erroneous detection is prevented from occurring due to a person or an animal which just passes by the refrigerator 1, an object which performs a cleaning operation or the like. That is, the user stands at a position close to the refrigerator 1 to be detected by the first detection device 31. At this point, when the user's foot is located right in front of the inclined surface 331 or at the lower side of the inclined surface 331, the foot is detected by the first detection device 31.

Detecting of the first detection device 31 may include a motion of covering at least a part of the image P projected by the projector 32 for a preset time, a motion of passing through an area of the image P, and another motion which may be recognized by the first detection device 31.

In addition, it may be set that positioning of the user is recognized as an user's operation for operating the refrigerator 1 only when the positioning is simultaneously detected by a combination of the first detection device 31 and the second detection device 81, and thus malfunction may be minimized. To this end, when the user is detected by the second detection device 81, the projector 32 may be operated, and a detection value of the first detection device 31 may be valid.

Like this, when both of the first detection device 31 and the second detection device 81 validly perform an detection operation, the door opening device 70 may be operated to open the main door 40. The embodiment of the present invention has described an example in which the main door 40 is opened by the door opening device 70. However, the sub-door 50 or the freezer compartment door 30 may be opened according to a position of the door opening device 70.

Meanwhile, the user may grip a freezer compartment handle, and then may rotate the freezer compartment door 30, and thus the freezer compartment 13 may be opened and closed by rotation of the freezer compartment door 30. An opening and closing detection device 302 may be provided at a freezer compartment door hinge 301 which rotatably supports the freezer compartment door 30 and whether or not the freezer compartment door 30 is opened may be determined by the opening and closing detection device 302.

And when the freezer compartment door 30 is opened at a preset angle or more, and the freezer compartment accommodation member 131 provided inside the freezer compartment door 30 is in a state which may be withdrawn, the freezer compartment accommodation member 131 may be automatically withdrawn forward by driving of an accommodation member withdrawing device 34.

To this end, the freezer compartment accommodation member 131 having a drawer or basket shape may be supported by a sliding rail 1311 so as to be inserted into or withdrawn from the freezer compartment 13. And the accommodation member withdrawing device 34 provided inside the freezer compartment 13 may be formed so that an inserting and withdrawing rod 341 is inserted and withdrawn by driving of a motor and a gear assembly.

The inserting and withdrawing rod 341 may be connected to the freezer compartment accommodation member 131, and thus the freezer compartment accommodation member 131 may be automatically withdrawn by driving of the accommodation member withdrawing device 34. At this time, even when a plurality of freezer compartment accommodation members 131 are provided, the inserting and withdrawing rod 341 may be connected to all of the plurality of freezer compartment accommodation members 131 through a connection member 342, and thus the plurality of freezer compartment accommodation members 131 may be inserted and withdrawn at the same time.

When the freezer compartment door 30 is rotated to be closed, and then it is determined that the freezer compartment door 30 is rotated at a predetermined angle or more before being in contact with the freezer compartment accommodation member 131, the accommodation member withdrawing device 34 is reversely rotated, and the inserting and withdrawing rod 341 is inserted, and thus the freezer compartment accommodation member 131 may be slid and inserted to an initial position.

Hereinafter, an operation of the sub-door of the refrigerator according to the embodiment of the present invention having the above-described structure will be described.

FIG. 42 is a block diagram illustrating a flow of a control signal of the refrigerator. And FIG. 43 is a flowchart sequentially illustrating an operation of the sub-door of the refrigerator.

As illustrated in the drawings, the refrigerator 1 includes the main control part which controls the operation of the refrigerator 1, and the main control part 2 may be connected to a door switch 21. The door switch 21 may be provided at the cabinet 10, and may detect opening of the refrigerator compartment door 20 or the main door 40, and may also be provided at the main door 40, and may detect opening of the sub-door 50.

And the main control part 2 may be connected to the main lighting unit 85 provided inside the cabinet 10, and may illuminate the inside of the refrigerator 1 when the refrigerator compartment door 20 or the main door 40 is opened. And the main control part 2 may be connected to the door lighting unit 49, and may enable the door lighting unit 49 to be turned on when the sub-door 50 is opened or the knock-on signal is input.

And the main control part 2 may be connected to the display unit 60, and may control an operation of the display unit 60, and may receive an operating signal through the display unit 60. Also, the main control part 2 may be connected to the door opening device 70 and the accommodation member withdrawing device 34, and may control operations of the door opening device 70 and the accommodation member withdrawing device 34.

The main control part 2 may be connected to a communication module 84. The communication module 84 serves to transmit and receive data such as state information of the refrigerator 1, program updating, and transmitting of a using pattern, and may be configured with a device which allows short range communication such as NFC, WiFi and Bluetooth. And setting of the communication module 84 may be performed at the display unit 60.

The main control part 2 may be directly or indirectly connected to the first detection device 31, the second detection device 81, the knock detection device 82 and the projector 32, and may receive the operating signals thereof or may control the operations thereof. And when the detection device. PCB 83 is connected to the knock detection device 82 and/or the first detection device 31, the detection device PCB 83 may be connected to the main control part 2. And the knock detection device 82 and the detection device PCB 83 may be integrally formed with each other.

In a general state in which a separate operation is not applied to the refrigerator 1 having the above-described configuration, the sub-door 50 is in the opaque state like the mirror surface, as illustrated in FIG. 4. In this state, it is impossible to see through the inside of the refrigerator 1.

And in this state, the first detection device 31, the second detection device 81 and the knock detection device 82 are maintained in an activated state in which the user may input the operation anytime [S110].

In this state, when the user locates in front of the front surface of the refrigerator 1 to open the main door 40 or the sub-door 50 of the refrigerator 1, the second detection device 81 detects the user's position. At this time, when the user is not an ordinary adult, but a child, the user may not be detected due to a property of the position of the second detection device 81. When a height of an object which is being cleaning or traveling is lower than that of the second detection device 81, the object may not be detected, and thus the malfunction may be prevented. Meanwhile, the detecting of the second detection device 81 is not essential, and thus may be selectively set by the user's operation [S120].

Then, when the user performs a knocking operation which knocks on the front surface of the sub-door 50, i.e., the front panel 541, the knock detection device 82 may detect the knocking operation, and the detection device PCB 83 determines whether the knocking operation is valid.

Specifically, when the user knocks on the front panel 541, the sound wave due to the vibration generated at this point is transmitted along the front panel 541 formed of the same medium, and the microphone 8211 which is in close contact with the front panel 541 receives the sound wave.

The received sound wave is filtered and amplified while passing through a filter and an amplifier, and transmitted to the detection device PCB 83. The detection device PCB 83 determines the knock with the signal which is collected and analyzed to detect the knock signal.

That is, in the case of the sound wave which is generated by a noise or a shock inside or outside the refrigerator 1, there is a difference from the sound wave generated by the knocking operation in a property thereof, and thus the detection device PCB 83 determines whether the user performs the knocking operation through the signal corresponding to the property of the knock signal.

Of course, in a certain situation, a signal similar to the knock signal may be generated, or a shock similar to the knock may be applied to the front panel 541 due to the user's carelessness or inexperienced operation, or the external noise may be recognized as a signal similar to a wavelength of the knock signal.

To prevent misrecognition in the certain situation, the detection device PCB 83 confirms whether the knock signal is continuously generated in a preset pattern, and also determines whether the pattern is formed within a preset time.

For example, it may be set that, when a signal which is recognized as the knock is generated twice within one second, the signal may be detected as the valid knock-on signal. In an analysis of the general user's knock pattern, when the knock is performed continuously twice, the time interval is less than one second. Therefore, when a signal recognition condition is set as described above, the misrecognition in the certain situation may be prevented, and also the user's knocking operation may be accurately recognized. Of course, the number of the knock signal and the set time necessary to be recognized as the valid knock-on signal may be changed variously.

When a detecting signal is not detected by the second detection device 81, or it is determined through the knock detection device 82 that the valid knock-on signal is not generated, the main control part 2 does not perform a separate control operation, and is maintained in a standby state.

And while the main door 40 or the sub-door 50 is opened, the second detection device 81 and the knock detection device 82 may be inactivated, or may ignore the input signal, and thus the malfunction may be prevented [S130].

Meanwhile, when the valid knock-on signal is detected, and the detection device PCB 83 transmits the valid signal to the main control part 2, the main control part 2 turns on the main lighting unit 85 or the door lighting unit 49.

When the main lighting unit 85 or the door lighting unit 49 is turned on the inside of the refrigerator 1 becomes bright, and the light inside the refrigerator 1 passes through the panel assembly 54. In particular, when the light passes through the front panel 541, the front panel 541 becomes transparent, and thus the inside thereof may be seen through, as illustrated in FIG. 5.

When the sub-door 50 becomes transparent, the user may confirm the accommodation space inside the main door 40 or the space inside the refrigerator 1, and thus may open the sub-door 50 to store the food, or may perform a necessary operation.

At this time, the display unit 60 may also be turned on, and may display operation information of the refrigerator 1. Therefore, the user may check the information output from the display 61 disposed inside the main door 40 through the sub-door 50 [S140].

The turned-on main lighting unit 85 or the door lighting unit 49 may be maintained in a turned-on state for a preset time, e.g., 10 seconds, and thus may allow the user to sufficiently confirm an internal state of the refrigerator 1. Of course, the display unit 60 may also be maintained in a turned-on state for a preset time.

And it is determined whether the preset time passed while the main lighting unit 85 or the door lighting unit 49 is turned on. When the present time passes, the main lighting unit 85 or the door lighting unit 49 is turned off [S150].

And while the main lighting unit 85 or the door lighting unit 49 is turned on, a valid knocking operation signal may be input by the user before the preset time passes.

That is, when the user performs the knocking operation to confirm the inside of the refrigerator 1, but a separate operation is not needed, the main lighting unit 85 or the door lighting unit 49 may be turned off before the preset time passes.

For example, in a state in which the user confirms an accommodation state inside the refrigerator 1 within 5 seconds after the main lighting unit 85 or the door lighting unit 49 is turned on, or confirms the information displayed on the display unit 60, when it is intended that the sub-door 50 becomes opaque, the knocking operation may be performed again on the front surface of the sub-door 50, i.e., the front panel 541.

At this point, when it is determined that the knocking operation is valid, the main lighting unit 85 or the door lighting unit 49 may be turned off before the preset time passes, and the display unit 60 may also terminate an output of the information. Of course, validity determination of the knocking operation may be set to be the same as the operation S130, and if necessary, may be set to another knock input pattern [S160].

When the preset time passes after the main lighting unit 85 or the door lighting unit 49 is turned on, or the valid knock-on signal is input, the main lighting unit 85 or the door lighting unit 49 may be turned off.

When the main lighting unit 85 or the door lighting unit 49 is turned off, the inside of the refrigerator 1 becomes dark, and the outside thereof is in a bright state. In this state, the light outside the refrigerator 1 is reflected by the front panel 541, and thus the front surface of the sub-door 50 is in the mirror-like state, and the user may not see through the inside thereof. Therefore, the sub-door 50 is maintained in the opaque state until a new operation is input [S170].

Hereinafter, an operation of the display unit 60 will be described with reference to the drawings.

FIG. 44 is a perspective view illustrating an installed state of the display unit. And FIG. 45 is a view illustrating a configuration of a front surface of the display unit.

As illustrated in the drawings, the display unit 60 is provided at a lower end of the opening part 403 of the main door 40. And when the main lighting unit 85 or the door lighting unit 49 is turned on so that the sub-door 50 becomes transparent, the display unit 60 may also be turned on together, and thus the user may confirm the information of the display unit 60 through the sub-door 50 even while the sub-door 50 is closed.

The display unit 60 may be turned on while the sub-door 50 is opened. The user may open the sub-door 50 to operate the display unit 60, and when the opening of the sub-door 50 is detected by the door switch 21, the display unit 60 may be activated.

The display 61 is provided at a center of a front surface of the display unit 60, and the plurality of operating buttons 62 may be provided at both of left and right sides of the display 61.

The display 61 is a screen through which the operation information of the refrigerator 1 is output, and may be selectively turned on and off according to the knocking operation on the front panel 541 or the opening and closing of the sub-door 50.

And the operating buttons 62 serve to set the operation of the refrigerator 1, and may include a communication button 621, a lock button 622, an auto-door button 623, an auto-drawer button 624, a refrigerator compartment temperature fixing button 625, a freezer compartment temperature fixing button 626, an air cleaning button 627, and a quick freezing button 628. A combination of the operating buttons 62 is just an example for convenience of explanation, and is not limited thereto.

FIG. 46 is a view illustrating a change in a display state of the display unit according to a knocking operation.

As illustrated in the drawing, the display 61 is maintained in an OFF state until the knocking operation on the front panel 541 is performed. And when the user knocks on the front panel 541, the display 61 is turned on. At this point, a first screen 611 or a second screen 612 which outputs a temperature in the refrigerator 1 and a present operating function may be output on the display 61.

At this point, since the main lighting unit 85 or the door lighting unit 49 is turned on, and the sub-door 50 becomes transparent, the information of the display 61 may be indicated even while the sub-door 50 is closed.

When the preset time passes after the display unit 60 is turned on, or the user knocks again on the front panel 541, the display 61 is turned off. At this time, the main lighting unit 85 or the door lighting unit 49 is also turned off, and the sub-door 50 is in the opaque state, and thus the display 61 is not visible from the outside.

FIG. 47 is a view illustrating the change in the display state when the sub-door is opened and closed.

As illustrated in the drawing, while the sub-door 50 is closed, the display 61 is turned off. And when the sub-door 50 is opened, the opening of the sub-door 50 is detected by the door switch 21, and the main control part 2 turns on the display 61.

When the display 61 is turned on, the operation information of the refrigerator 1 is displayed on the first screen 611, and the first screen 611 is changed into the second screen 612 after the preset time passes, and another operation information of the refrigerator 1 is displayed on the second screen 612. At this point, the information displayed on the first screen 611 and the second screen 612 may be set by the user's operation.

For example, the first screen 611 may display all of the temperatures of the refrigerator compartment 12 and the freezer compartment 13, and may also the present operating function. And the second screen 612 may display the temperature of one storage space of the refrigerator compartment 12 or the freezer compartment 13 and the present operating function in the corresponding storage space.

Meanwhile, when the sub-door 50 is closed, the display 61 detects closing of the sub-door 50 by the door switch 21, and the main control part 2 turns off the display 61.

FIG. 48 is a view illustrating the change in the display state of the display unit when an auto-door function is set.

As illustrated in the drawing, in a state in which the sub-door 50 is opened and the display 61 is turned on, when the user pushes the auto-door button 623, the display 61 displays a third screen 613 which indicates an activated state of the door opening device 70 when the door opening device 70 is activated. And when the door opening device 70 is not activated, the display 61 displays a fourth screen 614 which indicates an inactivated state of the door opening device 70.

And when the user operates again the auto-door button 623 while the display 61 displays the third screen 613 or the fourth screen 614, the third screen 613 and the fourth screen 614 may be converted to each other, and a state of the door opening device 70 may also be substantially changed.

That is, when it is intended that the user does not use the door opening device 70, it may be set through operating of the auto-door button 623. And in this state, an operation of the door opening device 70 is not performed.

Meanwhile, when the user's operation is not applied for a preset time or more in a state in which it is converted to the third screen 613 or the fourth screen 614, the display 61 is converted to the first screen 611 or the second screen 612 which indicates the temperature in the refrigerator 1. At this time, when the door opening device 70 is activated, the auto-door button 623 may be in an ON state, and when the door opening device 70 is inactivated, the auto-door button 623 may be in an OFF state.

FIG. 49 is a view illustrating the change in the display state of the display unit when an auto-drawer function is set.

As illustrated in the drawing, when the user pushes the auto-drawer button 624 while the sub-door 50 is opened and the display 61 is turned on, the display 61 displays a fifth screen 615 which indicates an activated state of the accommodation member withdrawing device 34 when the accommodation member withdrawing device 34 is activated. And when the accommodation member withdrawing device 34 is inactivated, the display 61 displays a sixth screen 616 which indicates an inactivated state of the accommodation member withdrawing device 34.

And when the user operates again the auto-drawer button 624 while the display 61 displays the fifth screen 615 or the sixth screen 616, the fifth screen 615 or the sixth screen 616 may be converted, to each other, and a state of the accommodation member withdrawing device 34 may also be substantially changed.

That is, when it is intended that the user does not use the accommodation member withdrawing device 34, it may be set through operating of the auto-drawer button 624. And in this state, an operation of the accommodation member withdrawing device 34 is not performed.

Meanwhile, when the user's operation is not applied for a preset time or more in a state in which it is converted to the fifth screen 615 or the sixth screen 616, the display 61 is converted to the first screen 611 or the second screen 612 which indicates the temperature in the refrigerator 1. At this time, when the accommodation member withdrawing device 34 is activated, the auto-drawer button 624 may be in an ON state, and when the accommodation member withdrawing device 34 is inactivated, the auto-drawer button 624 may be in an OFF state.

FIG. 50 is a view illustrating the change in the display state of the display unit when the temperature fixing function is set.

As illustrated in the drawing, in a state in which the sub-door 50 is opened and the display 61 is turned on, when the user pushes the refrigerator compartment temperature fixing button 625, the main control part 2 may control the operation of the refrigerator 1 so that the temperature in the refrigerator 1 is maintained at a preset temperature, and a seventh screen 617 which indicates such a state is displayed. And when a refrigerator compartment temperature fixing mode is not set, the display 61 displays an eighth screen 618 which indicates an in activated state of the refrigerator compartment temperature fixing mode.

And when the user operates again the refrigerator compartment temperature fixing button 625 while the display 61 displays the seventh screen 617 or the eighth screen 618, the seventh screen 617 or the eighth screen 618 may be converted to each other, and an operation mode of the refrigerator 1 may also be substantially changed.

That is, when it is intended that the user does not use the refrigerator compartment temperature fixing mode, it may be set through operating of the refrigerator compartment temperature fixing button 625. And in this state, an operation of the refrigerator compartment temperature fixing mode is not performed.

Meanwhile, when the user's operation is not applied for a preset time or more in a state in which it is converted to the seventh screen 617 or the eighth screen 618, the display 61 is converted to the first screen 611 or the second screen 612 which indicates the temperature in the refrigerator 1. At this time, when the refrigerator compartment temperature fixing mode is activated, the refrigerator compartment temperature fixing button 625 may be in an ON state, and when the refrigerator compartment temperature fixing mode is inactivated, the refrigerator compartment temperature fixing button 625 may be in an OFF state.

Also, in an operation of the freezer compartment temperature fixing button 626, the air cleaning button 627, the quick freezing button 628 and the communication button 621, a state of the display 61 is changed in the above-described manner, except contents of the screen, and thus detailed description thereof will be omitted.

The refrigerator and the control method thereof according to the proposed embodiment of the present invention have the following effects.

In the refrigerator according to the embodiment of the present invention, the panel assembly which selectively transmits or reflects the light is provided at a part of the door, and the lighting unit which is turned on or off by the user's operation is provided inside the door, and the lighting unit can be turned on by the user's operation while the door is closed, and thus it is possible to see through the inside of the refrigerator.

Therefore, even while the door is not opened, the user can confirm the space inside the refrigerator, and also can check the position of the food, and thus the user convenience can be enhanced. Also, the door can be prevented from being unnecessarily opened and closed, and loss of the cooling air can be prevented, and thus it is possible to improve power consumption and also to enhance storage performance.

And the panel assembly has a structure like a half glass which is seen through while the lighting unit is turned on, and functions as a mirror while the lighting unit is not turned on, and thus an exterior of the refrigerator door can be enhanced.

And the microphone which detects a sound generated by the vibration upon the user's knocking operation on the panel assembly can be provided at the rear surface of the panel assembly. Therefore, the lighting unit can be turned on or off by the user's knocking operation, and thus the panel assembly can be selectively transparent.

Therefore, since the panel assembly can become transparent by the simple operation, and the sound of the vibration transmitted through the same medium is the same even though the user knocks on any positions of the front surface of the panel assembly, the operation can be easily performed, and effectively detected.

Also, the microphone module having the built-in microphone of the knock detection device is in close contact with the rear surface of the panel assembly, and thus a detection rate can be enhanced. At this point, the vibration or the sound wave having a certain wavelength generated upon the knocking on the panel assembly is recognized as the valid signal, and thus the misrecognition due to an abnormal noise like the external noise is prevented.

And the detection device PCB which determines the knock signal is disposed together with the knock detection device, and determines the valid knock signal, and transmits a determined result to the main control part inside the cabinet, and thus the efficiency and reliability in processing the signal can be enhanced by minimizing noise upon the determination of the knock signal. Also, when the signal input from the knock detection device is detected several times within the preset time, the signal is determined as the valid signal, and thus reliability of the operation can be further enhanced.

And the panel assembly includes the front panel formed of the half mirror material, and the plurality of insulation panels formed of the insulation glass, and thus thermal loss through the panel assembly can be prevented. And the spacer bar and the sealant seals between the front panel and the insulation panel and between the plurality of insulation panels, and thus an insulation space is formed, and the insulation space is in a vacuum state, or filled with an inert gas, and thus insulation performance can be further enhanced.

And since the bezel is formed at the front panel, and the knock detection device is located on the bezel, the knocking operation on the front panel can be easily recognized, and the knock detection device is prevented from being exposed to an outside, and thus an exterior can be further improved. Also, the detection device is formed at the bezel provided at the lower end of the front panel, and thus the bezel provided at another portion of the front panel can be relatively thin, and thus a see-through portion of the door can be widened.

And the foaming solution injection port for forming the insulation is formed at the lower end of the door, and the first foaming solution injection port is formed at a position of the second side frame having a relatively wide width so that the foaming solution can be directly injected toward the second side frame. And since a distance between the first side frame and the panel assembly is very narrow, and thus the foaming solution may overflow, the second foaming solution injection port is formed so that the foaming solution is injected toward an inside further than a position of the first side frame, i.e., the lower end of the panel assembly. Therefore, the foaming solution can be smoothly injected, and also can be prevented from being incompletely filled or overflowing, and thus the insulation performance can be maintained.

And the side decoration which is in contact with the front plate is formed of the metallic material such as aluminum having high thermal conductivity. The heater installation part in which the sub-door heater is installed to be in contact with the outer end of the front plate is formed at the side decoration.

Therefore, the surface temperature of the front panel at the outer portion of the spacer bar which is vulnerable to dew condensation is increased, and thus the dew condensation cart be prevented. Also, since the front bent part is formed at the side decoration, and is in close contact with the front panel, the clew condensation can be prevented from being generated along the perimeter of the front panel.

And since the knock detection device, the second detection device which detects the user's approach, and the detection device PCB are accommodated and installed at the detection device accommodation part formed to be recessed at the lower end of the door, installation, assembling and maintenance of the detection device can be easily performed.

And the sub-door which can be seen through is accommodated inside the opening part of the main door, and the upper hinge and the lower hinge extend laterally, and pass through the hinge hole of the opening part, and are rotatably installed therein.

Therefore, an interference space due to the upper hinge and the lower hinge can be prevented, and the sagging of the sub-door can also be prevented, and a gap between the opening part of the main door and the sub-door can be minimized, and thus the external appearance cart be enhanced. Also, the side supporter which supports the upper hinge and the lower hinge is formed of the metallic material, coupled to the upper hinge and the lower hinge so that the installation position thereof is maintained, and thus the interference with the opening part due to deformation of the sub-door can be prevented.

The side supporter formed of the metallic material serves to maintain a shape of the sub-door at both ends of the sub-door, and also enhances the strength of the sub-door.

And the magnet is provided at a position at which the main door faces the sub-door, and the attraction is formed between the main door and the sub-door, and thus while the sub-door is closed, the sub-door can be maintained in the closed state by the magnetic force.

Therefore, the sub-door can be prevented from being unintentionally opened due to a shock generated when the main door is closed and opened or an inertial force generated when the main door is rotated, and also loss of the cooling air and an increase in the power consumption can be prevented.

Even though all the elements of the embodiments are coupled into one or operated in the combined state, the present disclosure is not limited to such an embodiment. That is, all the elements may be selectively combined with each other without departing from the scope of the invention. Furthermore, when it is described that one comprises for includes or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, will be understood by those skilled in the art that various changes in form and details may be made therein without departing from the spirit and scope of the invention as defined by the appended claims. Therefore, the preferred embodiments should be considered in a descriptive sense only and not for purposes of limitation, and also the technical scope of the invention is not limited to the embodiments. Furthermore, the present invention is defined not by the detailed description of the invention but by the appended claims, and all differences within the scope will be construed as being comprised in the present disclosure.

INDUSTRIAL APPLICABILITY

According to embodiments, use convenience is improved, thereby achieving high industrial applicability.

The invention claimed is:

1. A home appliance, comprising:
a cabinet forming an inner space;
a light disposed within the inner space;
a door hinged to the cabinet to cover the inner space, and including:
 a door frame having an opening; and
 a front panel to cover the opening of the door frame and having a see-through area including a color or a mirror surface;
a sensor configured to detect a knock signal on the front panel;
a printed circuit board (PCB) coupled to the sensor; and
a controller configured to control the light,
wherein the light is turned on based on the knock signal while the door is closed to allow the inner space to be seen through the see-through area from outside of the home appliance, and
wherein the PCB is more adjacent to the sensor than the controller.

2. The home appliance of claim 1, wherein the door further includes a rear panel spaced apart from a rear surface of the front panel, and a spacer provided between the front panel and the rear panel, and wherein the sensor faces the rear surface of the front panel and configured to detect the user input applied to the front panel.

3. The home appliance of claim 2, wherein the front panel further includes a bezel area provided outside the see-through area, and the sensor is provided at the bezel area.

4. The home appliance of claim 3, wherein the PCB is provided at the bezel area.

5. The home appliance of claim 4, wherein the knock signal is input when a second knock is applied within a first predetermined time period after a first knock is applied on the front panel, and then the light is turned on.

6. The home appliance of claim 4, wherein the controller is provided in the cabinet.

7. The home appliance of claim 6, wherein the light is turned off after being turned on for a predetermined period of time.

8. The home appliance of claim 7, wherein when the knock input is applied before the predetermined period of time has elapsed, the controller is configured to control the light to be turned off.

9. The home appliance of claim 4, wherein the controller is provided in the cabinet.

10. The home appliance of claim 3, wherein the sensor is provided closer to a boundary between the see-through area and the bezel area than an outer edge of the front panel.

11. The home appliance of claim 1, wherein the door frame comprises a lower cap decoration having an injection port through which a foaming solution is injected to form an insulator in the door, and
wherein the sensor and the PCB are installed in the lower cap decoration.

12. The home appliance of claim 1, wherein the front panel comprises a glass layer which forms an exterior, and a vacuum deposition layer formed at a rear surface of the glass layer,
wherein the vacuum deposition layer defines the mirror surface.

13. The home appliance of claim 12, wherein the front panel comprises a bezel print layer formed at a rear surface of the vacuum deposition layer.

14. The home appliance of claim 1, wherein the front panel comprises a glass layer which forms an exterior, a ceramic print layer formed at a front surface of the glass layer, and a bezel print layer formed at a rear surface of the glass layer.

15. The home appliance of claim 1, wherein the front panel comprises a glass layer which forms an exterior, a hard coating layer formed at a front surface of the glass layer, and a bezel print layer formed at a rear surface of the glass layer.

16. A home appliance, comprising:
a cabinet forming an inner space;
a light disposed within the inner space;
a door hinged to the cabinet to cover the inner space, the door including:
 a door frame having an opening; and
 a front panel configured to cover the opening and having a see-through area having a color or a mirror surface;
a first sensor configured to detect a user input on the front panel;
a second sensor configured to emit light, detect a reflection of the emitted light, and to detect a user's position based on the reflection;
a printed circuit board (PCB) coupled to the second sensor;
a controller configured to control the light;
wherein the light is turned on based on the user's position and the user input while the door is closed to allow the inner space to be seen through the see-through area from outside of the home appliance, and
wherein the PCB is more adjacent to the second sensor than the controller.

17. The home appliance of claim 16, wherein the first sensor and the second sensor are provided in the door frame.

18. The home appliance of claim 17, wherein the door frame comprises a lower cap decoration having an injection port through which a foaming solution is injected to form an insulator in the door, and
wherein the first sensor and the second sensor are installed in the lower cap decoration.

19. The home appliance of claim 17, wherein the PCB is provided in the door frame.

20. The home appliance of claim 16, wherein the door further includes a rear panel spaced apart from a rear surface of the front panel, and a spacer provided between the front panel and the rear panel, and
wherein the first sensor and the second sensor face the rear surface the front panel.

21. The home appliance of claim 20, wherein the front panel further includes a bezel area provided outside the see-through area, and
wherein the first sensor and the second sensor are provided at the bezel area.

22. A home appliance, comprising:
a cabinet forming an inner space;
a light disposed within the inner space;
a door hinged to the cabinet to cover the inner space, the door including
a door frame having an opening; and
a front panel configured to cover the opening and having a see-through area including a color or a mirror surface;
a first sensor configured to detect a user input on the front panel; and
a second sensor configured to detect a user's position;
wherein the light is turned on based on a valid knock signal while the door is closed to allow the inner space to be seen through the see-through area from outside of the home appliance.

23. The home appliance of claim 22, wherein the valid knock signal is input when a second knock is applied within a first predetermined time period after a first knock is applied on the front panel.

24. The home appliance of claim 22, wherein the light is turned off after being turned on for a predetermined period of time.

25. The home appliance of claim 24, wherein if it is determined that the valid knock input is applied before the predetermined period of time has elapsed, the light is turned off.

26. The home appliance of claim 22, wherein while the door is opened, the second sensor and the first sensor are inactivated.

* * * * *